(12) United States Patent
Kurashige

(10) Patent No.: US 8,107,175 B2
(45) Date of Patent: Jan. 31, 2012

(54) WIDE-ANGLE LENS, OPTICAL APPARATUS, AND METHOD FOR MANUFACTURING WIDE-ANGLE LENS

(75) Inventor: Takamichi Kurashige, Funabashi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/895,567

(22) Filed: Sep. 30, 2010

(65) Prior Publication Data

US 2011/0080659 A1    Apr. 7, 2011

(30) Foreign Application Priority Data

Oct. 2, 2009  (JP) ................. 2009-230193
Oct. 2, 2009  (JP) ................. 2009-230194

(51) Int. Cl.
*G02B 9/60* (2006.01)
*G02B 3/02* (2006.01)
(52) U.S. Cl. ................... 359/770; 359/714
(58) Field of Classification Search ............ 359/714, 359/763, 770, 771, 781
See application file for complete search history.

(56) References Cited

U.S. PATENT DOCUMENTS

| | | | |
|---|---|---|---|
| 6,239,921 B1 | 5/2001 | Isono | |
| 6,747,814 B2 * | 6/2004 | Abe | 359/746 |

FOREIGN PATENT DOCUMENTS

| | | |
|---|---|---|
| JP | 11-142730 A | 5/1999 |
| JP | 2000-180718 A | 6/2000 |
| JP | 2004-212729 A | 7/2004 |
| JP | 2008-040033 A | 2/2008 |
| JP | 2008-089997 A | 4/2008 |

* cited by examiner

*Primary Examiner* — Jack Dinh
(74) *Attorney, Agent, or Firm* — Miles & Stockbridge P.C.

(57) ABSTRACT

A wide-angle lens WL including, in order from an object: a first lens L1 which is a negative meniscus lens having a convex surface facing the object; a second lens L2 which is a positive lens; a third lens L3 which is a negative lens; a fourth lens L4 which is a positive lens; and a fifth lens L5 which is a positive lens, wherein the condition of $0.2<d8/f<0.64$ is satisfied, where d8 denotes an air distance between the fourth lens L4 and the fifth lens L5, on an optical axis, upon focusing on an object point at infinity, and f denotes a focal length of the wide-angle lens WL upon focusing on an object point at infinity.

33 Claims, 42 Drawing Sheets

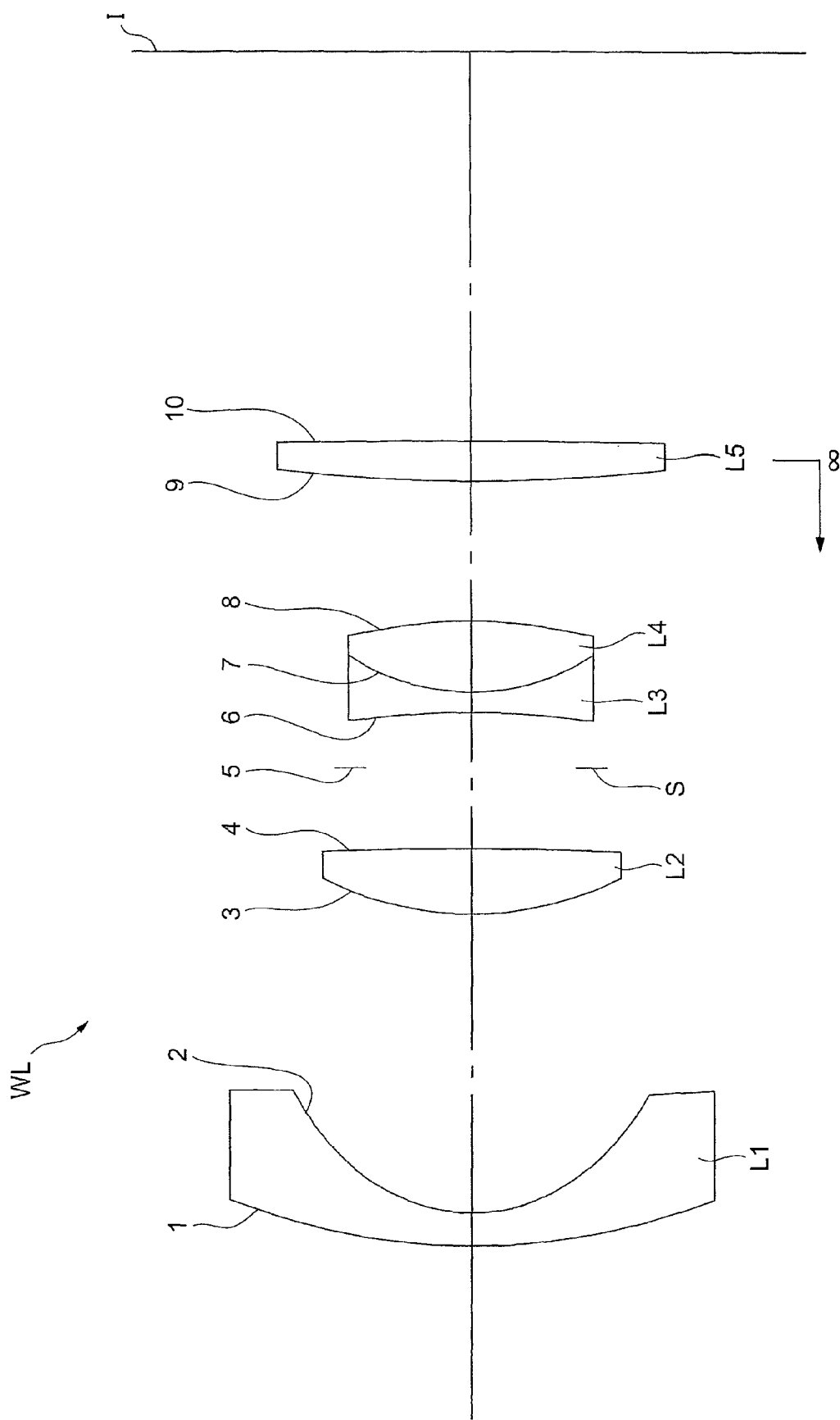

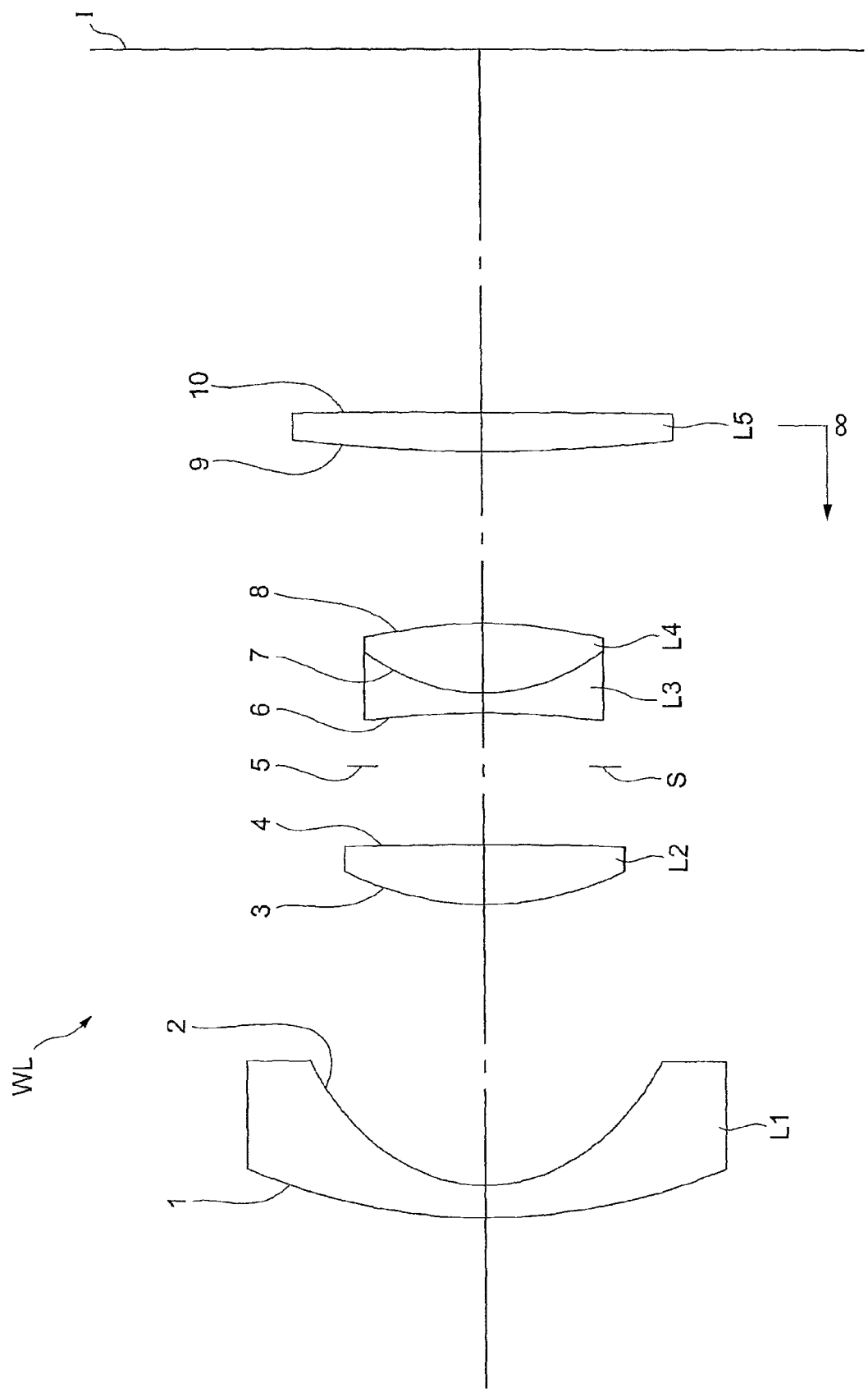

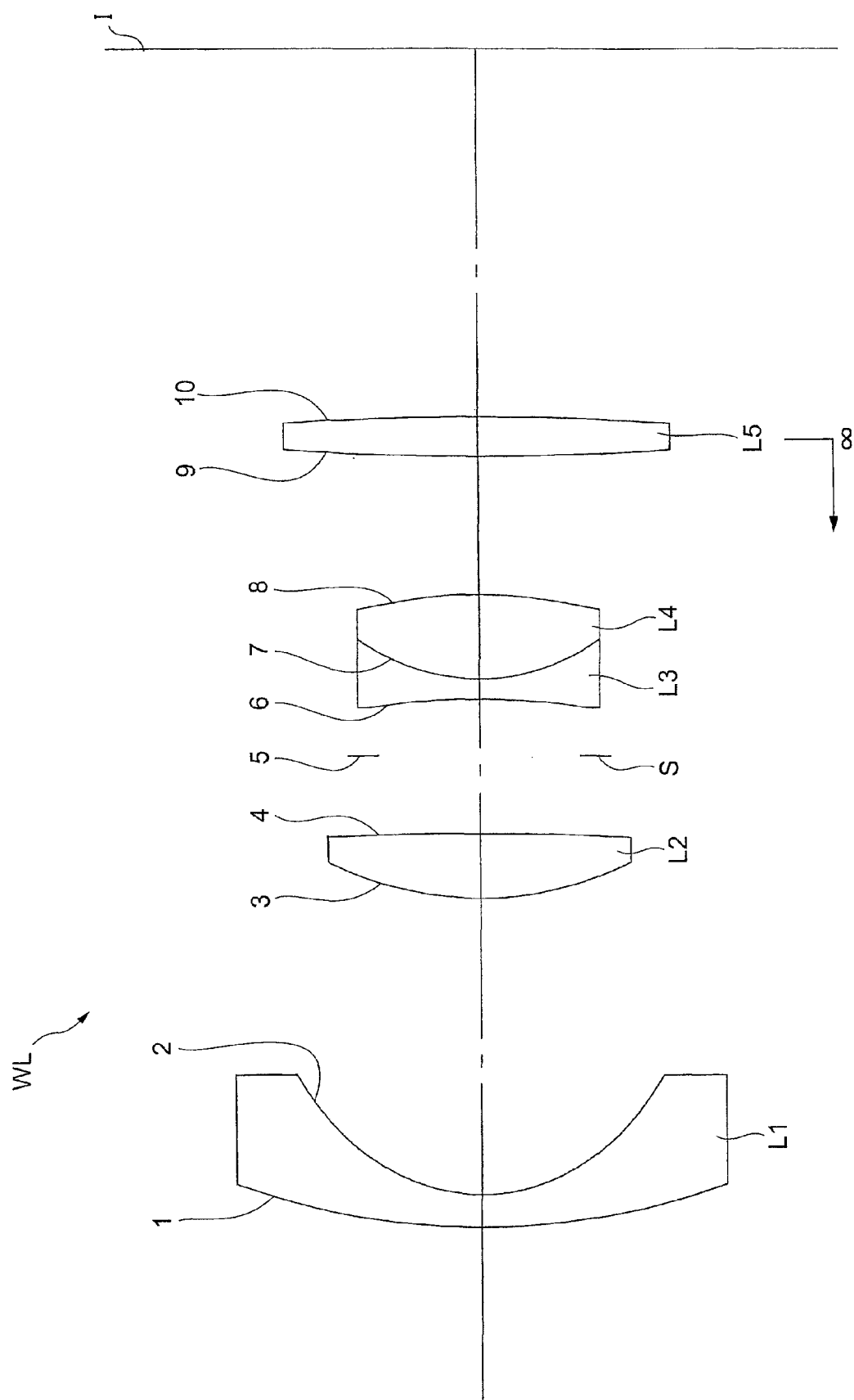

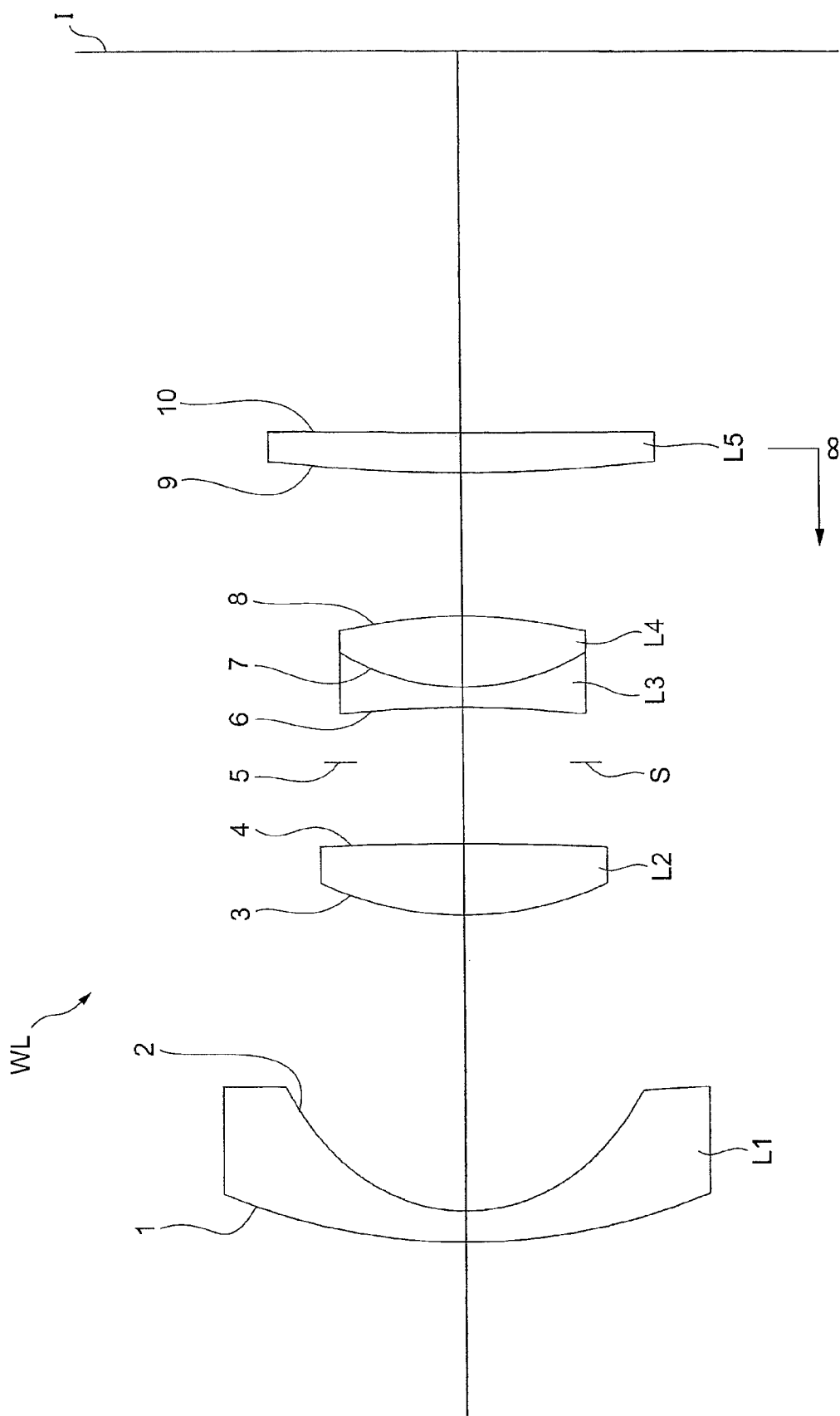

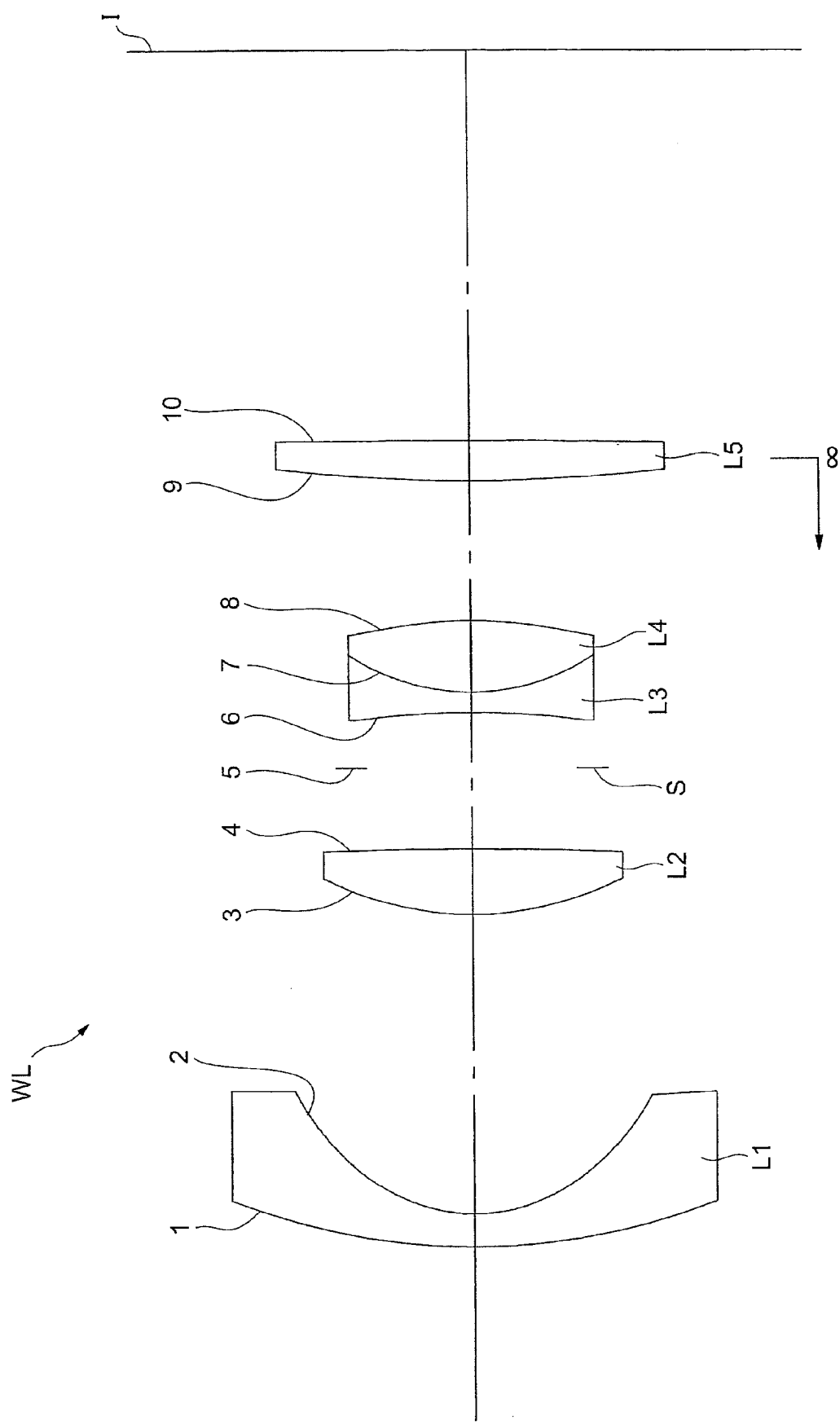

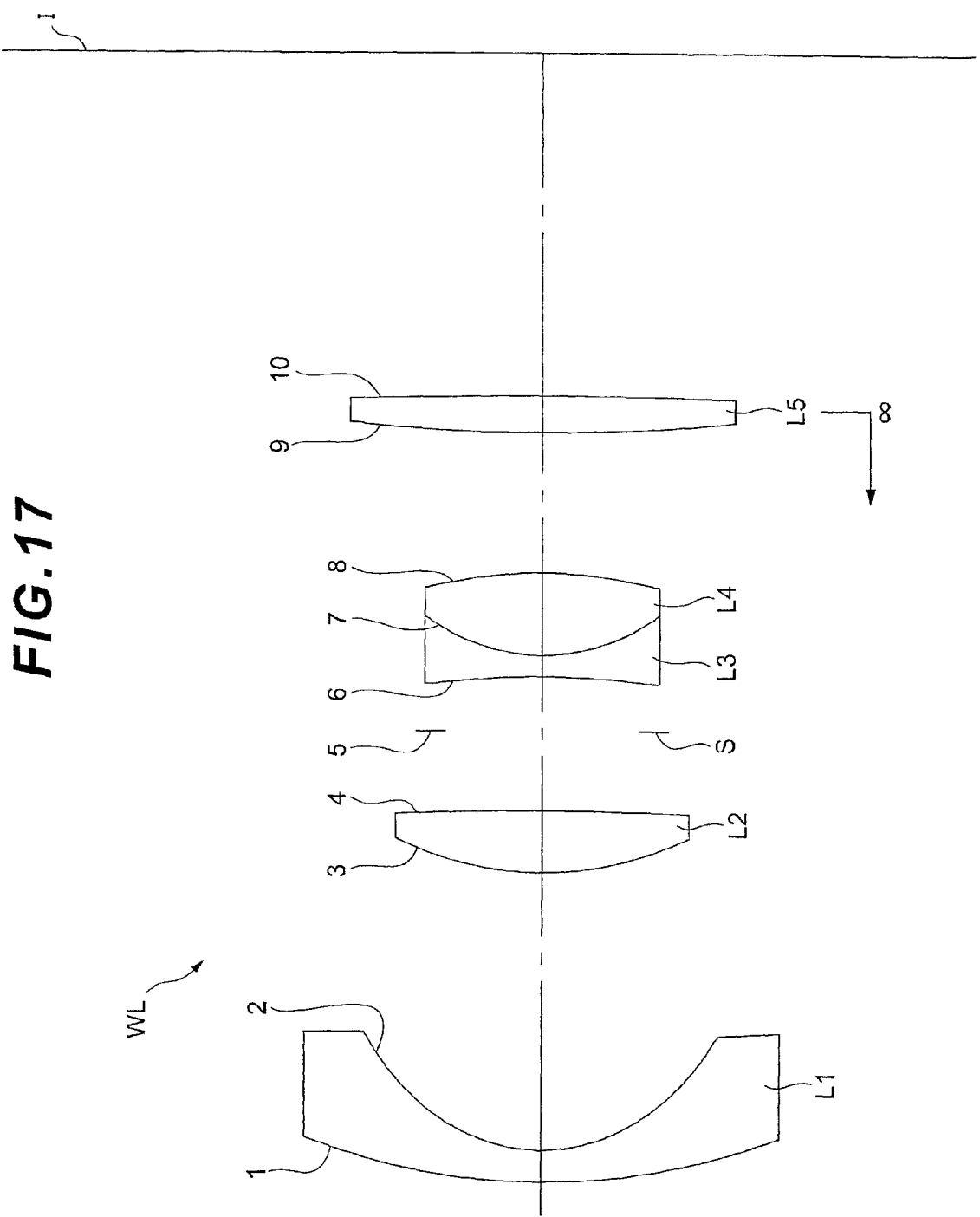

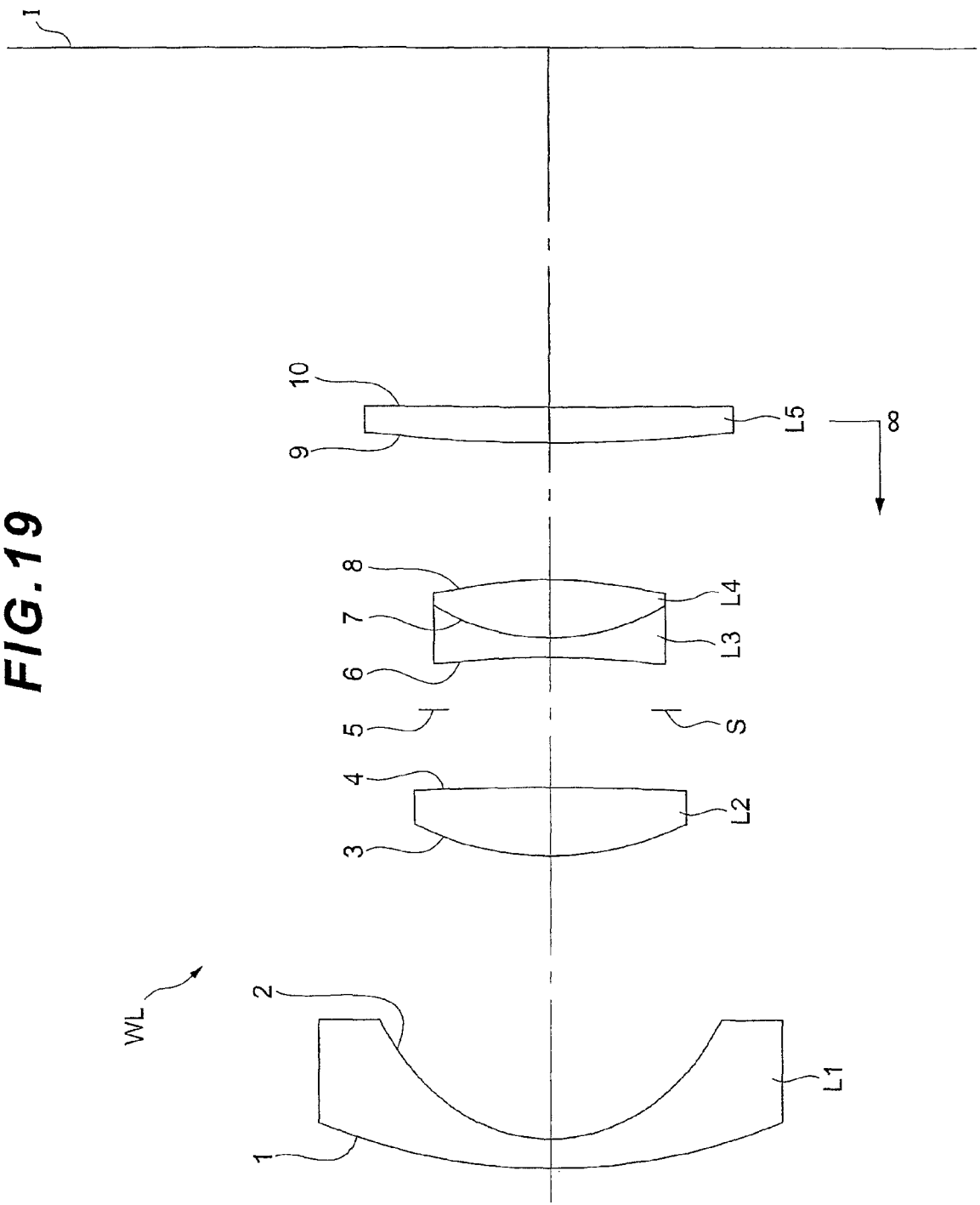

WIDE-ANGLE LENS, OPTICAL APPARATUS, AND METHOD FOR MANUFACTURING WIDE-ANGLE LENS

INCORPORATION BY REFERENCE

This invention claims the benefit of Japanese Patent Application No. 2009-230193 and Japanese Patent Application No. 2009-230194 which are hereby incorporated by reference.

FIELD OF THE INVENTION

The present invention relates to a wide-angle lens, an optical apparatus, and method for manufacturing the wide-angle lens.

BACKGROUND OF THE INVENTION

For wide-angle lenses which are used for digital still cameras and video cameras, a high telecentric characteristic and good image forming performance, that can be Implemented with a small lens system, are demanded, and various technologies have been proposed to satisfy these demands (see Japanese Patent Application Laid-Open No. 2008-40033).

However it is difficult to obtain a wide-angle lens which satisfies the above demands, and even if a relatively good image forming performance is implemented, brightness of the lens is still insufficient.

SUMMARY OF THE INVENTION

With the foregoing in view, it is an object of the present invention to provide a wide-angle lens which is compact and still has good image forming performance, an optical apparatus, and a method for manufacturing the wide-angle lens.

To achieve the object, a first lens system according to the present invention is a lens system including, in order from an object: a first lens which is a negative meniscus lens having a convex surface facing the object; a second lens which is a positive lens; a third lens which is a negative lens; a fourth lens which is a positive lens; and a fifth lens which is a positive lens, and the following conditional expression is satisfied: $0.2 < d8/f < 0.64$, where d8 denotes an air distance between the fourth lens and the fifth lens on an optical axis upon focusing on an object point at infinity, and f denotes a focal length of the lens system upon focusing on an object point at infinity.

In the first lens system, it is preferable that the following conditional expression is satisfied: $3.77 < f5/f < 8.0$, where f5 denotes a focal length of the fifth lens.

In the first lens system, it is preferable that the following conditional expression is satisfied: $0.88 < (-f1)/f < 1.2$, where f1 denotes a focal length of the first lens.

In the first lens system, it is preferable that focusing from an object at infinity to an object at a finite distance is performed by moving the fifth lens along the optical axis.

In the first lens system, it is preferable that the following conditional expression is satisfied: $0.59 < d2/(-f1) < 0.88$, where f1 denotes a focal length of the first lens, and d2 denotes an air distance between the first lens and the second lens on the optical axis.

In the first lens system, it is preferable that the following conditional expression is satisfied: $0.88 < f2/f < 1.2$, where f2 denotes a focal length of the second lens. In the first lens system, it is preferable that the following conditional expression is satisfied: $0.6 < \Sigma D/f < 0.87$, where $\Sigma D$ denotes a distance, on the optical axis, from a lens surface closest to the object in the second lens to a lens closest to an image in the fourth lens.

In the first lens system, it is preferable that the third lens and the fourth lens are cemented lenses.

In the first lens system, it is preferable that the following conditional expression is satisfied: $0.87 < BF/f < 1.25$, where BF denotes a back focus upon focusing on an object point at infinity.

In the first lens system, it is preferable that the following conditional expression is satisfied: $-0.1 < (Rb+Ra)/(Rb-Ra) < 1.9$, where Ra denotes a radius of curvature of an object side lens surface of the fifth lens, and Rb denotes a radius of curvature of an image side lens surface of the fifth lens.

In the first lens system, it is preferable that the following conditional expression is satisfied: $0.01 < (n3-n4)$, where n3 denotes a refractive index of the third lens at d-line, and n4 denotes a refractive index of the fourth lens at d-line. In the first lens system, it is preferable that the following conditional expression is satisfied: $-2.00 < (0.07 (v1-v2)-n1)$, where v1 denotes an Abbe number of the first lens at d-line, 84 2 denotes an Abbe number of the second lens at d-line, and n1 denotes a refractive index of the first lens at d-line.

In the first lens system, it is preferable that the first lens has an aspherical surface.

In the first lens system, it is preferable that a lens surface closest to an image in the fourth lens is an aspherical surface.

In the first lens system, it is preferable that the following conditional expression is satisfied: $0.87 < (-f1)/f2 < 1.19$, where f2 denotes a focal length of the second lens.

A first optical apparatus according to the present invention is an optical apparatus including a lens system which forms an image of an object on a predetermined surface, and the lens system is the lens system according to a first aspect of the present invention.

A second lens system according to the present invention is a lens system including, in order from an object: a first lens which is a negative meniscus lens having a convex surface facing the object; a second lens which is a positive lens; a third lens which is a negative lens; a fourth lens which is a positive lens; and a fifth lens which is a positive lens, and the following expressions are satisfied: $0.59 < d2/(-f1) < 0.88$ and $0.6 < \Sigma D/f < 0.87$, where f1 denotes a focal length of the first lens, d2 denotes an air distance between the first lens and the second lens on an optical axis, $\Sigma D$ denotes a distance, on the optical axis, from a lens surface closest to the object in the second lens to a lens surface closest to an image in the fourth lens, and f denotes a focal length of the lens system upon focusing on an object point at infinity.

In the second lens system, it is preferable that the following conditional expression is satisfied: $3.77 < f5/f < 8.0$, where f5 denotes a focal length of the fifth lens.

In the second lens system, it is preferable that the following conditional expression is satisfied: $0.88 < f2/f < 1.2$, where f2 is a focal length of the second lens.

In the second lens system, it is preferable that the following conditional expression is satisfied: $0.87 < (-f1)/f2 < 1.19$, where f2 is a focal length of the second lens.

In the second lens system, it is preferable that focusing from an object at infinity to an object at a finite distance is performed by moving the fifth lens along the optical axis.

In the second lens system, it is preferable that the third lens and the fourth lens are cemented lenses.

In the second lens system, it is preferable that the following conditional expression is satisfied: $0.01 < (n3-n4)$, where n3 denotes a refractive index of the third lens at d-line, and n4 denotes a refractive index of the fourth lens at d-line.

In the second lens system, it is preferable that the following conditional expression is satisfied: $-2.00<(0.07\times(\nu1-\nu2)-n1)$, where $\nu1$ denotes an Abbe number of the first lens at d-line, $\nu2$ denotes an Abbe number of the second lens at d-line, and n1 denotes a refractive index of the first lens at d-line.

A second optical apparatus according to the present invention is an optical apparatus including a lens system which forms an image of an object on a predetermined surface, and the lens system is the lens system according to a second aspect of the present invention.

A method for manufacturing a first lens system according to the present invention, in which, in order from an object, a first lens which is a negative meniscus lens having a convex surface facing the object, a second lens which is a positive lens, a third lens which is a negative lens, a fourth lens which is a positive lens, and a fifth lens which is a positive lens are disposed, and each of the lenses is disposed so as to satisfy the following conditional expression: $0.2<d8/f<0.64$, where d8 denotes an air distance between the fourth lens and the fifth lens on an optical axis upon focusing on an object point at infinity, and f denotes a focal length of the lens system upon focusing on an object point at infinity.

In the method for manufacturing a first lens system, it is preferable that the following conditional expression is satisfied: $3.77<f5/f<8.0$, where f5 denotes a focal length of the fifth lens.

In the method for manufacturing a first lens system, it is preferable that the following conditional expression is satisfied: $0.88<(-f1)/f<1.2$, where f1 denotes a focal length of the first lens.

In the method for manufacturing a first lens system, it is preferable that the following conditional expression is satisfied: $0.59<d2/(-f1)<0.88$, where f1 denotes a focal length of the first lens, and d2 denotes an air distance between the first lens and the second lens on the optical axis.

In the method for manufacturing a first lens system, it is preferable that the following conditional expression is satisfied: $0.88<f2/f<1.2$, where f2 denotes a focal length of the second lens.

In the method for manufacturing a first lens system, it is preferable that the following conditional expression is satisfied: $0.6<\Sigma D/f<0.87$, where $\Sigma D$ denotes a distance, on the optical axis, from a lens surface closest to the object in the second lens to a lens closest to an image in the fourth lens.

A method for manufacturing a second lens system according to the present invention, in which, in order from an object, a first lens which is a negative meniscus lens having a convex surface facing the object, a second lens which is a positive lens, a third lens which is a negative lens, a fourth lens which is a positive lens, and a fifth lens which is a positive lens are disposed, and each of the lenses is disposed so as to satisfy the following conditional expressions: $0.59<d2/(-f1)<0.88$, where f1 denotes a focal length of the first lens, and d2 denotes an air distance between the first lens and the second lens on an optical axis; and $0.6<\Sigma D/f<0.87$, where $\Sigma D$ denotes a distance, on the optical axis, from a lens surface closest to the object in the second lens to a lens surface closest to an image in the fourth lens, and f denotes a focal length of the lens system upon focusing on an object point at infinity.

In the method for manufacturing a lens system according to the second aspect of the present invention, it is preferable that the following conditional expression is satisfied: $0.87<(-f1)/f2<1.19$, where f2 denotes a focal length of the second lens.

Advantages Effects of the Invention

According to the present invention, [a wide-angle lens] which is compact and still has good image forming performance can be implemented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIG. 1 is a diagram depicting a configuration of a wide-angle lens according to Example 1 upon focusing on infinity;

FIG. 5 is a diagram depicting a configuration of a wide-angle lens according to Example 3 upon focusing on infinity;

FIG. 7 is a diagram depicting a configuration of a wide-angle lens according to Example 4 upon focusing on infinity;

FIG. 9 is a diagram depicting a configuration of a wide-angle lens according to Example 5 upon focusing on infinity;

FIG. 11 is a diagram depicting a configuration of a wide-angle lens according to Example 6 upon focusing on infinity;

FIG. 17 is a diagram depicting a configuration of a wide-angle lens according to Example 9 upon focusing on infinity;

FIG. 19 is a diagram depicting a configuration of a wide-angle lens according to Example 10 upon focusing on infinity;

DESCRIPTION OF THE EMBODIMENTS

Preferred embodiments will now be described with reference to the drawings.

First Embodiment

Figure 21B:
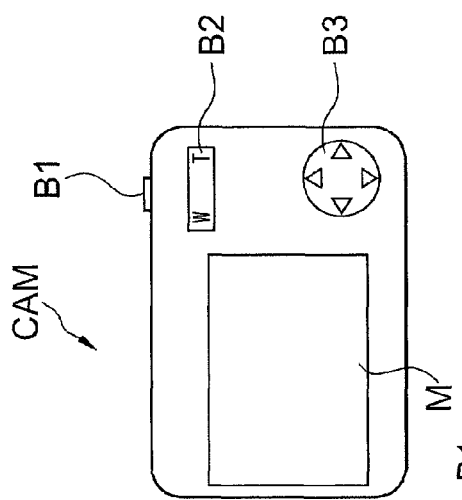
FIG. 21B is a rear view of a digital still camera.
Figure 21A:
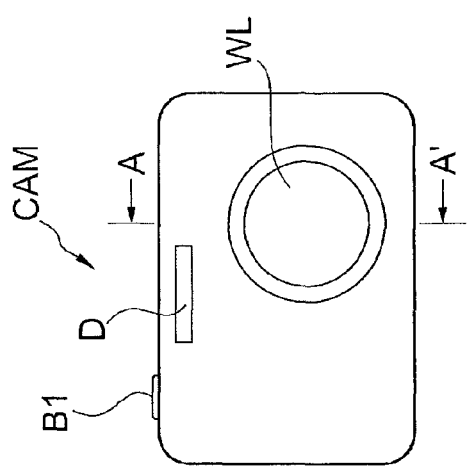
FIG. 21A is a front view of a digital still camera.
Figure 21C:
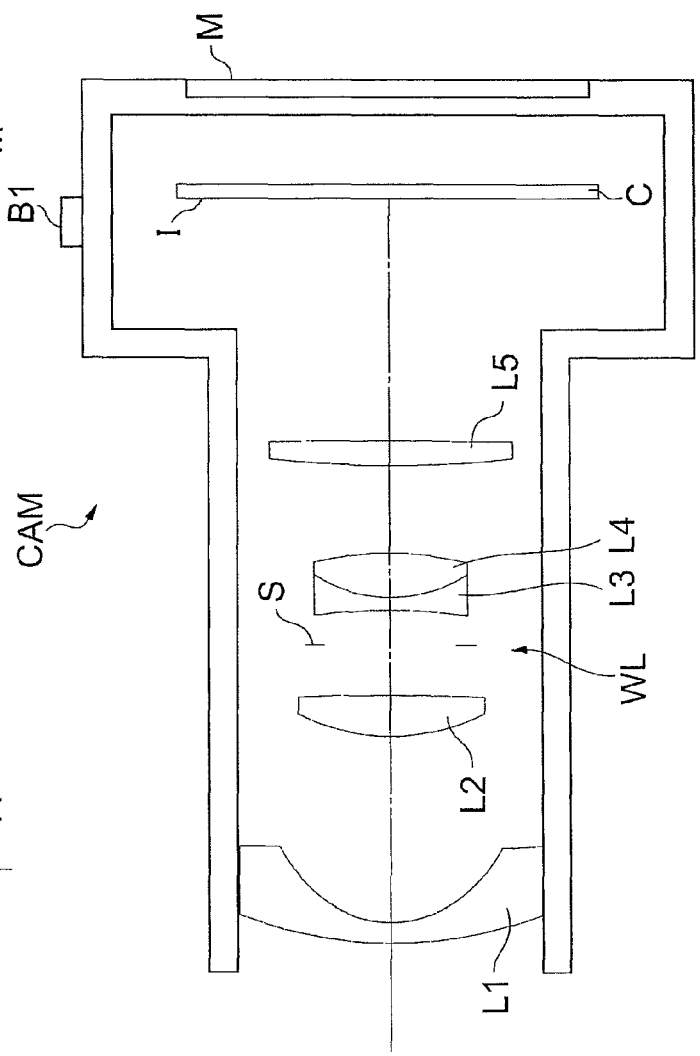
FIG. 21C is a cross-sectional view sectioned along the arrow A-A' in FIG. 7A.

FIG. 21 shows a digital still camera CAM having a wide-angle lens according to the first embodiment. In FIG. 21, FIG. 21A shows a front view of the digital still camera CAM. FIG. 21B shows a rear view of the digital still camera CAM, and FIG. 21C shows a cross-sectional view sectioned along the arrow A-A' in FIG. 21A.

In the digital still camera CAM shown in FIG. 21, if a power button, which is not illustrated, is pressed, a shutter, which is not illustrated, of a camera lens (WL) is released, and lights from an object are collected by a camera lens (WL), and form an image on a picture element C (e.g. CCD and CMOS) which is disposed on the image plane I. The object image formed on the picture element C is displayed on a liquid crystal monitor M disposed behind the digital still camera CAM. The user determines the composition of the object image while viewing a liquid crystal monitor M, then presses the release button B1 to photograph the object image by the picture element C, and stores it in a memory, which is not illustrated.

The camera lens is constituted by a later mentioned wide-angle lens WL according to the embodiment. In the digital still camera CAM, an auxiliary light emitting portion D, which emits auxiliary light when the object is dark, a wide (W)-tele (T) button B2 for zooming the camera lens (wide-angle lens WL), and a function button B3 which is used for setting various conditions for the digital still camera CAM, are disposed.

The wide-angle lens WL comprises, in order from the object, a first lens L1 which is a negative meniscus lens having a convex surface facing the object, a second lens L2 which is a positive lens, a third lens L3 which is a negative lens, a fourth lens L4 which is a positive lens, and a fifth lens L5 which is a positive lens. An aperture stop S is disposed between the second lens L2 and the third lens L3.

In the wide-angle lens WL having this configuration, it is preferable that the condition expressed by the following conditional expression (1) is satisfied:

$$0.2 < d8/f < 0.64 \tag{1}$$

where d8 denotes an air distance, between the fourth lens L4 and the fifth lens L5, on the optical axis, upon focusing on an object point at infinity, and f denotes a focal length of the wide-angle lens WL upon focusing on an object point at infinity. Then a wide-angle lens WL, which is compact and still has good image performance, and an optical apparatus (digital still camera CAM) having this wide-angle lens WL can be implemented. In concrete terms, a wide-angle lens WL of which angle of view is 77° or more, F number is about 2.8, front cell lens diameter is small, and entire lens system is compact, telecentric characteristic is high and image forming performing is good, can be implemented.

Here the conditional expression (1) is a conditional expression to specify an appropriate distance, on the optical axis, from the image side lens surface of the fourth lens L4 to the object side lens surface of the fifth lens L5. If the condition is below the lower limit value of the conditional expression (1), it is difficult to correct coma aberration, which is not desirable. Furthermore, the position of the exit pupil shifts to the image side, and the telecentric characteristic is diminished, and the light receiving efficiency of the picture element drops, which is not desirable. If the condition exceeds the upper limit value of the conditional expression (1), on the other hand, it is difficult to correct distortion, which is not desirable. By satisfying the conditional expression (1), aberrations can be corrected well while maintaining a good telecentric characteristic.

To assure the effect of this invention, it is preferable that the lower limit value of the conditional expression (1) is 0.22. To further assure the effect of this invention, it is preferable that the lower limit value of the conditional expression (1) is 0.25. And to still further assure the effect of this invention, it is preferable that the lower limit value of the conditional expression (1) is 0.34. On the other hand, to further assure the effect of this invention, it is desirable that the upper limit value of the conditional expression (1) is 0.59. And to further assure the effect of this invention, it is preferable that the upper limit value of the conditional expression (1) is 0.47.

In this wide-angle lens WL, it is preferable that the condition expressed by the following conditional expression (2) is satisfied:

$$3.77 < f5/f < 8.0 \tag{2}$$

where f5 denotes a focal length of the fifth lens L5.

The conditional expression (2) is a conditional expression to specify the refractive power of the fifth lens L5 in an appropriate range. If the condition is below the lower limit value of the conditional expression (2), it is difficult to correct curvature of field, which is not desirable. If the condition exceeds the upper limit value of the conditional expression (2), coma aberration is generated, which is not desirable. By satisfying the conditional expression (2), aberrations can be corrected well.

To assure the effect of this invention, it is preferable that the lower limit value of the conditional expression (2) is 4.0. To further assure the effect of this invention, it is preferable that the lower limit value of the conditional expression (2) is 4.45. On the other hand, to assure the effect of this invention, it is preferable that the upper limit value of the conditional expression (2) is 7.5. And to further assure the effect of this invention, it is preferable that the upper limit value of the conditional expression (2) is 7.0.

In this wide-angle lens WL, it is preferable that the condition expressed by the following conditional expression (3) is satisfied:

$$0.88<(-f1)/f<1.2 \quad (3)$$

where f1 denotes a focal length of the first lens.

The conditional expression (3) is a conditional expression to specify the refractive power of the first lens L1 in an appropriate range. If the condition is below the lower limit value of the conditional expression (3), the refractive power of the first lens L1, which is a negative lens, increases, and the axial incident luminous flux to the second lens L2 increases, therefore it is difficult to correct spherical aberration for each wavelength, which is not desirable. Furthermore, the rear principal point position shifts to the image side, so the total length of the optical system increases, which is not desirable. If the condition exceeds the upper limit value of the conditional expression (3), on the other hand, the refractive power of the first lens L1, which is a negative lens, decreases, and the Petzval sum increases, which makes it difficult to correct curvature of field and astigmatism simultaneously. Also the front cell lens diameter increases, which is not desirable. By satisfying the conditional expression (3), aberrations can be corrected well while keeping the total length of the optical system short.

To assure the effect of this invention, it is preferable that the lower limit value of the conditional expression (3) is 0.92. To further assure the effect of this invention, it is preferable that the lower limit value of the conditional expression (3) is 0.96. On the other hand, to assure the effect of this invention, it is preferable that the upper limit value of the conditional expression (3) is 1.17. And to further assure the effect of this invention, it is preferable that the upper limit value of the conditional expression (3) is 1.14.

In this wide-angle lens WL, it is preferable that focusing is performed from an object at infinity to an object at a finite distance by shifting the fifth lens L5 along the optical axis. Then the fluctuation of spherical aberration can be decreased upon focusing from an object at infinity to an object at a finite distance. Performing focusing by the fifth lens alone decreases the weight of the lens upon focusing, therefore quick focusing can be implemented.

In this wide-angle lens WL, it is preferable that the condition expressed by the following conditional expression (4) is satisfied:

$$0.59<d2/(-f1)<0.88 \quad (4)$$

where f1 denotes a focal length of the first lens L1, and d2 denotes an air distance between the first lens L1 and the second lens L2 on the optical axis.

The conditional expression (4) is a conditional expression to specify an appropriate air distance between the first lens L1 and the second lens L2 on the optical axis. If the condition is below the lower limit value of the conditional expression (4), the Petzval sum increases, and it is difficult to correct astigmatism and curvature of field simultaneously, which is not desirable. If the condition exceeds the upper limit value of the conditional expression (4), on the other hand, the axial incident luminous flux to the second lens L2 increases, therefore it is difficult to correct spherical aberration for each wavelength, which is not desirable. Furthermore, the total length of the optical system increases, which is not desirable. By satisfying the conditional expression (4), aberrations can be corrected well while keeping the total length of the optical system short.

To assure the effect of this invention, it is preferable that the lower limit value of the conditional expression (4) is 0.61. To further assure the effect of this invention, it is preferable that the lower limit value of the conditional expression (4) is 0.64. On the other hand, to assure the effect of this invention, it is preferable that the upper limit value of the conditional expression (4) is 0.84. And to further assure the effect of this invention, it is preferable that the upper limit value of the conditional expression (4) is 0.79.

In this wide-angle lens WL, it is preferable that the condition expressed by the following conditional expression (5) is satisfied:

$$0.88<f2/f<1.2 \quad (5)$$

where f2 is a focal length of the second lens L2.

The conditional expression (5) is a conditional expression to specify the refractive power of the second lens L2 in an appropriate range. If the condition is below the lower limit value of the conditional expression (5), the refractive power of the second lens, which is a positive lens increases, and it is difficult to correct spherical aberration for each wavelength, which is not desirable. Furthermore, the Petzval sum increase, and it is difficult to correct curvature of field and astigmatism simultaneously, which is not desirable. If the condition exceeds the upper limit value of the conditional expression (5), on the other hand, it is difficult to correct spherical aberration, which is not desirable. Furthermore, total length of the optical system increases, which is not desirable. By satisfying the conditional expression (6), Aberrations can be corrected well while keeping the total length of the optical system short.

To assure the effect of this invention, it is preferable that the lower limit value of the conditional expression (5) is 0.91. And to still further assure the effect of this invention, it is preferable that the lower limit value of the conditional expression (5) is 0.95. On the other hand, to further assure the effect of this invention, it is desirable that the upper limit value of the conditional expression (5) is 1.16. And to further assure the effect of this invention, it is preferable that the upper limit value of the conditional expression (5) is 1.11.

In this wide-angle lens WL, it is preferable that the condition expressed by the following conditional expression (6) is satisfied:

$$0.6<\Sigma D/f<0.87 \quad (6)$$

where $\Sigma D$ is a distance, on the optical axis, from the lens surface closest to the object in the second lens L2 and the lens surface closest to the image in the fourth lens L4.

The conditional expression (6) is a conditional expression to specify an appropriate distance, on the optical axis, from the lens surface closest to the object in the second lens L2 to the lens surface closest to the image in the fourth lens L4. If the condition is below the lower limit value of the conditional expression (6), it is difficult to correct spherical aberration for each wavelength, which is not desirable. If the condition exceeds the upper limit value of the conditional expression (6), on the other hand, it is difficult to correct coma aberration, and the total length of the optical system increases, which is not desirable. By satisfying the conditional expression (6), aberrations can be corrected well while keeping the total length of the optical system short.

To assure the effect of this invention, it is preferable that the lower limit value of the conditional expression (6) is 0.65. And to still further assure the effect of this invention, it is preferable that the lower limit value of the conditional expression (6) is 0.70. On the other hand, to further assure the effect of this invention, it is desirable that the upper limit value of the conditional expression (6) is 0.85. And to further assure the effect of this invention, it is preferable that the upper limit value of the conditional expression (6) is 0.83.

In this wide-angle lens WL, it is preferable that the third lens L3 and the fourth lens L4 are cemented lenses. By this configuration, longitudinal chromatic aberration and lateral chromatic aberration can be corrected well.

In this wide-range lens WL, it is preferable that the condition expressed by the following conditional expression (7) is satisfied:

$$0.87 < BF/f < 1.25 \quad (7)$$

where BF denotes back focus upon focusing on an object point at infinity.

The conditional expression (7) is a conditional expression to specify an appropriate distance from the image side surface of the fifth lens to the image plane on the optical axis. If the condition is below the lower limit value of the conditional expression (7), it is difficult to correct coma aberration, which is not desirable. If the condition exceeds the upper limit value of the conditional expression (7), on the other hand, it is difficult to correct distortion, and the total length of the optical system increases, which is not desirable. By satisfying the conditional expression (7), aberrations can be corrected well while keeping the total length of the optical system short.

To assure the effect of this invention, it is preferable that the lower limit value of the conditional expression (7) is 0.90. To further assure the effect of this invention, it is preferable that the lower limit value of the conditional expression (7) is 0.93. On the other hand, to assure the effect of this invention, it is preferable that the upper limit value of the conditional expression (7) is 1.21. And to further assure the effect of this invention, it is preferable that the upper limit value of the conditional expression (7) is 1.18.

In this wide-angle lens WL, it is preferable that the condition expressed by the following conditional expression (8) is satisfied:

$$-0.1 < (Rb+Ra)/(Rb-Ra) < 1.9 \quad (8)$$

where Ra denotes radius of curvature of the object side lens surface of the fifth lens L5, and Rb denotes radius of curvature of the image side lens surface of the fifth lens L5.

The conditional expression (8) is a conditional expression to specify an appropriate range of the shape of the fifth lens. If the condition is below the lower limit value of the conditional expression (8), it is difficult to correct coma aberration, which is not desirable. Also it is difficult to correct curvature of field, which is not desirable. Furthermore, the telecentric characteristic is diminished, which is not desirable. If the condition exceeds the upper limit value of the conditional expression (8), on the other hand, it is difficult to correct curvature of field, which is not desirable. By satisfying the conditional expression (8), aberrations can be corrected well while maintaining a good telecentric characteristic.

To assure the effect of this invention, it is preferable that the lower limit value of the conditional expression (8) is −0.05. To further assure the effect of this invention, it is preferable that the lower limit value of the conditional expression (8) is 0.0. On the other hand, to assure the effect of this invention, it is preferable that the upper limit value of the conditional expression (8) is 1.7. And to further assure the effect of this invention, it is preferable that the upper limit value of the conditional expression (8) is 1.4.

In this wide-angle lens WL, it is preferable that the condition expressed by the following conditional expression (9) is satisfied:

$$0.01 < (n3-n4) \quad (9)$$

where n3 denotes a refractive index of the third lens L3 at d-line ($\lambda$=587.6 nm), and n4 denotes a refractive index of the fourth lens L4 at d-line.

The conditional expression (9) is a conditional expression to specify an appropriate range of the difference of the refractive indexes of the third lens L3 and the fourth lens L4. If the condition is below the lower limit value of the conditional expression (9), it is difficult to correct spherical aberration and longitudinal chromatic aberration, unless the refractive power of the third lens L3 is increased, which is not desirable.

To assure the effect of this invention, it is preferable that the lower limit value of the conditional expression (9) is 0.04. And to further assure the effect of this invention, it is preferable that the lower limit value of the conditional expression (9) is 0.075.

In this wide-angle lens WL, it is preferable that the condition expressed by the following expression (10) is satisfied:

$$-2.00 < (0.07(v1-v2)-n1) \quad (10)$$

where v1 is an Abbe number of the first lens L1 at d-line ($\lambda$=587.6 nm), v2 is an Abbe number of the second lens L2 at d-line, and n1 is a refractive index of the first lens L1 at d-line.

The conditional expression (10) is a conditional expression to specify an appropriate range of an Abbe number of the first lens L1. If the condition is below the lower limit value of the conditional expression (10), it is difficult to correct the longitudinal chromatic aberration and lateral chromatic aberration, which is not desirable. By satisfying the conditional expression (10), aberrations can be corrected well.

To assure the effect of this invention, it is preferable that the lower limit value of the conditional expression (10) is −1.50. And to further assure the effect of this invention, it is preferable that the lower limit value of the conditional expression (10) is −1.00.

In this wide-angle lens WL, it is preferable that the first lens L1 has an aspherical surface. By this, distortion and curvature of field can be corrected well. Furthermore, the refractive power of the negative lens can be decreased, so the aperture ratio (F number) can be increased.

In this wide-angle lens WL, it is preferable that the lens surface closest to the image in the fourth lens L4 is aspherical. By this, spherical aberration can be corrected well.

In this wide-angle lens WL, it is preferable that the condition expressed by the following conditional expression (11) is satisfied:

$$0.87 < (-f1)/f2 < 1.19 \quad (11)$$

where f2 is a focal length of the second lens L2.

The conditional expression (11) is a conditional expression to specify an appropriate range of a ratio of refractive powers between the first lens L1 and the second lens L2. If the condition is below the lower limit value of the conditional expression (11), the refractive power of the first lens L1 with respect to the second lens L2 increases, and it is difficult to correct spherical Aberration for each wavelength, which is not desirable. Furthermore, the total length of the optical system increases, which is not desirable. If the condition exceeds the upper limit value of the conditional expression (11), on the other hand, the refractive power of the first lens L1 with respect to the second lens L2 decreases, and the Petzval sum increases, therefore it is difficult to correct curvature of field and astigmatism simultaneously, which is not desirable. Also the front cell lens diameter increases, which is not desirable. By satisfying the conditional expression (11), aberrations can be corrected well while keeping the front cell lens diameter and the total length of the optical system short.

To assure the effect of this invention, it is preferable that the lower limit value of the conditional expression (11) is 0.90. To further assure the effect of this invention, it is preferable that the lower limit value of the conditional expression (11) is 0.94. On the other hand, to assure the effect of this invention, it is preferable that the upper limit value of the conditional expression (11) is 1.16. And to further assure the effect of this invention, it is preferable that the upper limit value of the conditional expression (11) is 1.12.

Figure 22:
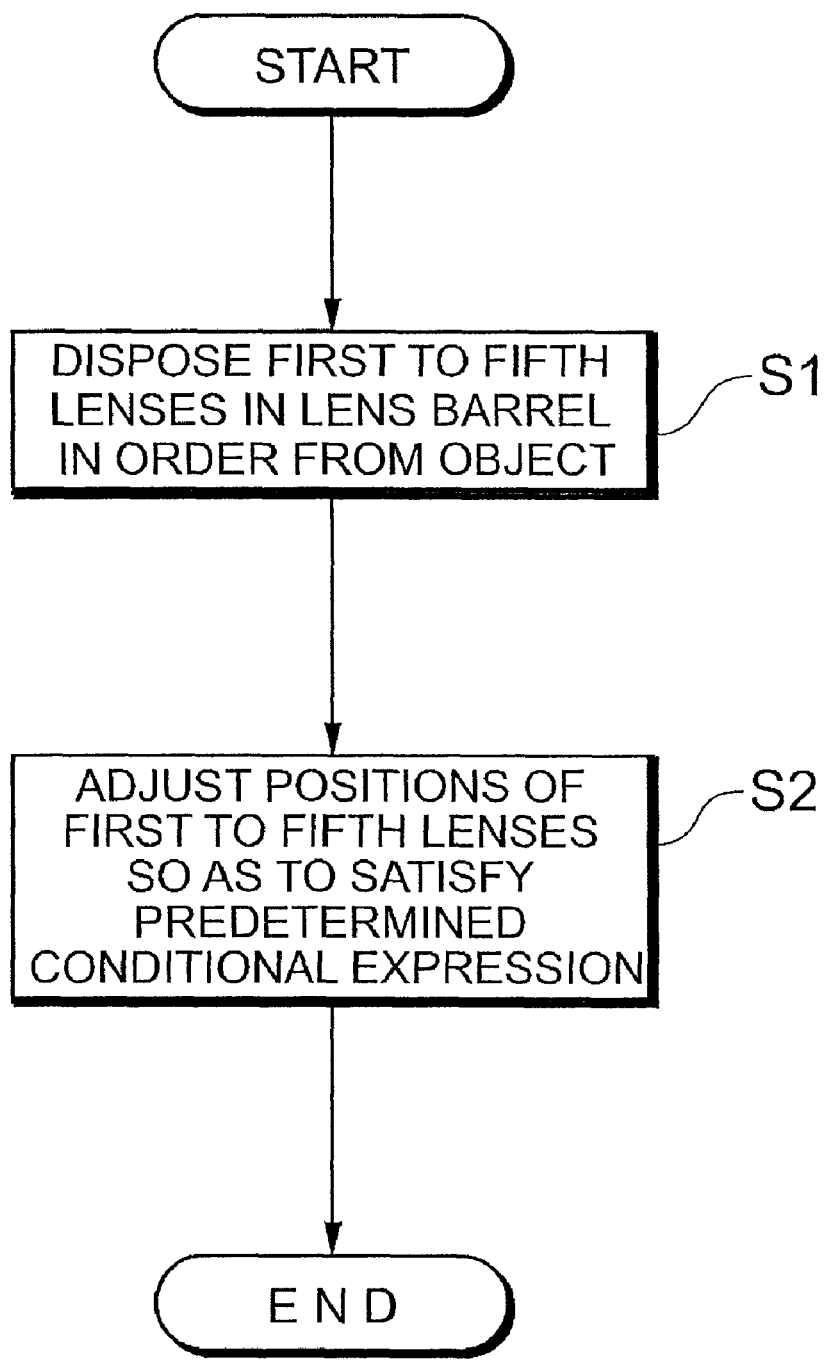
FIG. 22 is a flow chart depicting a method for manufacturing the wide-angle lens.

A method for manufacturing the above mentioned wide-angle lens WL according to the above mentioned first embodiment will be described with reference to FIG. 22. First a first lens which is a negative meniscus lens having a convex surface facing the object, a second lens which is a positive lens, a third lens which is a negative lens, a fourth lens which is a positive lens, and a fifth lens which is a positive lens, are disposed, in order from an object, in a cylindrical lens barrel (step S1). When each lens is assembled into the lens barrel, each lens group may be assembled in the lens barrel one at a time in order along the optical axis, or a part or all of the lens groups may be integratedly held on a holding member, and then assembled in this lens barrel. Then the positioning of these first to fifth lenses is adjusted so as to satisfy the following conditional expression (step S2).

$$0.2 < d8/f < 0.64$$

d8: an air distance, between the fourth lens and the fifth lens, on the optical axis, upon focusing on an object point at infinity
f: a focal length of the lens system upon focusing on an object point at infinity Note that it is checked whether the object image is formed in the state after the positions are adjusted, that is, whether the center of each lens group is aligned, and then various operations of the wide-angle lens WL are checked.

Examples of the various operations are: a focusing operation in which a lens, which performs focusing from an object at a long distance to an object at a short distance (fifth lens L5 in this embodiment), moves along the optical axis; and a hand motion blur correction operation, in which at least a part of the lenses move to have a component orthogonal to the optical axis. The sequence of checking the various operations is arbitrary. According to this manufacturing method, a wide-angle lens WL, which is compact and still has good image forming performance, can be implemented.

Example 1 to Example 5 of the above mentioned first embodiment will now be described in concrete terms.

EXAMPLE 1

Example 1 of the first embodiment will now be described with reference to FIG. 1, FIG. 2 and Table 1. FIG. 1 is a diagram depicting a configuration of a wide-angle lens according to Example 1 upon focusing on infinity. The wide-angle lens WL according to Example 1 comprises, in order from an object, a first lens L1 which is a negative meniscus lens having a convex surface facing the object, a second lens L2 which is a positive lens, a third lens L3 which is a negative lens, a fourth lens L4 which is a positive lens, and a fifth lens L5 which is a positive lens. An aperture stop S is disposed between the second lens L2 and the third lens L3. Focusing from an object at infinity to an object at a finite distance is performed by shifting the fifth lens L5 to the object side along the optical axis. The third lens L3 and the fourth lens L4 are cemented lenses.

In Example 1, the image side lens surface in the first lens L1 is aspherical. And the image side lens surface in the fourth lens L4 is aspherical.

Table 1 to Table 5 shown below are tables listing the values of data on the wide-angle lenses according to Example 1 to Example 5. In [General Data] in each table, f is a focal length upon focusing on infinity, FNO is an F number upon focusing on infinity, 2ω is an angle of view upon focusing on infinity, Y is a maximum image height, BF is a back focus upon focusing on infinity, TL is a total lens length upon focusing on infinity, f1 is a focal length of the first lens L1, f2 is a focal length of the second lens L2, and f5 is a focal length of the fifth lens L5 respectively.

In [Lens Data], the surface number is a sequence of the lens surface counted from the object, r is a radius of curvature of the lens, d is a distance between lens surfaces, nd is a refractive index at d-line (λ=587.6 nm), vd is an Abbe number at d-line (wavelength λ=587.6 nm), d8 is a variable distance to the next lens surface, and BF is a back focus. In [Lens Data], "*" is attached to the surface number if the lens is an aspherical lens, "∞" of the radius of curvature indicates a plane, and the refractive index of air "nd=1.000000" is omitted.

In [Aspherical Data], an aspherical coefficient is given by the following conditional expression (11), where y is the height in a direction perpendicular to the optical axis, X(y) is a shifted amount in the optical axis direction at height y, R is a radius of curvature (paraxial radius of curvature) of a reference spherical surface, κ is a conical coefficient, and An is an aspherical coefficient in degree n (n=4, 6, 8, 10):

$$X(y) = (y^2/R)/[1+\{1-\kappa \times (y^2/R^2)\}^{1/2}] + A4 \times y^4 + A6 \times y^6 + A8 \times y^8 + A10 \times y^{10} \quad (11)$$

In each example, the aspherical coefficient A2 of degree 2 is 0, and is omitted. In [Aspherical Data], "E-n" is "×10⁻ⁿ".

In [Variable Distance Data], f is a focal length upon focusing on infinity, β is a photographing magnification, and d8 is a variable surface distance value corresponding to each focal length and photographing magnification respectively. The [Conditional Expression Correspondence Value] shows the correspondence value of each conditional expression respectively.

"mm" is normally used for the unit of focal length f, radius of curvature r and other lengths in all the data values herein below, but another appropriate unit may be used instead, since an equivalent optical performance is obtained even if an optical system is proportionally expanded or proportionally reduced. The same symbols as this example are used in the data values of Example 2 to Example 5 to be described below.

The above descriptions of [General Data], [Lens Data], [Aspherical Data], [Variable Distance Data] and [Conditional Expression Correspondence Value] are the same for Table 6 to Table 10 in the later mentioned second embodiment.

Table 1 shows each data of Example 1. The surface numbers 1 to 10 in Table 1 correspond to surfaces 1 to 10 in FIG.

1. In Example 1, the second lens surface and the eighth lens surface are formed to be aspherical.

TABLE 1

[General Data]

f = 18.68255
FNO = 2.85
2ω = 77.8
Y = 14.75
BF = 18.94212
TL = 58.1693
f1 = −19.74578
f2 = 18.91566
f5 = 102.60038

[Lens Data]

| Surface Number | r | d | nd | νd |
|---|---|---|---|---|
| 1 | 32.7067 | 1.6000 | 1.58913 | 61.25 |
| 2* | 8.4253 | 14.4960 | | |
| 3 | 16.0573 | 3.2000 | 1.78800 | 47.38 |
| 4 | −189.5564 | 3.9592 | | |
| 5 | ∞ | 2.7000 | (aperture stop S) | |
| 6 | −42.2574 | 1.0000 | 1.69895 | 30.13 |
| 7 | 10.8055 | 3.5000 | 1.58913 | 61.25 |
| 8* | −20.3635 | d8 | | |
| 9 | 81.0967 | 1.9300 | 1.69680 | 55.53 |
| 10 | −597.7365 | BF | | |

[Aspherical Data]

Second surface

κ = −0.1694
A4 = 1.75200E−04
A6 = 7.97520E−07
A8 = −2.35590E−09
A10 = 7.42560E−11

Eighth surface

κ = 1.0000
A4 = 1.00670E−04
A6 = 8.24680E−07
A8 = −1.29300E−08
A10 = 4.44560E−10

[Variable Distance Data]

| f or β | 18.68255 | × − 1/30 | × − 1/10 |
|---|---|---|---|
| d8 | 6.84196 | 5.13322 | 2.03596 |

[Conditional Expression Correspondence Value]

Conditional expression (1) d8/f = 0.36622
Conditional expression (2) f5/f = 5.49178
Conditional expression (3) (−f1)/f = 1.05691
Conditional expression (4) d2/(−f1) = 0.73413
Conditional expression (5) f2/f = 1.01248
Conditional expression (6) ΣD/f = 0.76859
Conditional expression (7) BF/f = 1.01389
Conditional expression (8) (Rb + Ra)/(Rb − Ra) = 0.76107
Conditional expression (9) n3 − n4 = 0.10982
Conditional expression (10) 0.07 (ν1 − ν2) − n1 = −0.61823
Conditional expression (11) (−f1)/f2 = 1.04389

In this way, all of the conditional expressions (1) to (11) are satisfied in this example.

Figure 2A:
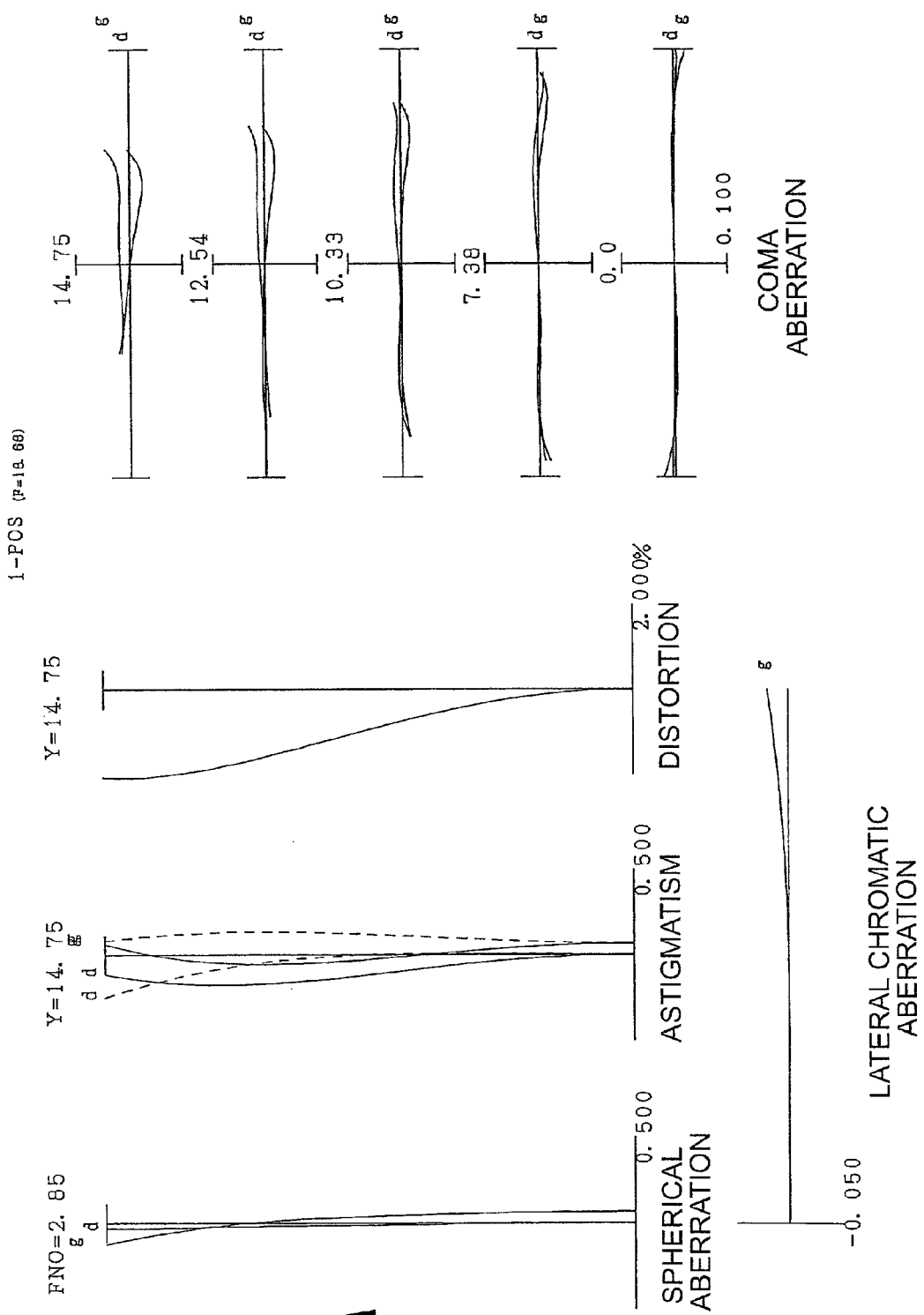
FIG. 2A are graphs showing various aberrations of the wide-angle lens according to Example 1 upon focusing on infinity, FIG. 2B are graphs showing various aberrations when a photographic magnification of the wide-angle lens of Example 1 is $\times-1/30$, and FIG. 2C are graphs showing various aberrations when a photographic magnification of the wide-angle lens of Example 1 is $\times-1/10$.
Figure 2B:
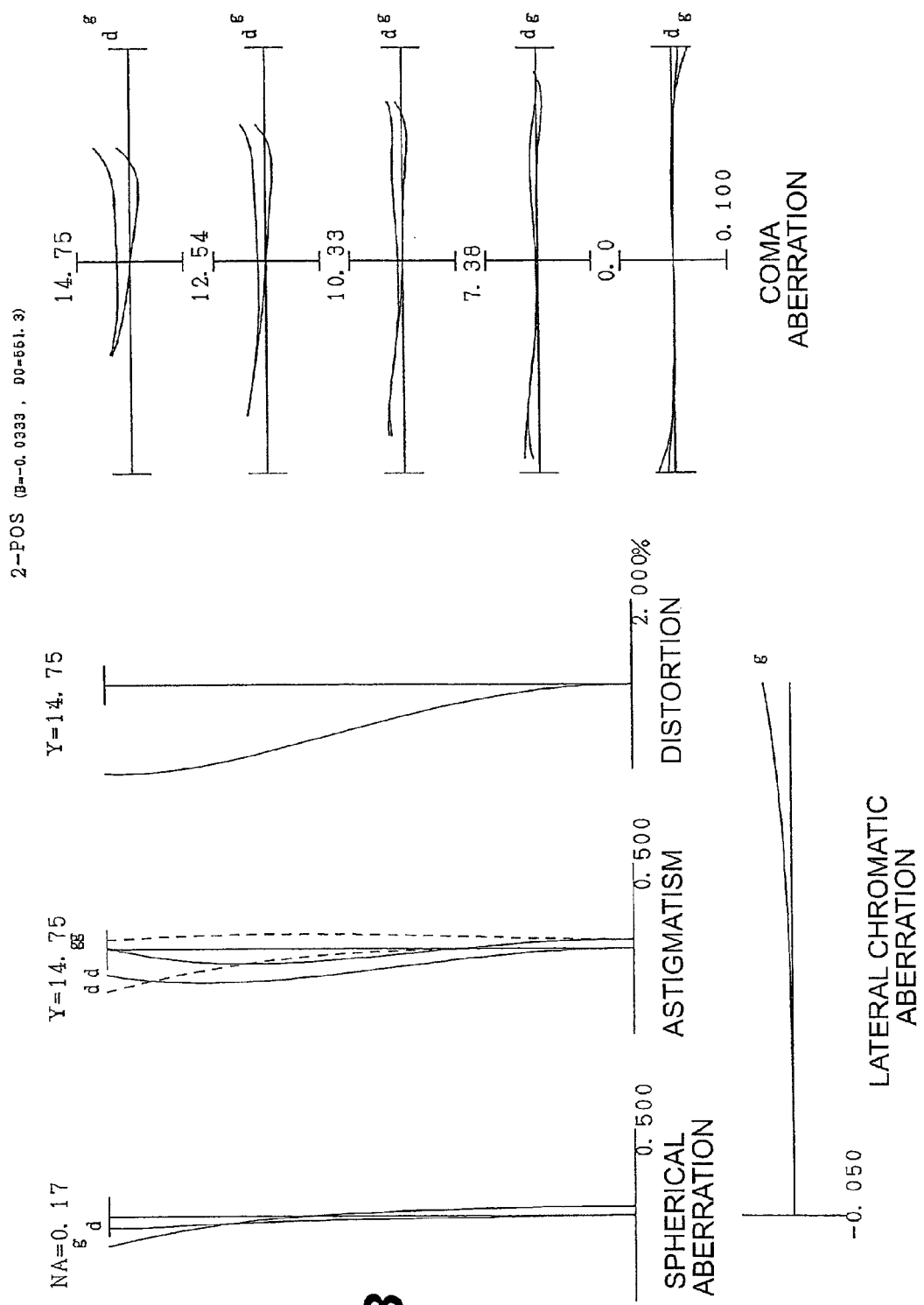
Figure 2C:
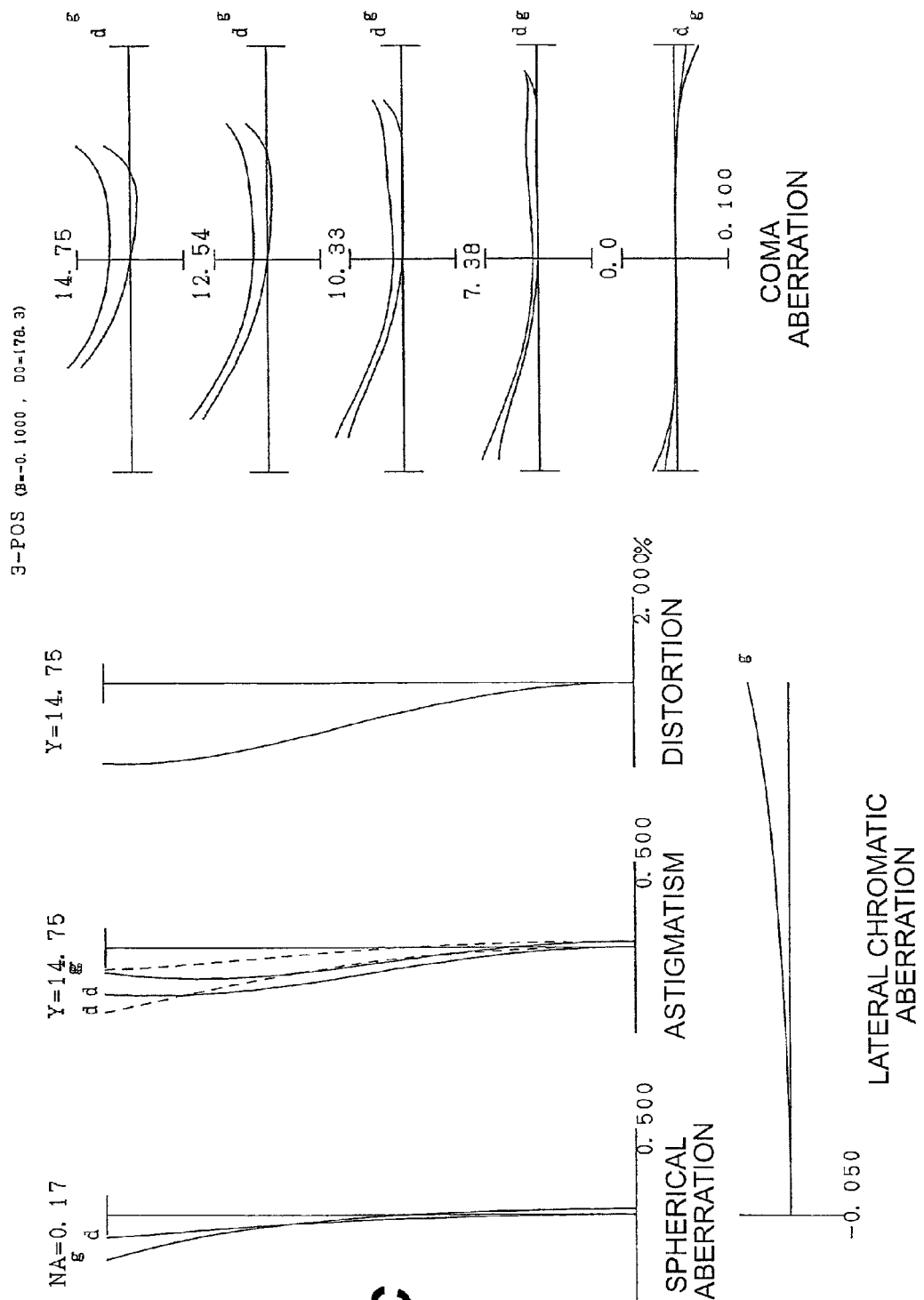

FIG. 2A to 2C are graphs showing various aberrations of the wide-angle lens WL according to Example 1. In other words, FIG. 2A are graphs showing various aberrations of the wide-angle lens WL upon focusing on infinity, FIG. 2B are graphs showing various aberrations of the wide-angle lens WL when the photographing magnification is ×−1/30, and FIG. 2C are graphs showing various aberrations of the wide-angle lens WL when the photographing magnification is ×−1/10. In each graph showing aberrations, FNO denotes an F number, NA denotes a numerical aperture, and Y denotes an image height. In the graph showing astigmatism and the graph showing distortion, a maximum value of the image height Y is shown. In each graph showing aberrations, d and g denote d-line (λ=587.6 nm) and g-line (λ=435.8 nm). In the graph showing astigmatism, the solid line indicates the sagittal image surface, and the dotted line indicates the meridional image surface. The graph showing coma aberration shows the coma aberrations at each image height. The same symbols are used for the other examples, for which the following description is omitted.

As seen in each graph showing aberrations, various aberrations are corrected well throughout the entire object distance range, indicating good optical performance possessed by the wide-angle lens according to Example 1. As a result, excellent optical performance can be assured for a digital still camera CAM which has wide-angle lens WL of Example 1 as well.

EXAMPLE 2

Figure 3:
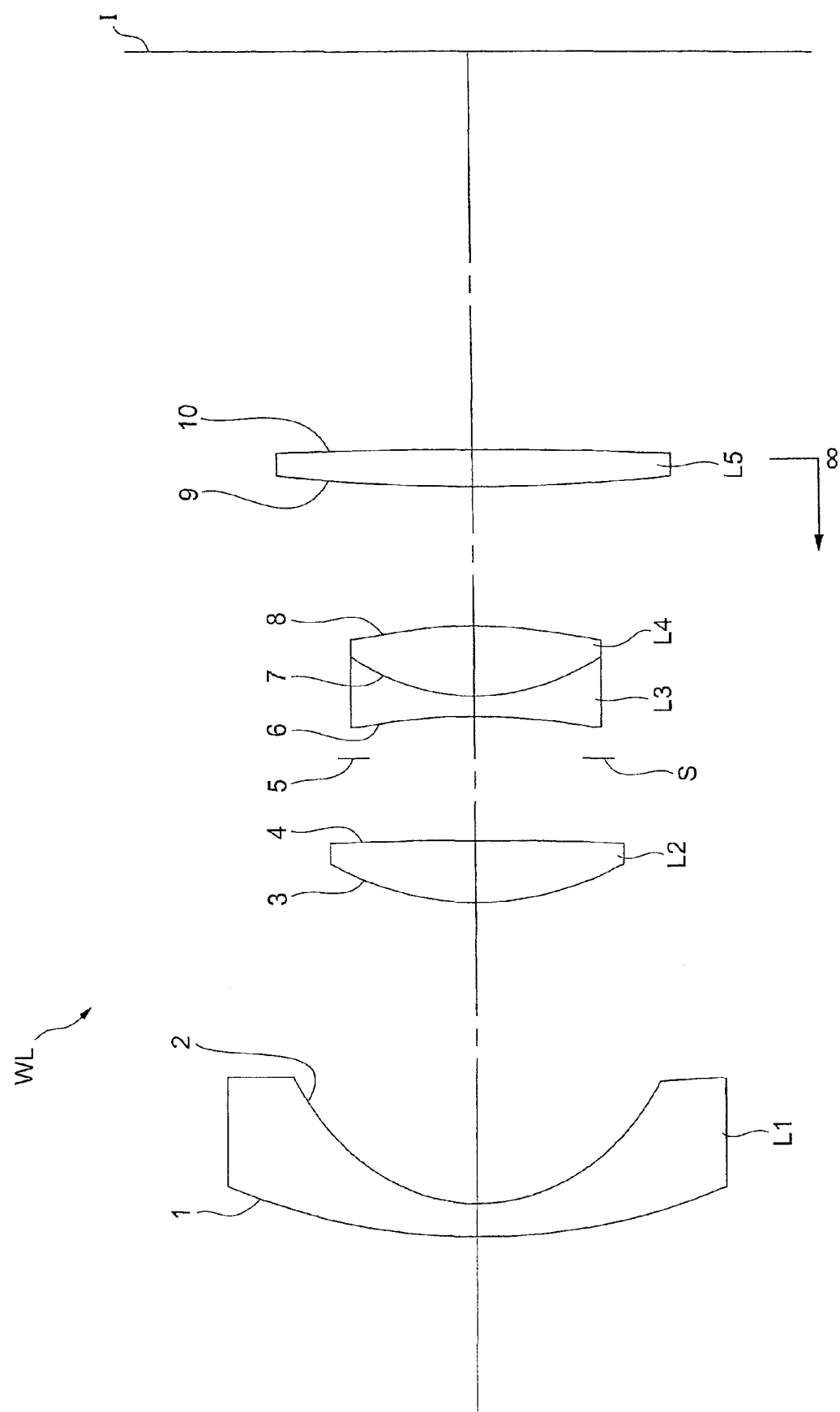
FIG. 3 is a diagram depicting a configuration of a wide-angle lens according to Example 2 upon focusing on infinity.

Example 2 will now be described with reference to FIG. 3, FIG. 4 and Table 2. FIG. 3 is a diagram depicting a configuration of the wide-angle lens according to Example 2 upon focusing on infinity. The wide-angle lens of Example 2 has a same configuration as the wide-angle lens of Example 1, and therefore each composing element is denoted with the same reference symbol as Example 1, and detailed description thereof is omitted.

Table 2 shows each data of Example 2. The surface numbers 1 to 10 in Table 2 correspond to the surfaces 1 to 10 in FIG. 3. In Example 2, the second lens surface and the eighth lens surface are formed to be aspherical.

TABLE 2

[General Data]

f = 18.70551
FNO = 2.82
2ω = 77.7
Y = 14.75
BF = 19.09891
TL = 57.12891
f1 = −20.20899
f2 = 18.24057
f5 = 90.00000

[Lens Data]

| Surface Number | r | d | nd | νd |
|---|---|---|---|---|
| 1 | 30.94749 | 1.6000 | 1.58913 | 61.25 |
| 2* | 8.43321 | 14.49000 | | |
| 3 | 14.04993 | 3.0000 | 1.71999 | 50.23 |
| 4 | −183.25309 | 4.0000 | | |
| 5 | ∞ | 2.0000 | (Aperture stop S) | |
| 6 | −30.30386 | 1.0000 | 1.67270 | 32.11 |
| 7 | 10.31474 | 3.4000 | 1.58913 | 61.25 |
| 8* | −20.40742 | d8 | | |
| 9 | 85.30000 | 1.8000 | 1.69680 | 55.53 |
| 10 | −234.76968 | BF | | |

[Aspherical Data]

Second surface

κ = −0.3582
A4 = 2.14010E−04
A6 = 7.78360E−07
A8 = −3.74070E−09
A10 = 9.22750E−11

TABLE 2-continued

Eighth surface

κ = 1.0000
A4 = 1.32620E−04
A6 = 3.05310E−07
A8 = 1.94060E−08
A10 = 1.38120E−10

[Variable Distance Data]

| f or β | 18.70551 | x − 1/30 | x − 1/10 |
|---|---|---|---|
| d8 | 6.74000 | 5.20535 | 2.39568 |

[Conditional Expression Correspondence Value]

Conditional expression (1) d8/f = 0.36032
Conditional expression (2) f5/f = 4.81142
Conditional expression (3) (−f1)/f = 1.08038
Conditional expression (4) d2/(−f1) = 0.71701
Conditional expression (5) f2/f = 0.97514
Conditional expression (6) ΣD/f = 0.71637
Conditional expression (7) BF/f = 1.02103
Conditional expression (8) (Rb + Ra)/(Rb − Ra) = 0.46699
Conditional expression (9) n3 − n4 = 0.08357
Conditional expression (10) 0.07 (ν1 − ν2) − n1 = −0.81773
Conditional expression (11) (−f1)/f2 = 1.10791

In this way, all the conditional expressions (1) to (11) are satisfied in this example.

Figure 4A:
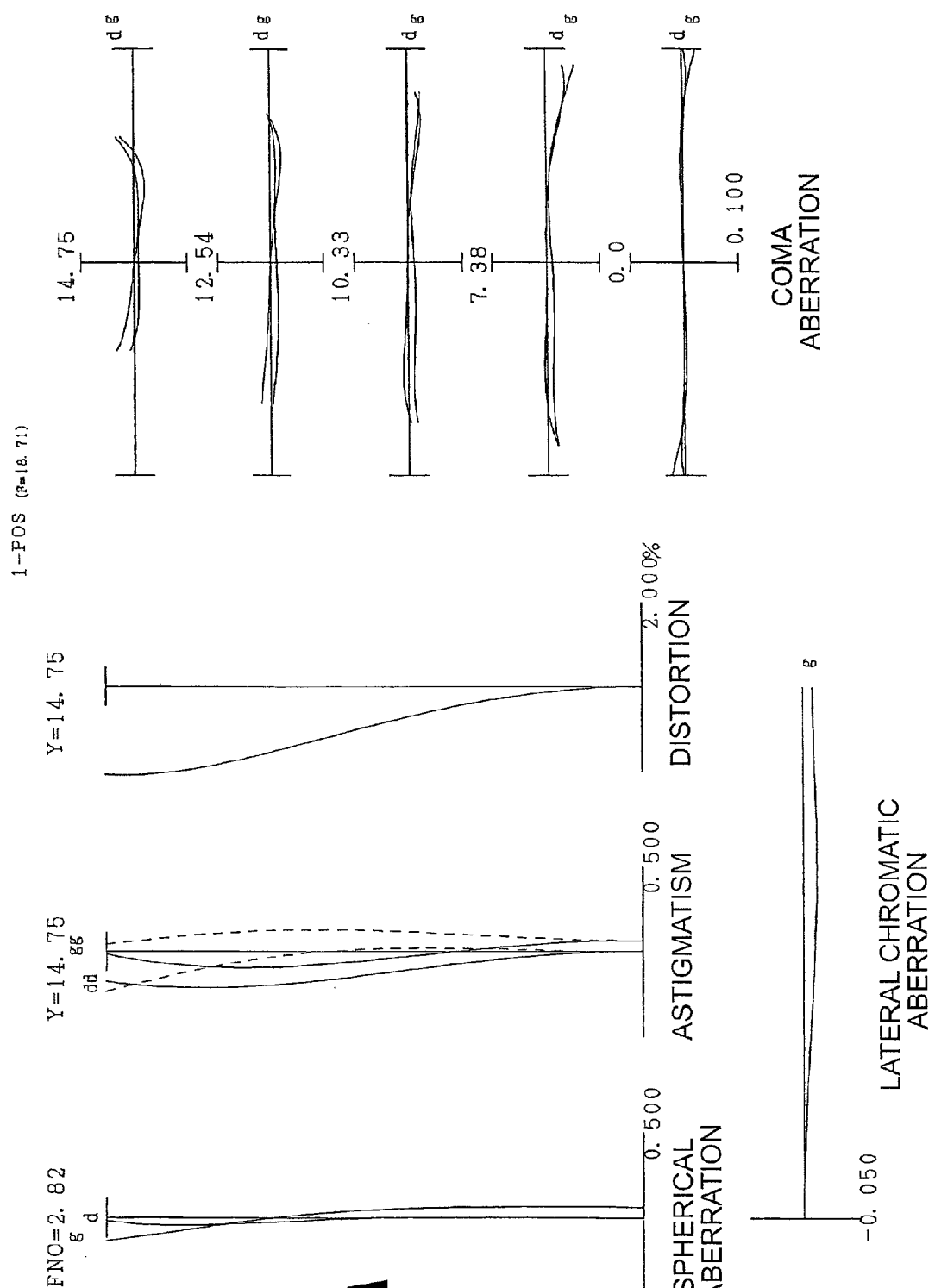
FIG. 4A are graphs showing various aberrations of the wide-angle lens according to Example 2 upon focusing on infinity, FIG. 4B are graphs showing various aberrations when a photographic magnification of the wide-angle lens of Example 2 is $\times-1/30$, and FIG. 4C are graphs showing various aberrations when a photographic magnification of the wide-angle lens of Example 2 is $\times-1/10$.
Figure 4B:
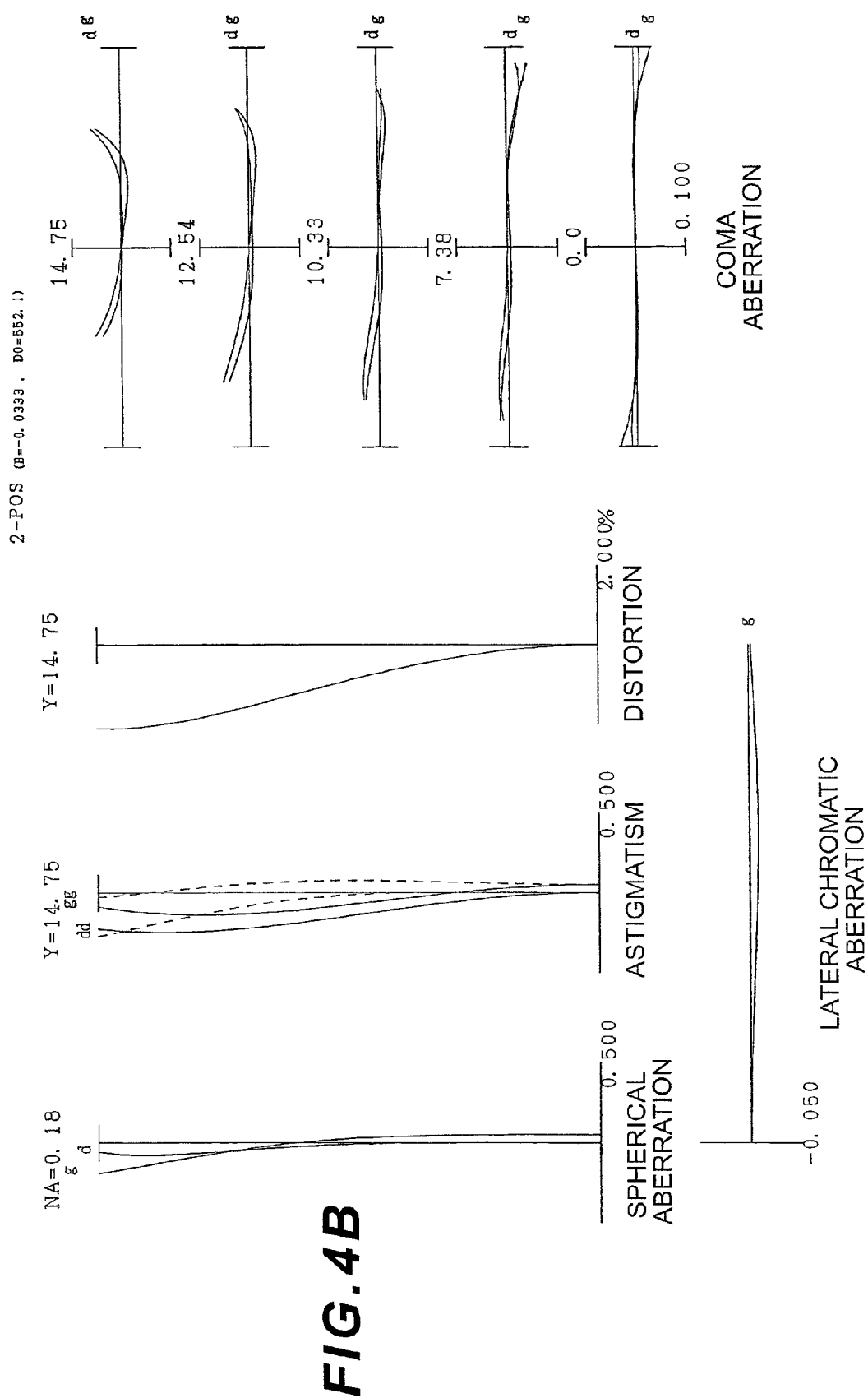
Figure 4C:
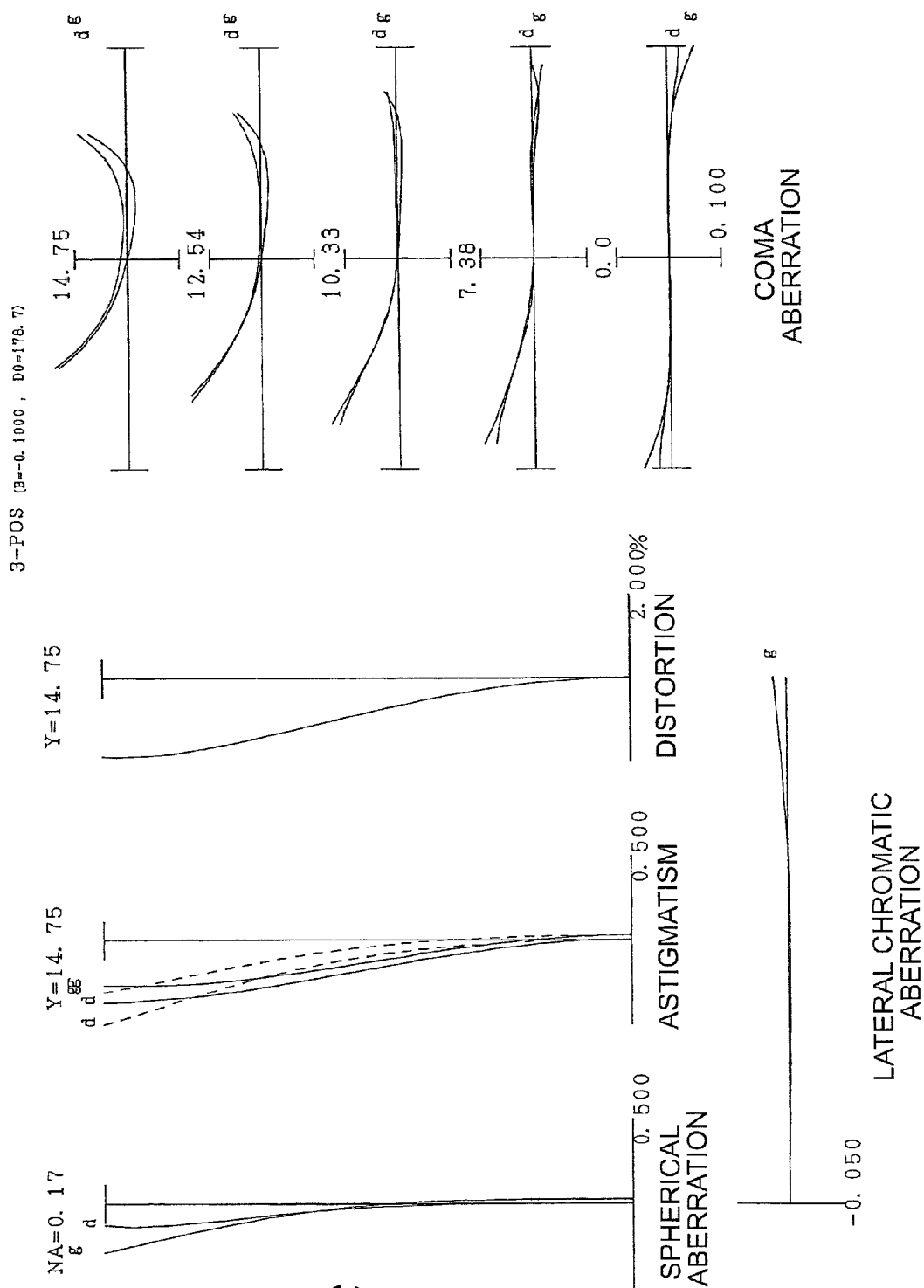

FIG. 4A to 4C are graphs showing various aberrations of the wide-angle lens WL according to Example 2. In other words, FIG. 4A are graphs showing various aberrations of the wide-angle lens WL upon focusing on infinity, FIG. 4B are graphs showing various aberrations of the wide-angle lens WL when the photographing magnification is x−1/30, and FIG. 4C are graphs showing various aberrations of the wide-angle lens WL when the photographing magnification is x−1/10. As seen in each graph showing aberrations, various aberrations are corrected well throughout the entire object distance range, indicating good optical performance possessed by the wide-angle lens according to Example 2. As a result, excellent optical performance can be assured for a digital still camera CAM which has the wide-angle lens WL of Example 2 as well.

EXAMPLE 3

Example 3 will now be described with reference to FIG. 5, FIG. 6 and Table 3. FIG. 5 is a diagram depicting a configuration of a wide-angle lens according to Example 3 upon focusing on infinity. The wide-angle lens of Example 3 has a same configuration as the wide-angle lens of Example 1, and therefore each composing element is denoted with the same reference symbol as Example 1, and detailed description thereof is omitted.

Table 3 shows each data of Example 3. The surface numbers 1 to 10 in Table 3 correspond to the surfaces 1 to 10 in FIG. 5. In Example 3, the second lens surface and the eighth lens surface are formed to be aspherical.

TABLE 3

[General Data]

f = 18.70046
FNO = 2.83
2ω = 77.7
Y = 14.75
BF = 18.01849
TL = 58.17098
f1 = −18.45568 f2 = 18.41042
f5 = 100.27080

[Lens Data]

| Surface Number | r | d | nd | vd |
|---|---|---|---|---|
| 1 | 31.2149 | 1.6000 | 1.62263 | 58.16 |
| 2* | 8.2339 | 13.9292 | | |
| 3 | 15.7751 | 3.0000 | 1.80400 | 46.58 |
| 4 | −219.6134 | 3.8908 | | |
| 5 | ∞ | 2.7000 | (Aperture stop S) | |
| 6 | −42.2996 | 1.0000 | 1.68893 | 31.07 |
| 7 | 9.6361 | 3.5000 | 1.58913 | 61.25 |
| 8* | −20.3174 | d8 | | |
| 9 | 81.0967 | 1.9300 | 1.71300 | 53.88 |
| 10 | −597.7366 | BF | | |

[Aspherical Data]

Second surface

κ = 0.5987
A4 = 1.36580E−05
A6 = 1.64240E−07
A8 = −7.45630E−10
A10 = −2.81540E−12

Eighth surface

κ = 1.0000
A4 = 1.06120E−04
A6 = 2.17560E−07
A8 = 2.75820E−08
A10 = −2.78360E−10

[Variable Distance Data]

| f or β | 18.70046 | x − 1/30 | x − 1/10 |
|---|---|---|---|
| d8 | 8.60250 | 6.85833 | 3.71664 |

[Conditional Expression Correspondence Value]

Conditional expression (1) d8/f = 0.46002
Conditional expression (2) f5/f = 5.36194
Conditional expression (3) (−f1)/f = 0.98691
Conditional expression (4) d2/(−f1) = 0.75474
Conditional expression (5) f2/f = 0.98449
Conditional expression (6) ΣD/f = 0.75350
Conditional expression (7) BF/f = 0.96353
Conditional expression (8) (Rb + Ra)/(Rb − Ra) = 0.76107
Conditional expression (9) n3 − n4 = 0.09980
Conditional expression (10) 0.07 (ν1 − ν2) − n1 = −0.81203

In this way, all the conditional expressions (1) to (10) are satisfied in this example.

Figure 6A:
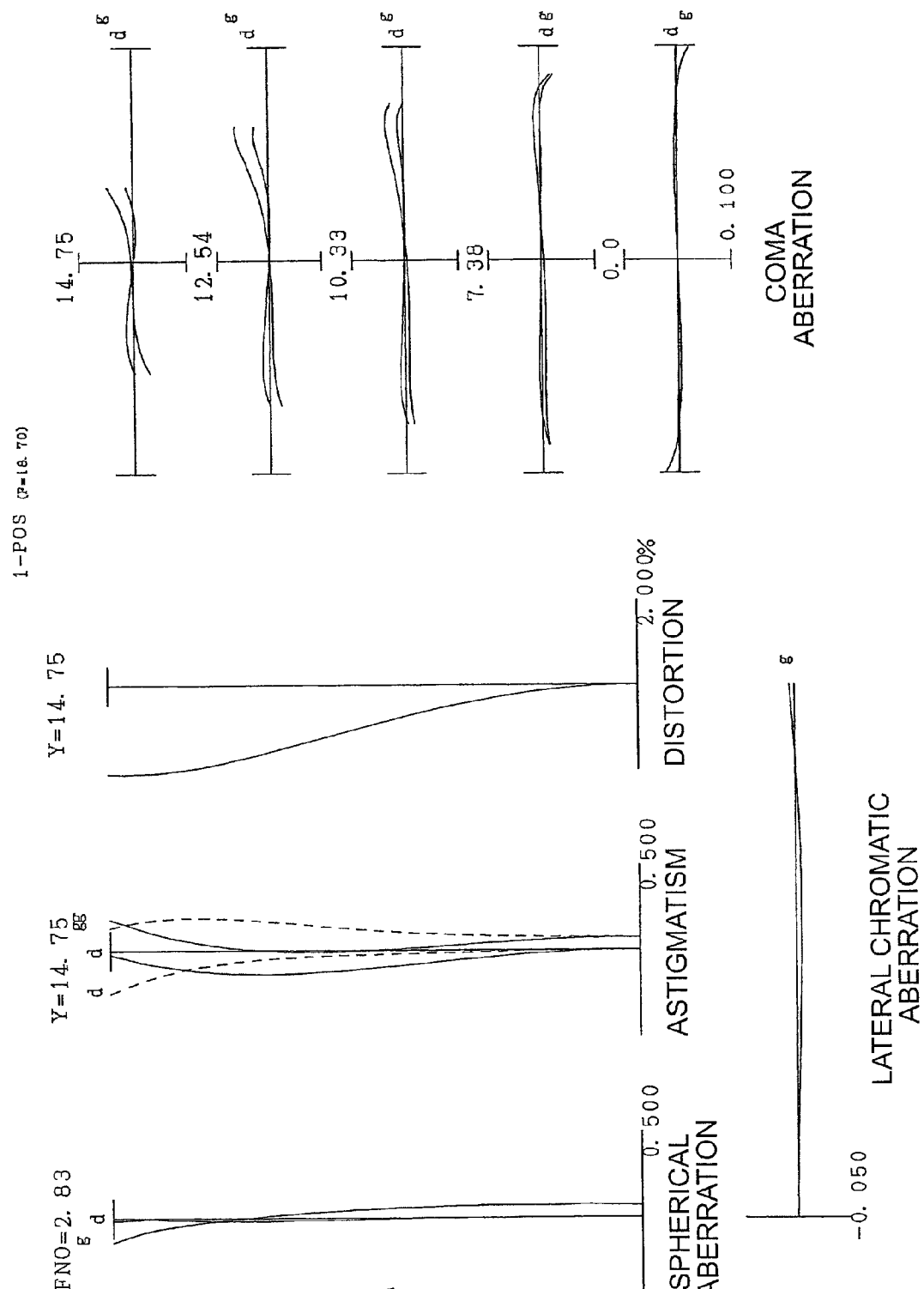
FIG. 6A are graphs showing various aberrations of the wide-angle lens according to Example 3 upon focusing on infinity, FIG. 6B are graphs showing various aberrations when a photographic magnification of the wide-angle lens of Example 3 is $\times-1/30$, and FIG. 6C are graphs showing various aberrations when a photographic magnification of the wide-angle lens of Example 3 is $\times-1/10$.
Figure 6B:
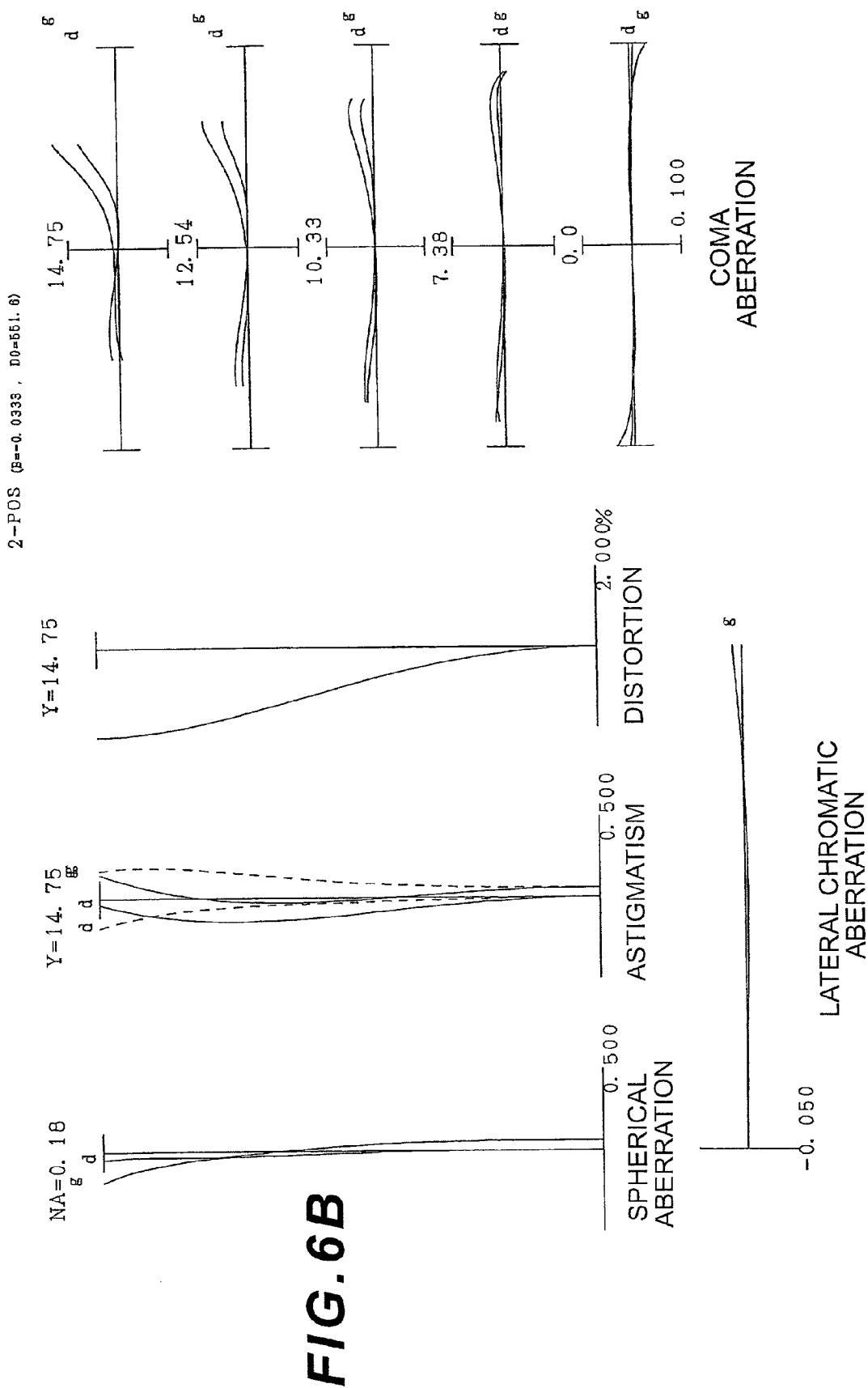
Figure 6C:
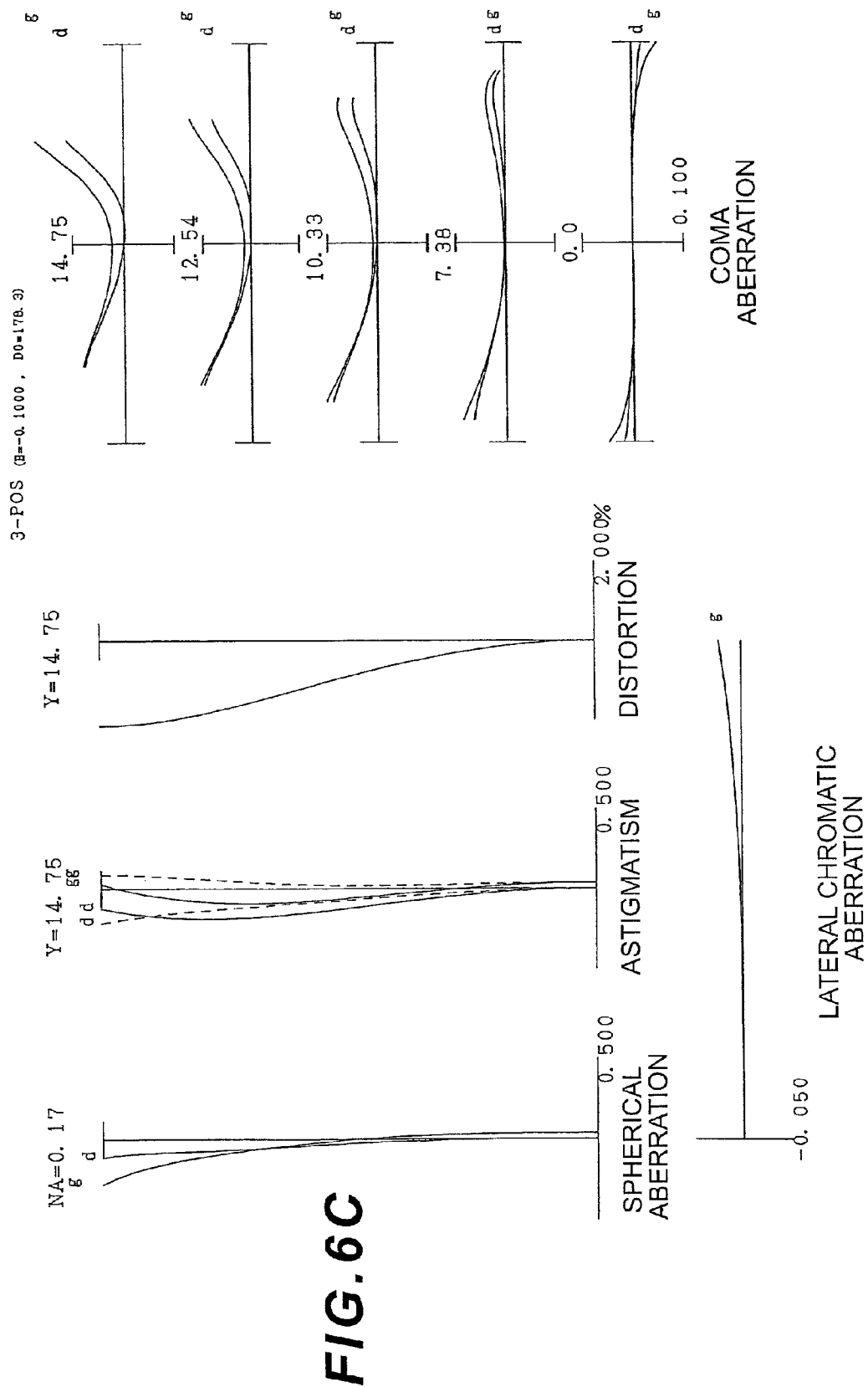

FIG. 6A to 6C are graphs showing various aberrations of the wide-angle lens WL according to Example 3. In other words, FIG. 6A are graphs showing various aberrations of the wide-angle lens WL upon focusing on infinity, FIG. 6B are graphs showing various aberrations of the wide-angle lens WL when the photographing magnification is x−1/30, and FIG. 6C are graphs showing various aberrations of the wide-angle lens WL when the photographing magnification is x−1/10. As seen in each graph showing aberrations, various aberrations are corrected well throughout the entire object distance range, indicating good optical performance possessed by the wide-angle lens according to Example 3. As a result, excellent optical performance can be assured for a digital still camera CAM which has wide-angle lens WL of Example 3 as well.

EXAMPLE 4

Example 4 will now be described with reference to FIG. 7, FIG. 8 and Table 4. FIG. 7 is a diagram depicting a configuration of the wide-angle lens according to Example 4 upon focusing on infinity. The wide-angle lens of Example 4 has a same configuration as the wide-angle lens of Example 1, and therefore each composing element is denoted with the same reference symbol as Example 1, and detailed description thereof is omitted.

Table 4 shows each data of Example 4. The surface numbers 1 to 10 in Table 4 correspond to the surfaces 1 to 10 in FIG. 7. In Example 4, the second lens surface and the eighth lens surface are formed to be aspherical.

TABLE 4

[General Data]

f = 18.70706
FNO = 2.85
2ω = 77.7
Y = 14.75
BF = 18.08349
TL = 58.04813
f1 = −21.11661
f2 = 19.03713
f5 = 98.05008

[Lens Data]

| Surface Number | r | d | nd | νd |
|---|---|---|---|---|
| 1 | 35.9517 | 1.6000 | 1.58313 | 59.46 |
| 2* | 9.0218 | 14.5343 | | |
| 3 | 16.5069 | 3.2000 | 1.80400 | 46.58 |
| 4 | −192.1907 | 3.8579 | | |
| 5 | ∞ | 2.8000 | (Aperture stop S) | |
| 6 | −35.8357 | 1.0000 | 1.67270 | 32.11 |
| 7 | 10.0697 | 4.2000 | 1.59201 | 67.02 |
| 8* | −20.3713 | d8 | | |
| 9 | 140.0000 | 1.9300 | 1.72916 | 54.66 |
| 10 | −145.2578 | BF | | |

[Aspherical Data]

Second surface

κ = −0.3706
A4 = 1.85300E−04
A6 = 2.68380E−07
A8 = 2.02160E−09
A10 = 2.76540E−11

Eighth surface

κ = 1.0000
A4 = 9.78670E−05
A6 = 5.22880E−07
A8 = −1.06250E−08
A10 = 4.22630E−10

[Variable Distance Data]

| f or β | 18.70706 | x − 1/30 | x − 1/10 |
|---|---|---|---|
| d8 | 6.84247 | 5.10401 | 1.97690 |

[Conditional Expression Correspondence Value]

Conditional expression (1) d8/f = 0.36577
Conditional expression (2) f5/f = 5.24134
Conditional expression (3) (−f1)/f = 1.12880
Conditional expression (4) d2/(−f1) = 0.68829
Conditional expression (5) f2/f = 1.01764
Conditional expression (6) ΣD/f = 0.80493
Conditional expression (7) BF/f = 0.96667
Conditional expression (8) (Rb + Ra)/(Rb − Ra) = 0.01843
Conditional expression (9) n3 − n4 = 0.08069
Conditional expression (10) 0.07 (ν1 − ν2) − n1 = −0.68153

In this way, all the conditional expressions (1) to (10) are satisfied in this example.

Figure 8A:
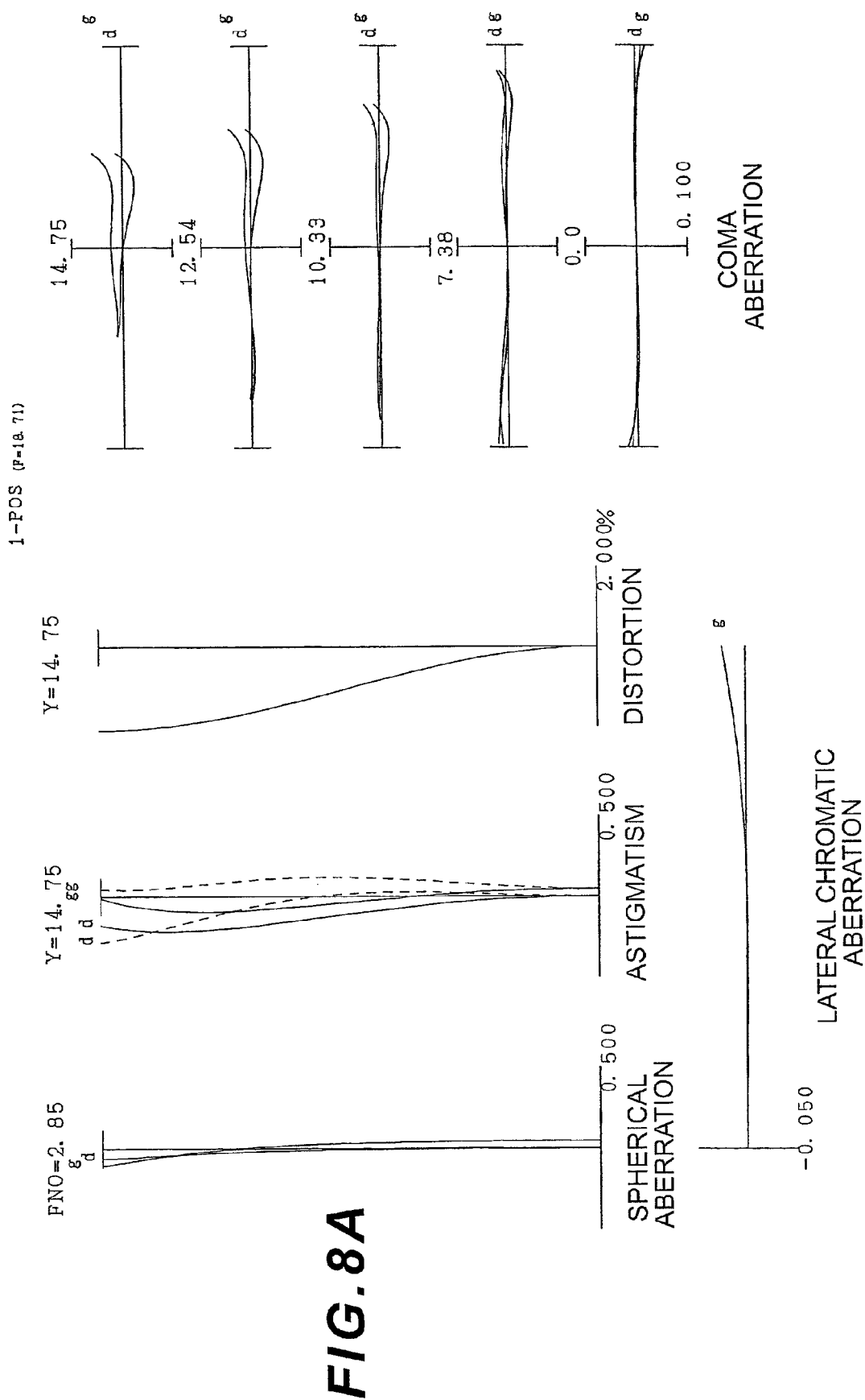
FIG. 8A are graphs showing various aberrations of the wide-angle lens according to Example 4 upon focusing on infinity, FIG. 8B are graphs showing various aberrations when a photographic magnification of the wide-angle lens of Example 4 is $\times-1/30$, and FIG. 8C are graphs showing various aberrations when a photographic magnification of the wide-angle lens of Example 4 is $\times-1/10$.
Figure 8B:
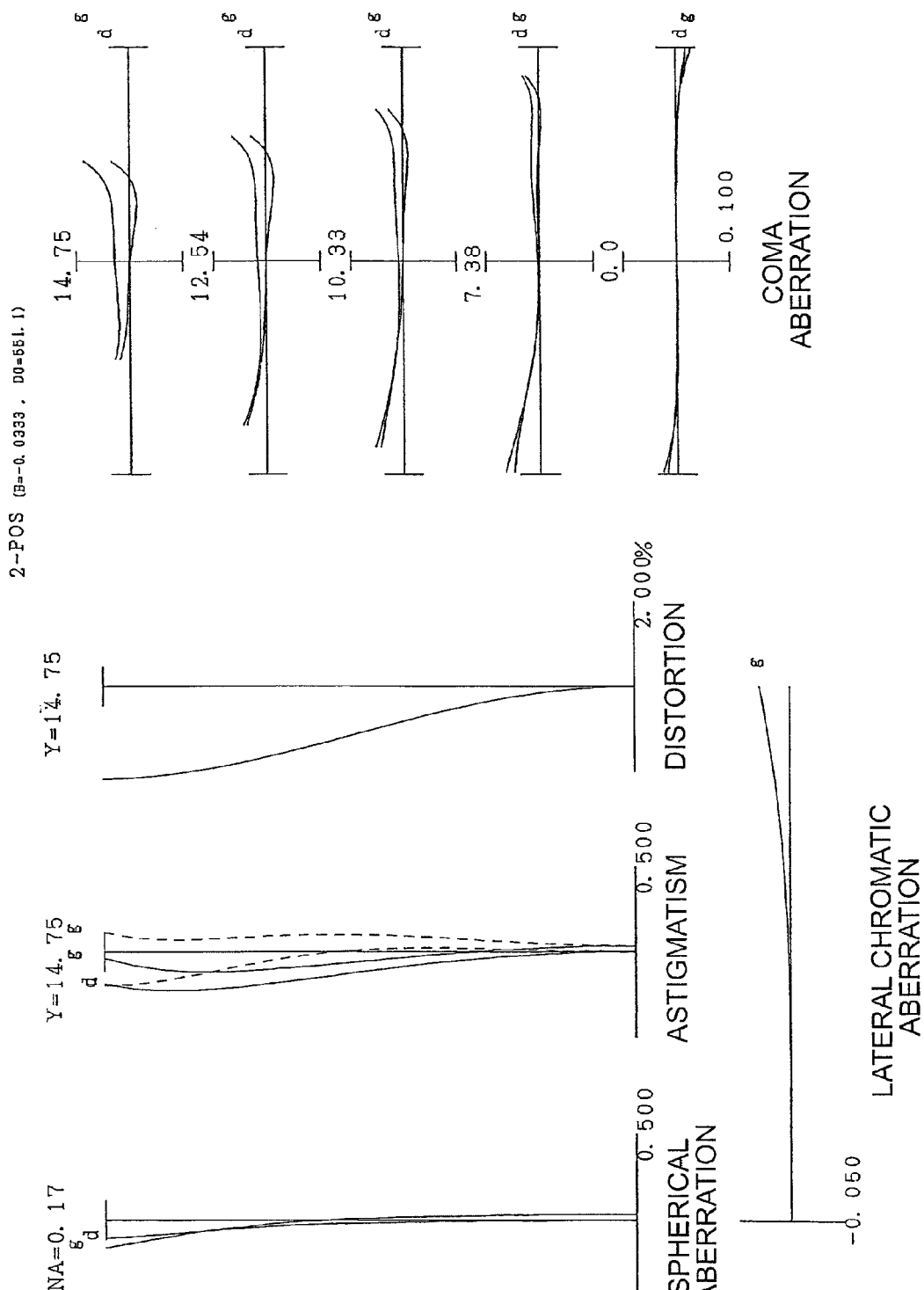
Figure 8C:
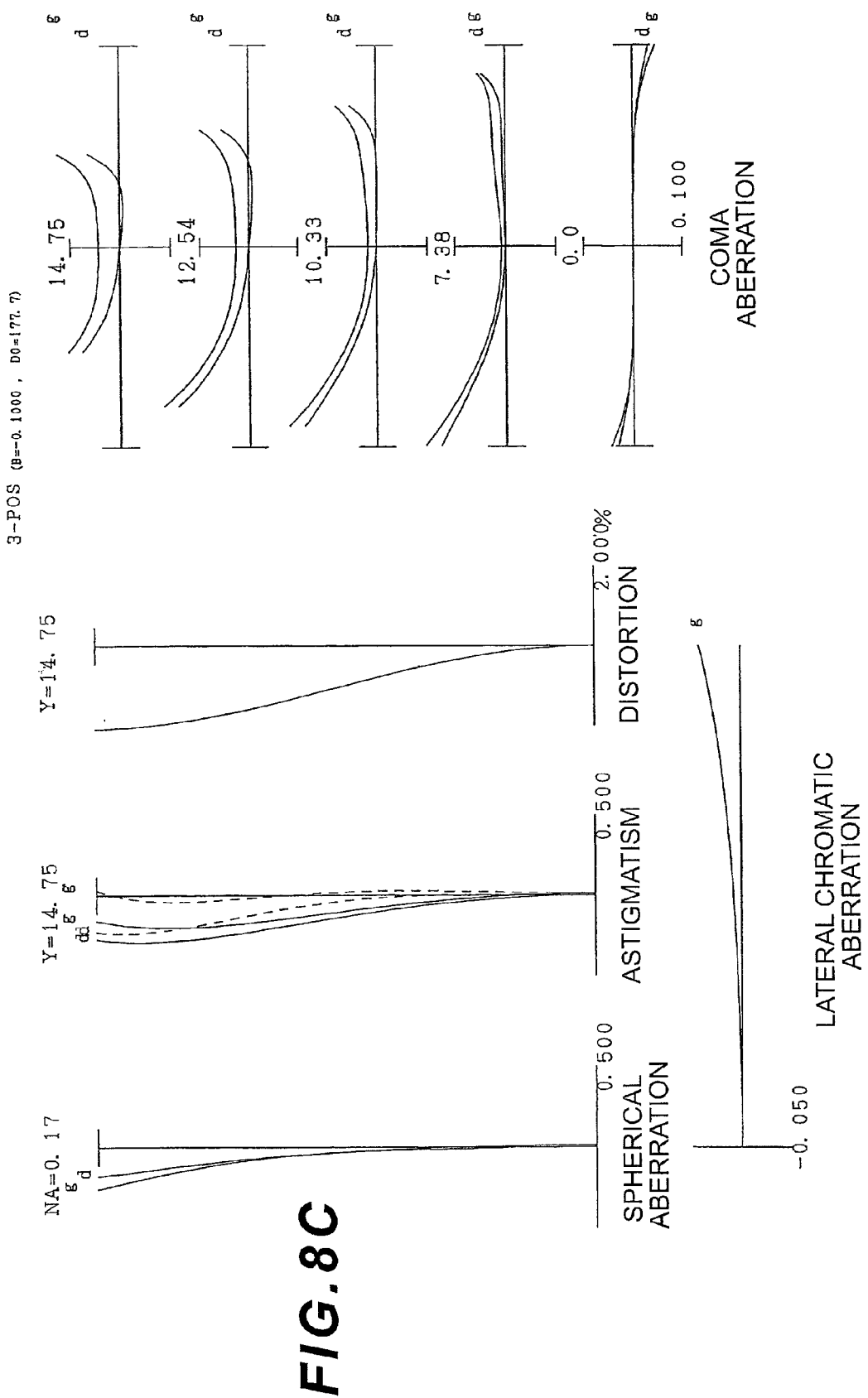

FIG. 8A to 8C are graphs showing various aberrations of the wide-angle lens WL according to Example 4. In other words, FIG. 8A are graphs showing various aberrations of the wide-angle lens WL upon focusing on infinity, FIG. 8B are graphs showing various aberrations of the wide-angle lens WL when the photographing magnification is x−1/30, and FIG. 8C are graphs showing various aberrations of the wide-angle lens WL when the photographing magnification is x−1/10. As seen in each graph showing aberrations, various aberrations are corrected well throughout the entire object distance range, indicating good optical performance possessed by the wide-angle lens according to Example 4. As a result, excellent optical performance can be assured for a digital still camera CAM which has wide-angle lens WL of Example 4 as well.

EXAMPLE 5

Example 5 will now be described with reference to FIG. 9, FIG. 10 and Table 5. FIG. 9 is a diagram depicting a configuration of the wide-angle lens according to Example 5 upon focusing on infinity. The wide-angle lens of Example 5 has a same configuration as the wide-angle lens of Example 1, and therefore each composing element is denoted with the same reference symbol as Example 1, and detailed description thereof is omitted.

Table 5 shows each data of Example 5. The surface numbers 1 to 10 in Table 5 correspond to the surfaces 1 to 10 in FIG. 9. In Example 5, the second lens surface and the eighth lens surface are formed to be aspherical.

TABLE 5

[General Data]

f = 18.70569
FNO = 2.82
2ω = 77.7
Y = 14.75
BF = 18.57952
TL = 58.16020
f1 = −19.86327
f2 = 19.55701
f5 = 128.00000

[Lens Data]

| Surface Number | r | d | nd | νd |
|---|---|---|---|---|
| 1 | 31.7878 | 1.5000 | 1.59201 | 67.02 |
| 2* | 8.4332 | 14.4000 | | |
| 3 | 16.3282 | 3.5000 | 1.77250 | 49.61 |
| 4 | −183.2536 | 4.0000 | | |
| 5 | ∞ | 2.7000 | (Aperture stop S) | |
| 6 | −53.2817 | 1.0000 | 1.69895 | 30.13 |
| 7 | 11.2489 | 3.5000 | 1.58913 | 61.25 |
| 8* | −20.4074 | d8 | | |
| 9 | 81.0967 | 1.9300 | 1.69680 | 55.53 |
| 10 | 884.9269 | BF | | |

[Aspherical Data]

Second surface

κ = −0.7965
A4 = 3.05210E−04
A6 = −1.60280E−08
A8 = 2.13720E−09
A10 = 6.34460E−11

Eighth surface

κ = 1.0000
A4 = 1.03640E−04
A6 = 1.33310E−07
A8 = 1.32500E−08
A10 = 6.17290E−11

TABLE 5-continued

[Variable Distance Data]

| f or β | 18.70569 | x − 1/30 | x − 1/10 |
|---|---|---|---|
| d8 | 7.05068 | 4.96962 | 1.27677 |

[Conditional Expression Correspondence Value]

Conditional expression (1) d8/f = 0.37693
Conditional expression (2) f5/f = 6.84284
Conditional expression (3) (−f1)/f = 1.06188
Conditional expression (4) d2/(−f1) = 0.72496
Conditional expression (5) f2/f = 1.04551
Conditional expression (6) ΣD/f = 0.78586
Conditional expression (7) BF/f = 0.99325
Conditional expression (8) (Rb + Ra)/(Rb − Ra) = 1.20178
Conditional expression (9) n3 − n4 = 0.10982
Conditional expression (10) 0.07 (ν1 − ν2) − n1 = −0.37331

In this way, all the conditional expressions (1) to (10) are satisfied in this example.

Figure 10A:
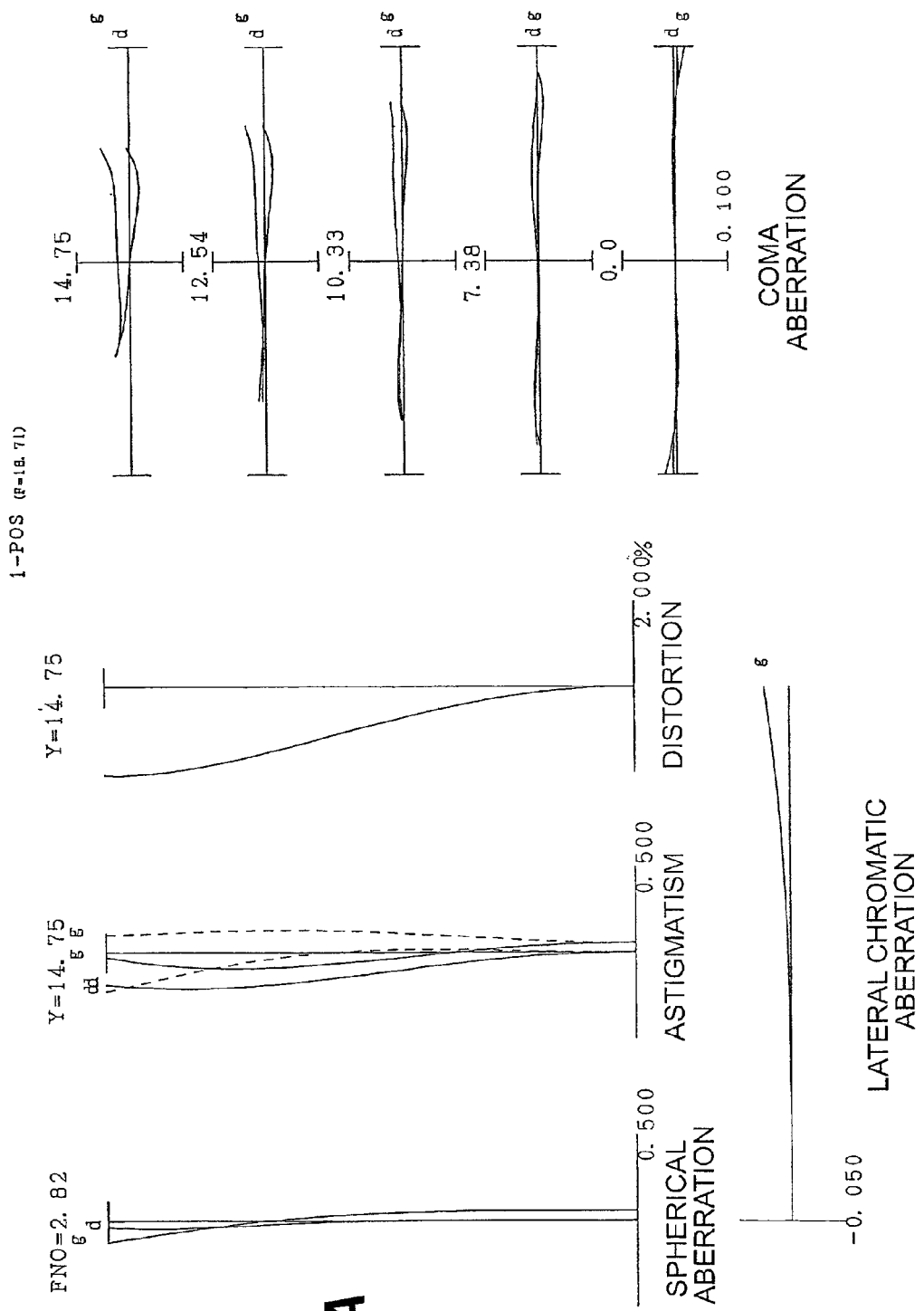
FIG. 10A are graphs showing various aberrations of the wide-angle lens according to Example 5 upon focusing on infinity, FIG. 10B are graphs showing various aberrations when a photographic magnification of the wide-angle lens of Example 5 is $\times-1/30$, and FIG. 10C are graphs showing various aberrations when a photographic magnification of the wide-angle lens of Example 5 is $\times-1/10$.
Figure 10B:
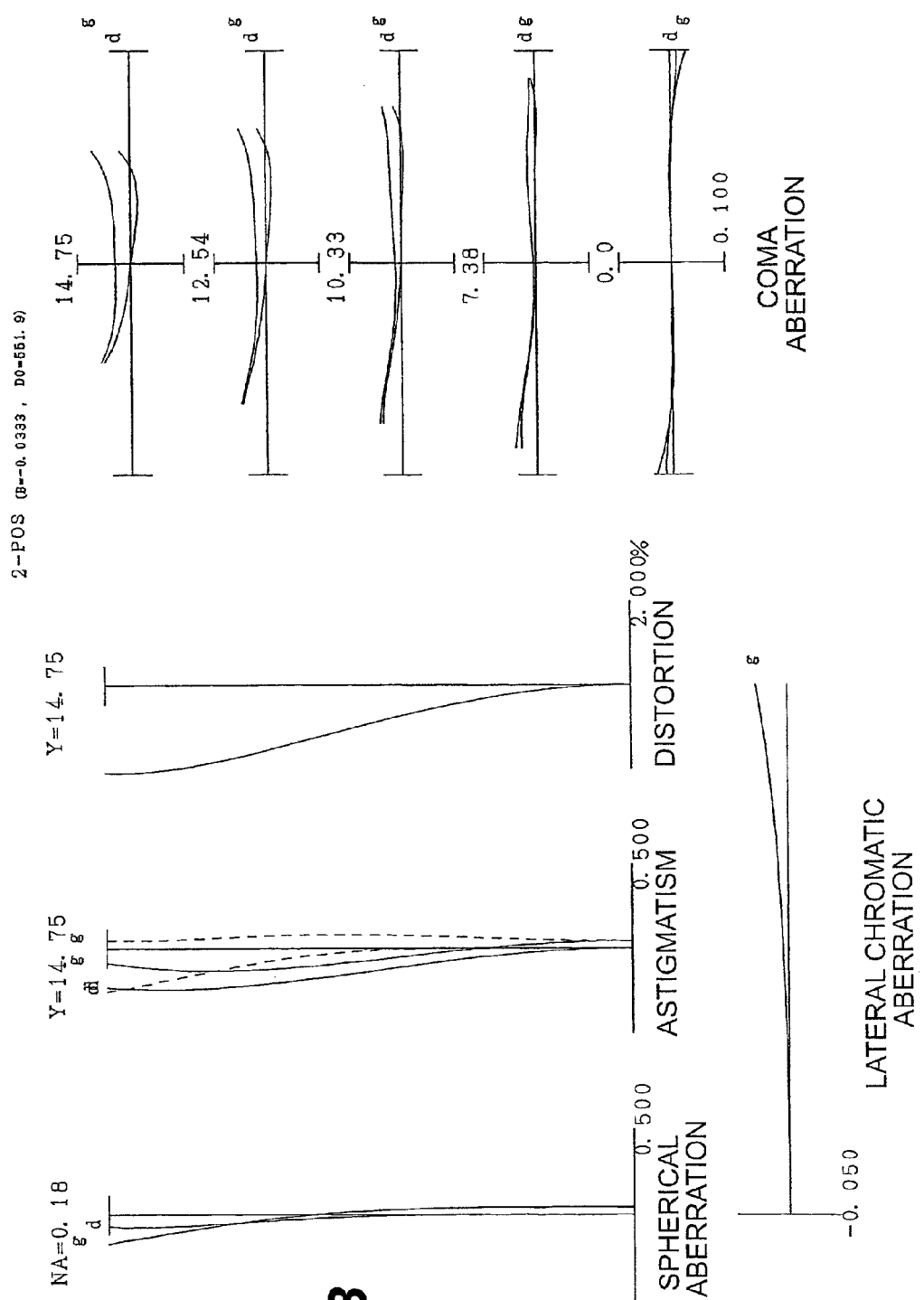
Figure 10C:
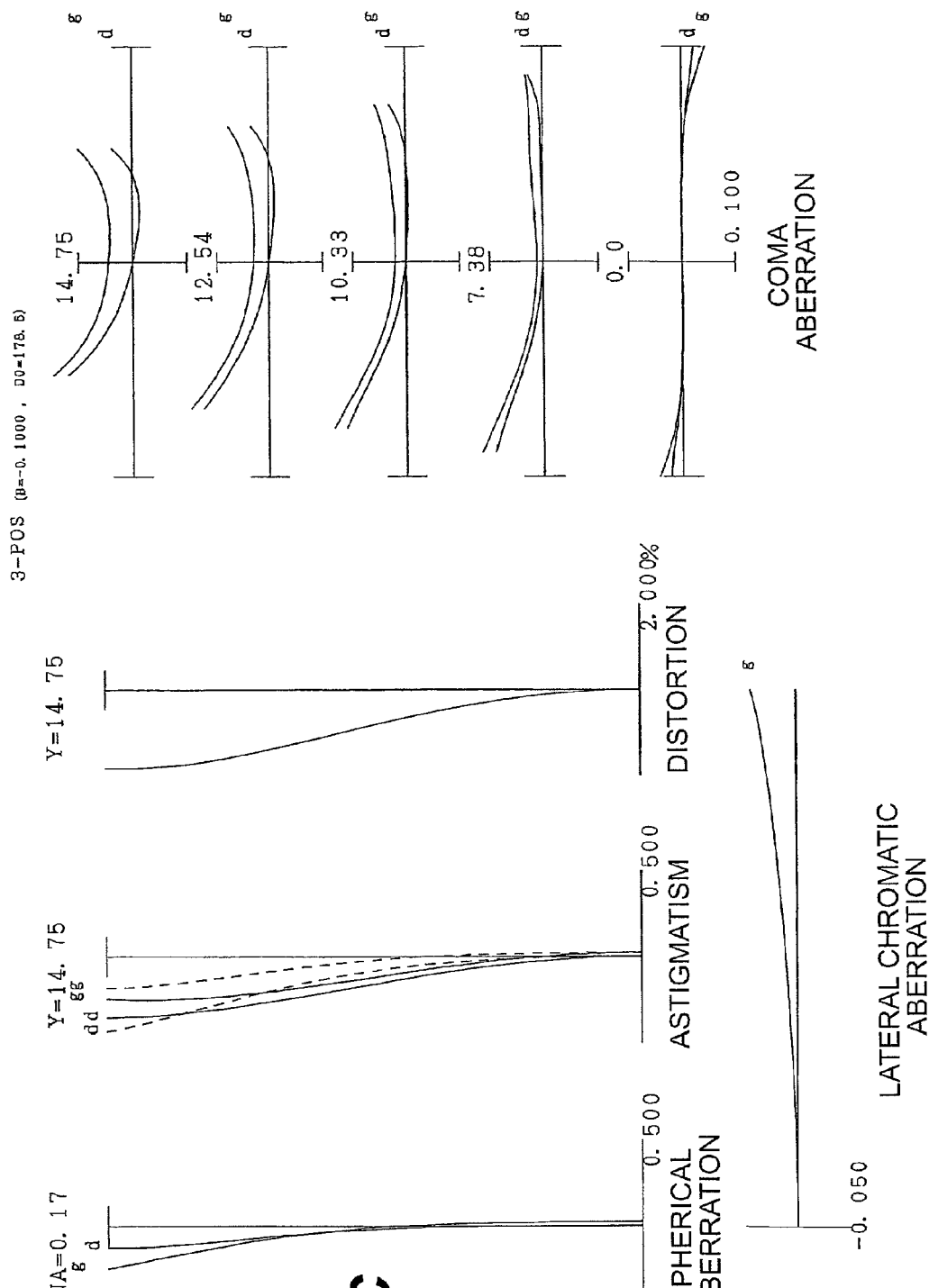

FIG. 10A to 10C are graphs showing various aberrations of the wide-angle lens WL according to Example 5. In other words, FIG. 10A, are graphs showing various aberrations of the wide-angle lens WL upon focusing on infinity, FIG. 10B are graphs showing various aberrations of the wide-angle lens WL when the photographing magnification is x−1/30, and FIG. 10C are graphs showing various aberrations of the wide-angle lens WL when the photographing magnification is x−1/10. As seen in each graph showing aberrations, various aberrations are corrected well throughout the entire object distance range, indicating good optical performance possessed by the wide-angle lens according to Example 5. As a result, excellent optical performance can be assured for a digital still camera CAM which has wide-angle lens WL of Example 5 as well.

According to each example, a wide-angle lens and optical apparatus (digital still camera), of which angle of view is 77° or more, F number is about 2.8, front cell lens diameter is small, entire lens is compact, focusing is fast, the telecentric characteristic is high, and image forming performance is good, can be implemented.

Second Embodiment

A digital still camera CAM having the wide-angle lens according to the second embodiment will now be described. The basic configuration of this camera CAM is the same as that of the first embodiment, and the configuration is shown in FIG. 11. Therefore description on the configuration of the digital still camera CAM described in the first embodiment is omitted.

In the digital still camera CAM according to the second embodiment, it is preferable that the wide-angle lens WL constituting the digital still camera CAM satisfies the conditions expressed by the following conditional expressions (12) and (13):

$$0.59 < d2/(-f1) < 0.88 \quad (12)$$

$$0.6 < \Sigma D/f < 0.87 \quad (13)$$

where f1 denotes a focal length of the first lens L1, d2 denotes an air distance between the first lens L1 and the second lens L2 on the optical axis, ΣD denotes a distance, on the optical axis, from the lens surface closest to the object in the second lens L2 to the lens surface closest to the image in the fourth lens L4, and f denotes a focal length of the wide-angle lens WL upon focusing on an object point at infinity. By this, a wide-angle lens WL, which is compact and still has good image forming performance and an optical apparatus (digital still camera CAM), having this wide-angle lens, can be implemented. In concrete terms, a wide-angle lens WL of which angle of view is 77° or more, F number is about 2.8, front cell lens diameter is small, entire lens system is compact, telecentric characteristic is high, and image forming performance is good, can be implemented.

Here the conditional expression (12) is a conditional expression to specify an appropriate air distance between the first lens L1 and the second lens L2 on the optical axis. If the condition is below the lower limit value of the conditional expression (12), the Petzval sum increases, and it is difficult to correct astigmatism and curvature of field simultaneously, which is not desirable. If the condition exceeds the upper limit value of the conditional expression (12), on the other hand, the axial incident luminous flux to the second lens L2 increases, therefore it is difficult to correct spherical aberration for each wavelength, which is not desirable. Furthermore, the total length of the optical system increases, which is not desirable.

To assure the effect of this invention, it is preferable that the lower limit value of the conditional expression (12) is 0.61. To further assure the effect of this invention, it is preferable that the lower limit value of the conditional expression (12) is 0.64. On the other hand, to assure the effect of this invention, it is preferable that the upper limit value of the conditional expression (12) is 0.84. And to further assure the effect of this invention, it is preferable that the upper limit value of the conditional expression (12) is 0.79.

The conditional expression (13) is a conditional expression to specify an appropriate distance, on the optical axis, from the lens surface closest to the object in the second lens L2 to the lens surface closest to the image in the fourth lens L4. If the condition is below the lower limit value of the conditional expression (13), it is difficult to correct spherical aberration for each wavelength, which is not desirable. If the condition exceeds the upper limit value of the conditional expression (13), on the other hand, it is difficult to correct coma aberration, and the total length of the optical system increases, which is not desirable.

To assure the effect of this invention, it is preferable that the lower limit value of the conditional expression (13) is 0.65. And to assure the effect of this invention, it is preferable that the lower limit value of the conditional expression (13) is 0.70. On the other hand, to assure the effect of this invention, it is preferable that the upper limit value of the conditional expression (13) is 0.85. And to further assure the effect of this invention, it is preferable that the upper limit value of the conditional expression (13) is 0.83.

By satisfying the conditional expression (12) and the conditional expression (13), aberrations can be corrected well while keeping the total length of the optical system short.

In this wide-angle lens WL, it is preferable that the condition expressed by the following conditional expression (14) is satisfied:

$$3.77 < f5/f < 8.0 \quad (14)$$

where f5 denotes a focal length of the fifth lens L5.

The conditional expression (14) is a conditional expression to satisfy the refractive power of the fifth lens L5 in an appropriate range. If the condition is below the lower limit value of the conditional expression (14), it is difficult to correct curvature of field, which is not desirable. If the condition exceeds the upper limit value of the conditional expression (14), on the other hand, coma aberration is generated, which is not desirable. Furthermore, the position of the exit pupil shifts to the image side, the telecentric characteristic is diminished, and light receiving efficiency of the picture element drops, which is not desirable. By satisfying the conditional expression (14), aberrations can be corrected well while maintaining a high telecentric characteristic.

To assure the effect of this invention, it is preferable that the lower limit value of the conditional expression (14) is 4.0. And to still further assure the effect of this invention, it is preferable that the lower limit value of the conditional expression (14) is 4.45. On the other hand, to further assure the effect of this invention, it is desirable that the upper limit value of the conditional expression (14) is 7.5. And to further assure the effect of this invention, it is preferable that the upper limit value of the conditional expression (14) is 7.0.

In this wide-angle lens WL, it is preferable that the condition expressed by the following conditional expression (15) is satisfied:

$$0.88 < f2/f < 1.2 \quad (15)$$

where f2 denotes a focal length of the second lens L2.

The conditional expression (15) is a conditional expression to specify the refractive power of the second lens L2 in an appropriate range. If the condition is below the lower limit value of the conditional expression (15), the refractive power of the second lens L2, which is a positive lens, increases, and it is difficult to correct the spherical aberration for each wavelength, which is not desirable. Furthermore the Petzval sum increases, which makes it difficult to correct curvature of field and astigmatism simultaneously, which is not desirable. If the condition exceeds the upper limit value of the conditional expression (15), on the other hand, it is difficult to correct spherical aberration, which is not desirable. Furthermore the total length of the optical system increases, which is not desirable. By satisfying the conditional expression (15), aberrations can be corrected well while keeping the total length of the optical system short.

To assure the effect of this invention, it is preferable that the lower limit value of the conditional expression (15) is 0.91. To further assure the effect of this invention, it is preferable that the lower limit value of the conditional expression (15) is 0.95. On the other hand, to assure the effect of this invention, it is preferable that the upper limit value of the conditional expression (15) is 1.16. And to further assure the effect of this invention, it is preferable that the upper limit value of the conditional expression (15) is 1.11.

In this wide-angle lens WL, it is preferable that the condition expressed by the following conditional expression (16) is satisfied:

$$0.87 < (-f1)/f2 < 1.19 \quad (16)$$

where f2 is a focal distance of the second lens L2.

The conditional expression (16) is a conditional expression to specify an appropriate range of a ratio of refractive powers between the first lens L1 and the second lens L2. If the condition is below the lower limit value of the conditional expression (16), the refractive power of the first lens L1 with respect to the second lens L2 increases, and it is difficult to correct spherical aberration for each wavelength, which is not desirable. Furthermore, the total length of the optical system increases, which is not desirable. If the condition exceeds the upper limit value of the conditional expression (16), on the other hand, the refractive power of the first lens L1 with respect to the second lens L2 decreases, and the Petzval sum increases, therefore it is difficult to correct curvature of field and astigmatism simultaneously, which is not desirable. Also the front cell lens diameter increases, which is not desirable. By satisfying the conditional expression (16), aberrations can be corrected well while keeping the front cell lens diameter and the total length of the optical system short.

To assure the effect of this invention, it is preferable that the lower limit value of the conditional expression (16) is 0.90. To further assure the effect of this invention, it is preferable that the lower limit value of the conditional expression (16) is 0.94. On the other hand, to assure the effect of this invention, it is preferable that the upper limit value of the conditional expression (16) is 1.16. And to further assure the effect of this invention, it is preferable that the upper limit value of the conditional expression (16) is 1.12.

In this wide-angle lens WL, it is preferable that focusing is performed from an object at infinity to an object at a finite distance by shifting the fifth lens L5 along the optical axis. Then the fluctuation of spherical aberration can be decreased upon focusing from an object at infinity to an object at a finite distance. Performing focusing by the fifth lens alone decreases the weight of the lens upon focusing, therefore quick focusing can be implemented.

In this wide-angle lens WL, it is preferable that the condition expressed by the following conditional expression (17) is satisfied:

$$0.2 < d8/f < 0.64 \quad (17)$$

where d8 is an air distance between the fourth lens L4 and the fifth lens L5 on the optical axis upon focusing on an object point at infinity.

The conditional expression (17) is a conditional expression to specify an appropriate distance, on the optical axis, from the Image side lens surface of the fourth lens L4 to the object side lens surface of the fifth lens L5. If the condition is below the lower limit value of the conditional expression (17), it is difficult to correct coma aberration, which is not desirable. Furthermore, the position of the exit pupil shifts to the image side, and the telecentric characteristic is diminished, which is not desirable. If the condition exceeds the upper limit value of the conditional expression (17), on the other hand, it is difficult to correct distortion, which is not desirable. By satisfying the conditional expression (17), aberrations can be corrected well while maintaining a good telecentric characteristic.

To assure the effect of this invention, it is preferable that the lower limit value of the conditional expression (17) is 0.22. To further assure the effect of this invention, it is preferable that the lower limit value of the conditional expression (17) is 0.25. And to still further assure the effect of this invention, it is preferable that the lower limit of the conditional expression (17) is 0.34. On the other hand, to assure the effect of this invention, it is preferable that the upper limit value of this conditional expression (17) is 0.59. And to further assure the effect of this invention, it is preferable that the upper limit value of the conditional expression (17) is 0.47.

In this wide-angle lens WL, it is preferable that the third lens L3 and the fourth lens L4 are cemented lenses. By this configuration, longitudinal chromatic aberration and lateral chromatic aberration can be corrected well.

In this wide-angle lens WL, it is preferable that the condition expressed by the following conditional expression (18) is satisfied:

$$0.01 < n3 - n4 \quad (18)$$

where n3 denotes a refractive index of the third lens L3 at d-line ($\lambda = 587.6$ nm), and n4 denotes a refractive index of the fourth lens L4 at d-line.

The conditional expression (18) is a conditional expression to specify an appropriate range of the difference of the refractive indexes of the third lens L3 and the fourth lens L4. If the condition is below the lower limit value of the conditional expression (18), it is difficult to correct spherical aberration and longitudinal chromatic aberration, unless the refractive power of the third lens L3 is increased, which is not desirable.

To assure the effect of this invention, it is preferable that the lower limit value of the conditional expression (18) is 0.04. And to further assure the effect of this invention, it is preferable that the lower limit value of the conditional expression (18) is 0.075.

In this wide-angle lens WL, it is preferable that the condition expressed by the following expression (19) is satisfied:

$$-2.00 < 0.07(v1-v2)-n1 \quad (19)$$

where v1 is an Abbe number of the first lens L1 at d-line ($\lambda$=587.6 nm), v2 is an Abbe number of the second lens L2 at d-line, and n1 is a refractive index of the first lens L1 at d-line.

The conditional expression (19) is a conditional expression to specify an appropriate range of an Abbe number of the first lens L1. If the condition is below the lower limit value of the conditional expression (19), it is difficult to correct the longitudinal chromatic aberration and lateral chromatic aberration, which is not desirable. By satisfying the conditional expression (19), aberrations can be corrected well.

To assure the effect of this invention, it is preferable that the lower limit value of the conditional expression (19) is −1.50. And to further assure the effect of this invention, it is preferable that the lower limit value of the conditional expression (19) is −1.00.

In this wide-angle lens WL, it is preferable that the first lens L1 has an aspherical surface. By this, distortion and curvature of field can be corrected well. Furthermore, the refractive power of the negative lens can be decreased, so the aperture ratio (F number) can be increased.

In this wide-angle lens WL, it is preferable that the lens surface closest to the image in the fourth lens L4 is aspherical. By this, spherical aberration can be corrected well.

Now a method for manufacturing the above mentioned wide-angle lens WL according to the second embodiment will be described with reference to FIG. 22. The content of this manufacturing method is different from the manufacturing method according to the first embodiment, but both are similar in the respective flow chart, o the flow chart in FIG. 22 is used for this description.

In this manufacturing method, a first lens which is a negative meniscus lens having a convex surface facing the object, a second lens which is a positive lens, a third lens which is a negative lens, a fourth lens which is a positive lens, and a fifth lens which is a positive lens, are first disposed, in order from an object, in a cylindrical lens barrel (step S1). When each lens is assembled into the lens barrel, each lens group may be assembled in the lens barrel one at a time in order along the optical axis, or a part or all of the lens groups maybe integratedly held on a holding member, and then assembled in this lens barrel. Then the positioning of these first to fifth lenses is adjusted so as to satisfy the following conditional expression (step S2).

$$0.59 < d2/(-f1) < 0.88$$

$$0.6 < \Sigma D/f < 0.87$$

f1: focal length of the first lens d2: air distance between the first lens and the second lens on the optical axis $\Sigma D$: distance, on the optical axis, from the lens surface closest to the object in the second lens and the lens surface closest to the image in the fourth lens f: a focal length of the lens system upon focusing on an object point at infinity It is checked whether the object image is formed in the state after the positions are adjusted, that is, whether the center of each lens group is aligned. Then various operations of the wide-angle lens WL are checked.

Examples of the various operations are: a focusing operation in which a lens, which performs focusing from an object at a long distance to an object at a short distance (fifth lens L5 in this embodiment), moves along the optical axis; and a hand motion blur correction operation, in which at least a part of the lenses move to have a component orthogonal to the optical axis. The sequence of checking the various operations is arbitrary. According to this manufacturing method, a wide-angle lens WL, which is compact and still has good image forming performance, can be implemented.

Example 6 to Example 10 of the above mentioned second embodiment will now be described. Example 6 and Example 7 have the same configuration as Example 1 and Example 2 according to the above mentioned first embodiment.

EXAMPLE 6

Example 6 of the second embodiment will now be described with reference to FIG. 11, FIG. 12 and Table 6. FIG. 11 is a diagram depicting a configuration of a wide-angle lens according to Example 6 upon focusing on infinity. The wide-angle lens WL according to Example 6 comprises, in order from an object, a first lens L1 which is a negative meniscus lens having a convex surface facing the object, a second lens L2 which is a positive lens, a third lens L3 which is a negative lens, a fourth lens L4 which is a positive lens, and a fifth lens L5 which is a positive lens. An aperture stop S is disposed between the second lens L2 and the third lens L3. Focusing from an object at infinity to an object at a finite distance is performed by shifting the fifth lens L5 to the object side along the optical axis. The third lens L3 and the fourth lens L4 are cemented lenses.

In Example 6, the image side lens surface in the first lens L1 is aspherical. And the image side lens surface in the fourth lens L4 is aspherical.

Table 6 to Table 10 shown below are tables listing the values of data on the wide-angle lens according to Example 6 to Example 10. [General Data], [Lens Data], [Aspherical Data], [Variable Distance Data] and [Conditional Expression Correspondence Value] of each table are the same as those in the first embodiment, therefore description thereof is omitted here.

"mm" is normally used for the unit of focal length f, radius of curvature r, and other length in all the data values herein below, but another appropriate unit may be used instead, since an equivalent optical performance is obtained even if an optical system is proportionally expanded or reduced. The same symbols as this example are used in the data values of Example 7 to Example 10 to be described below.

Table 6 shows each data of Example 6. The surface numbers 1 to 10 in Table 6 correspond to surfaces 1 to 10 in FIG. 11. In Example 6, the second lens surface and the eighth lens surface are formed to be aspherical.

TABLE 6

[General Data]

f = 18.68255
FNO = 2.85
2ω = 77.8
Y = 14.75
BF = 18.94212

TABLE 6-continued

TL = 58.1693
f1 = −19.74578
f2 = 18.91566
f5 = 102.60038

[Lens Data]

| Surface Number | r | d | nd | vd |
|---|---|---|---|---|
| 1 | 32.7067 | 1.6000 | 1.58913 | 61.25 |
| 2* | 8.4253 | 14.4960 | | |
| 3 | 16.0573 | 3.2000 | 1.78800 | 47.38 |
| 4 | −189.5564 | 3.9592 | | |
| 5 | ∞ | 2.7000 | (Aperture stop S) | |
| 6 | −42.2574 | 1.0000 | 1.69895 | 30.13 |
| 7 | 10.8055 | 3.5000 | 1.58913 | 61.25 |
| 8* | −20.3635 | d8 | | |
| 9 | 81.0967 | 1.9300 | 1.69680 | 55.53 |
| 10 | −597.7365 | BF | | |

[Aspherical Data]

Second surface

κ = −0.1694
A4 = 1.75200E−04
A6 = 7.97520E−07
A8 = −2.35590E−09
A10 = 7.42560E−11

Eighth surface

κ = 1.0000
A4 = 1.00670E−04
A6 = 8.24680E−07
A8 = −1.29300E−08
A10 = 4.44560E−10

[Variable Distance Data]

| f or β | 18.68255 | ×−1/30 | ×−1/10 |
|---|---|---|---|
| d8 | 6.84196 | 5.13322 | 2.03596 |

[Conditional Expression Correspondence Value]

Conditional expression (12) d2/(−f1) = 0.73413
Conditional expression (13) ΣD/f = 0.76859
Conditional expression (14) f5/f = 5.49178
Conditional expression (15) f2/f = 1.01248
Conditional expression (16) (−f1)/f2 = 1.04389
Conditional expression (17) d8/f = 0.36622
Conditional expression (18) n3 − n4 = 0.10982
Conditional expression (19) 0.07 (v1 − v2) − n1 = −0.61823

In this way, all the conditional expressions (12) to (19) are satisfied in this example.

Figure 12A:
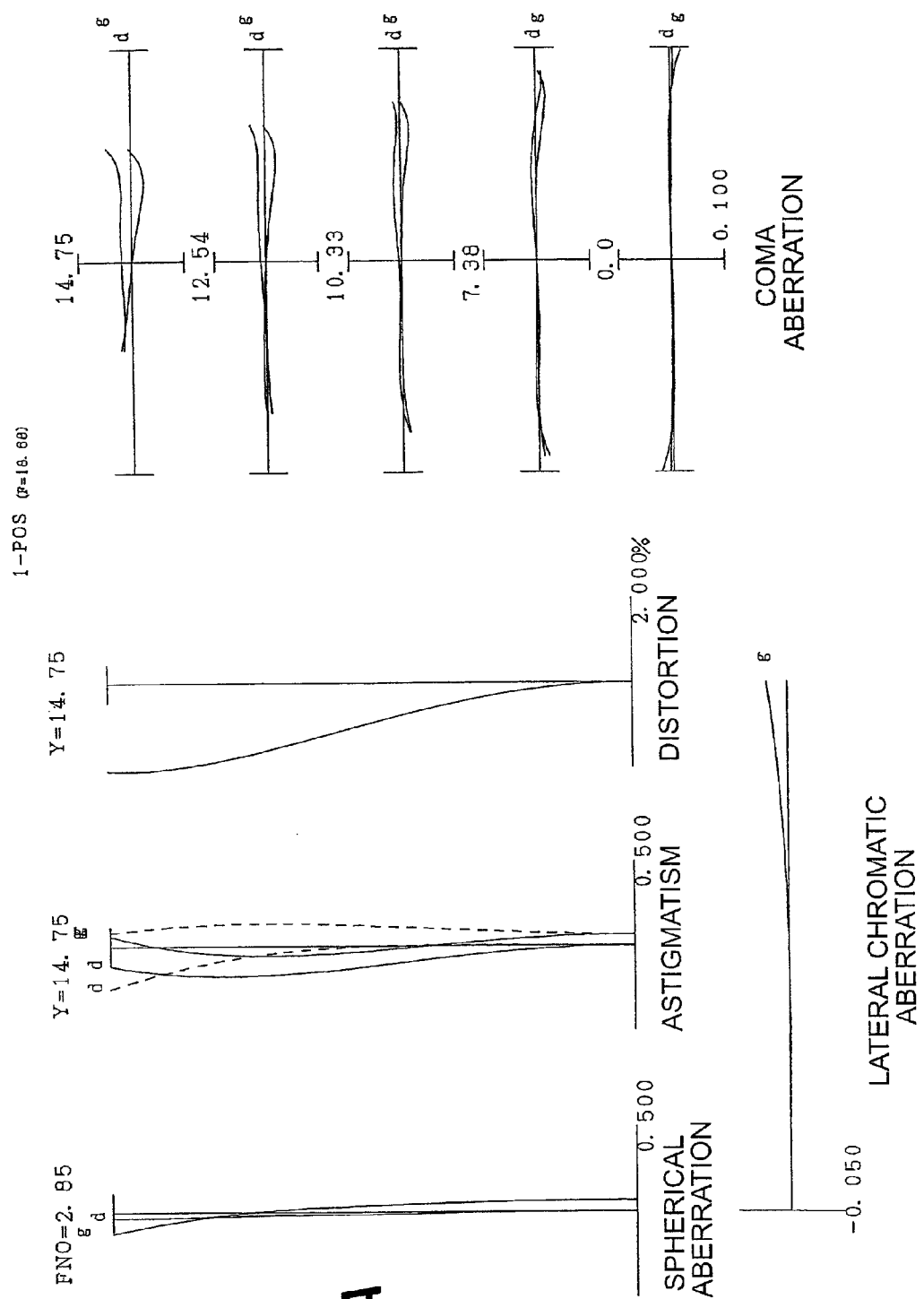
FIG. 12A are graphs showing various aberrations of the wide-angle lens according to Example 6 upon focusing on infinity, FIG. 12B are graphs showing various aberrations when a photographic magnification of the wide-angle lens of Example 6 is $\times-1/30$, and FIG. 12C are graphs showing various aberrations when a photographic magnification of the wide-angle lens of Example 6 is ×–1/10.
Figure 12B:
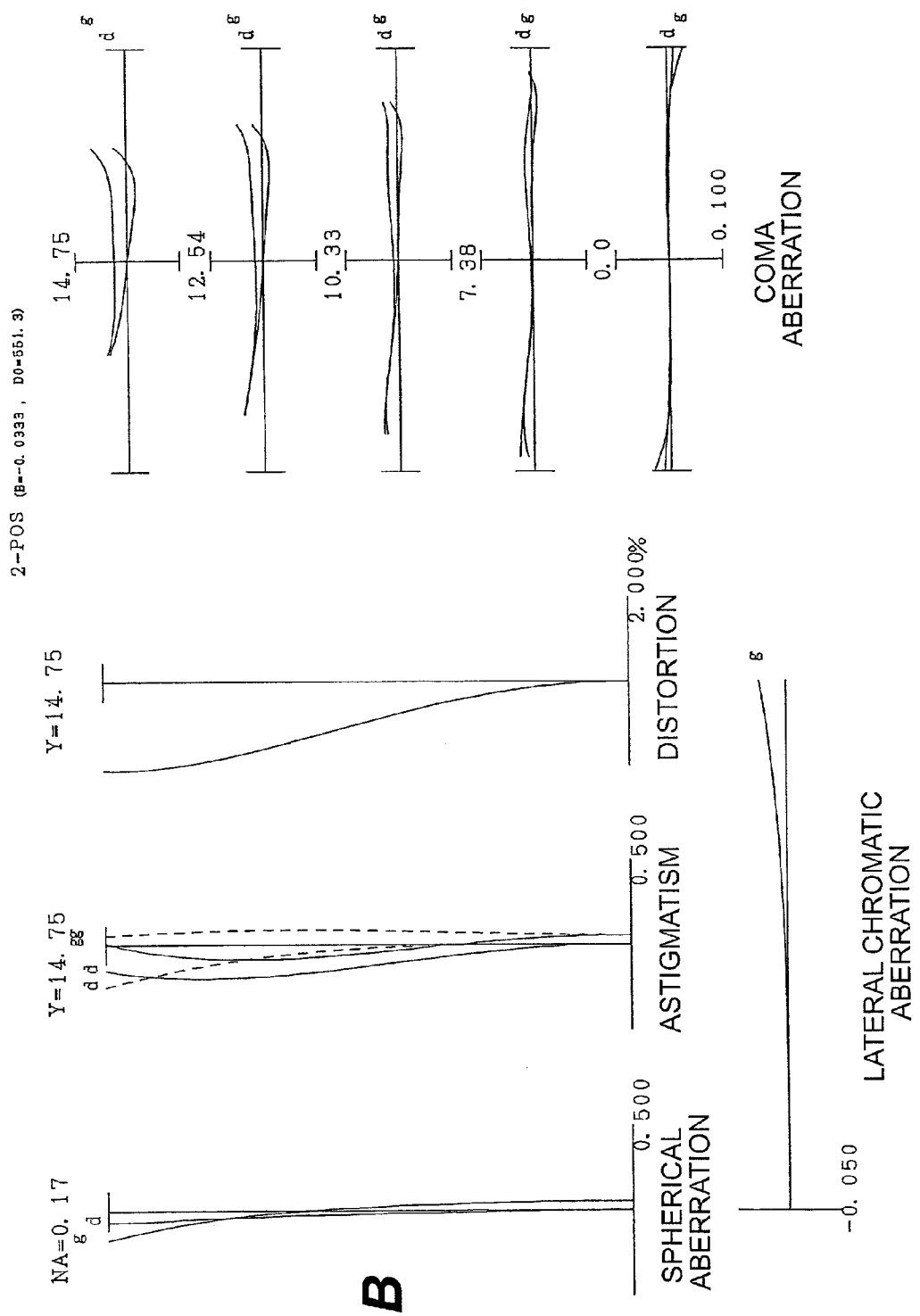
Figure 12C:
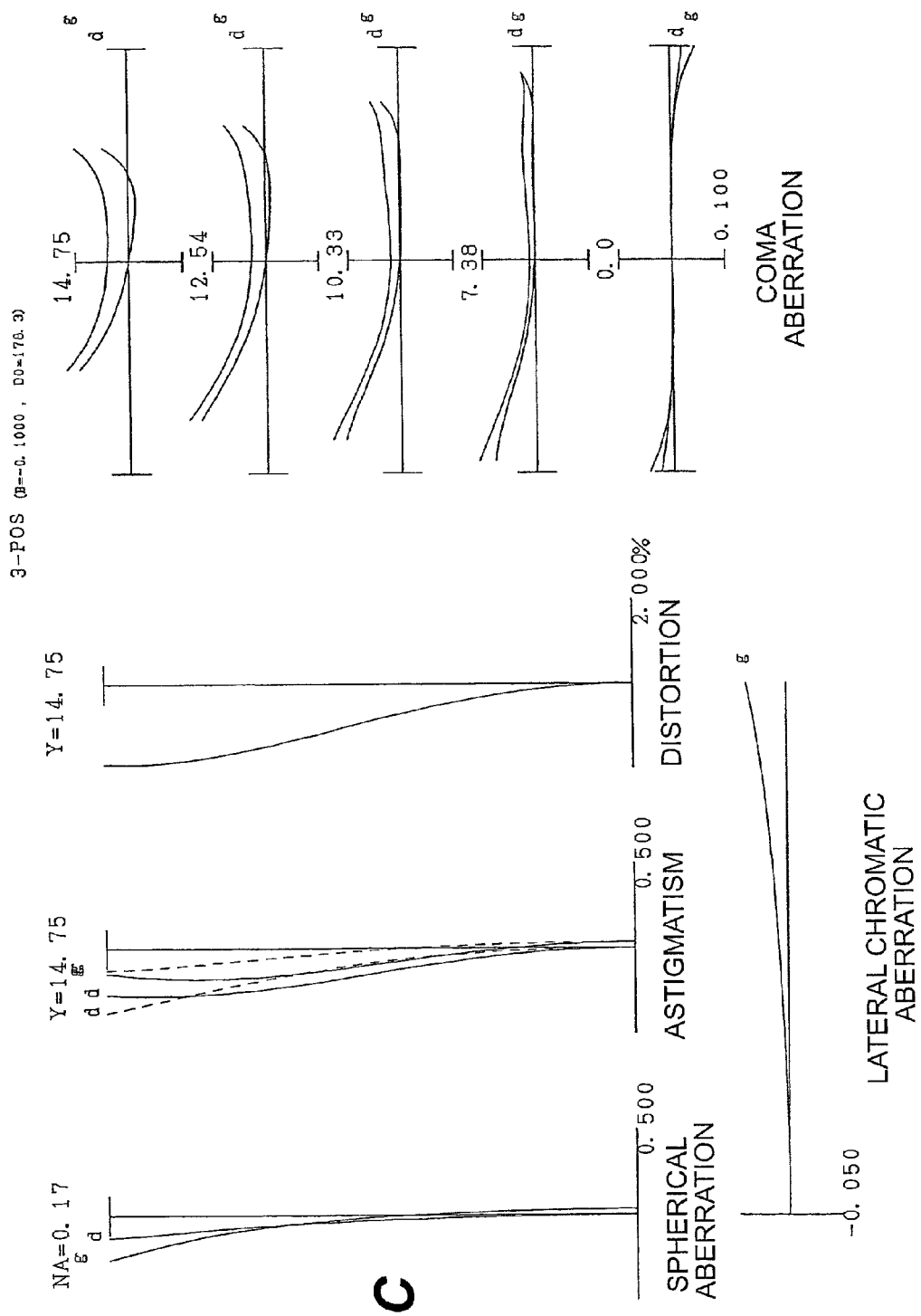

FIG. 12A to 12C are graphs showing various aberrations of the wide-angle lens WL according to Example 6. In other words, FIG. 12A are graphs showing various aberrations of the wide-angle lens WL upon focusing on infinity, FIG. 12B are graphs showing various aberrations of the wide-angle lens WL when the photographing magnification is ×−1/30, and FIG. 12C are graphs showing various aberrations of the wide-angle lens WL when the photographing magnification is ×−1/10. In each graph showing aberrations, FNO denotes an F number, NA denotes a numerical aperture, and Y denotes an image height. In the graph showing astigmatism and the graph showing distortion, a maximum value of the image height Y is shown. In each graph showing aberrations, d and g denote d-line (λ=587.6 nm) and g-line (λ=435.8 nm). In the graph showing astigmatism, the solid line indicates the sagittal image surface, and the dotted line indicates the meridional image surface. The graph showing coma aberration shows the coma aberrations at each image height. The same symbols are used for the other examples, for which the following description is omitted.

As seen in each graph showing aberrations, various aberrations are corrected well throughout the entire object distance range, indicating good optical performance possessed by the wide-angle lens according to Example 6. As a result, excellent optical performance can be assured for a digital still camera CAM which has wide-angle lens WL of Example 6 as well.

EXAMPLE 7

Figure 13:
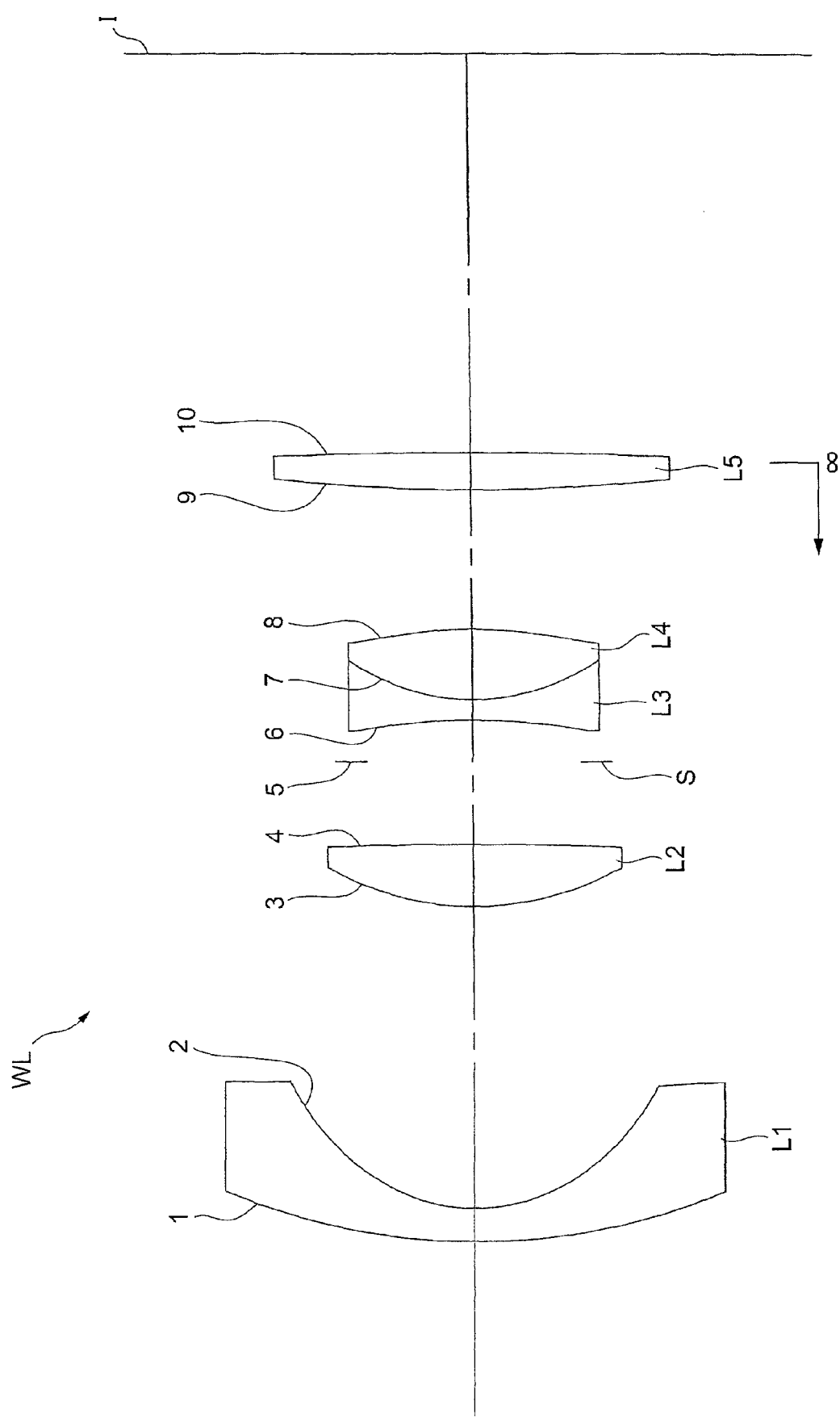
FIG. 13 is a diagram depicting a configuration of a wide-angle lens according to Example 7 upon focusing on infinity.

Example 7 of the present invention will now be described with reference to FIG. 13, FIG. 14 and Table 7. FIG. 13 is a diagram depicting a configuration of the wide-angle lens according to Example 7 upon focusing on infinity. The wide-angle lens of Example 7 has a same configuration as the wide-angle lens of Example 6, and therefore each composing element is denoted with the same reference symbol as Example 6, and detailed description thereof is omitted.

Table 7 shows each data of Example 7. The surface numbers 1 to 10 in Table 7 correspond to the surfaces 1 to 10 in FIG. 13. In Example 7, the second lens surface and the eighth lens surface are formed to be aspherical.

TABLE 7

[General Data]

f = 18.70551
FNO = 2.82
2ω = 77.7
Y = 14.75
BF = 19.09891
TL = 57.12891
f1 = −20.20899
f2 = 18.24057
f5 = 90.00000

[Lens Data]

| Surface Number | r | d | nd | vd |
|---|---|---|---|---|
| 1 | 30.94749 | 1.6000 | 1.58913 | 61.25 |
| 2* | 8.43321 | 14.49000 | | |
| 3 | 14.04993 | 3.0000 | 1.71999 | 50.23 |
| 4 | −183.25309 | 4.0000 | | |
| 5 | ∞ | 2.0000 | (Aperture stop S) | |
| 6 | −30.30386 | 1.0000 | 1.67270 | 32.11 |
| 7 | 10.31474 | 3.4000 | 1.58913 | 61.25 |
| 8* | −20.40742 | d8 | | |
| 9 | 85.30000 | 1.8000 | 1.69680 | 55.53 |
| 10 | −234.76968 | BF | | |

[Aspherical Data]

Second surface

κ = −0.3582
A4 = 2.14010E−04
A6 = 7.78360E−07
A8 = −3.74070E−09
A10 = 9.22750E−11

Eighth surface

κ = 1.0000
A4 = 1.32620E−04
A6 = 3.05310E−07
A8 = 1.94060E−08
A10 = 1.38120E−10

[Variable Distance Data]

| f or β | 18.70551 | ×−1/30 | ×−1/10 |
|---|---|---|---|
| d8 | 6.74000 | 5.20535 | 2.39568 |

[Conditional Expression Correspondence Value]

Conditional expression (12) d2/(−f1) = 0.71701
Conditional expression (13) ΣD/f = 0.71637
Conditional expression (14) f5/f = 4.81142
Conditional expression (15) f2/f = 0.97514

TABLE 7-continued

Conditional expression (16) (−f1)/f2 = 1.10791
Conditional expression (17) d8/f = 0.36032
Conditional expression (18) n3 − n4 = 0.08357
Conditional expression (19) 0.07 (ν1 − ν2) − n1 = −0.81773

In this way, all the conditional expressions (12) to (19) are satisfied in this example.

Figure 14A:
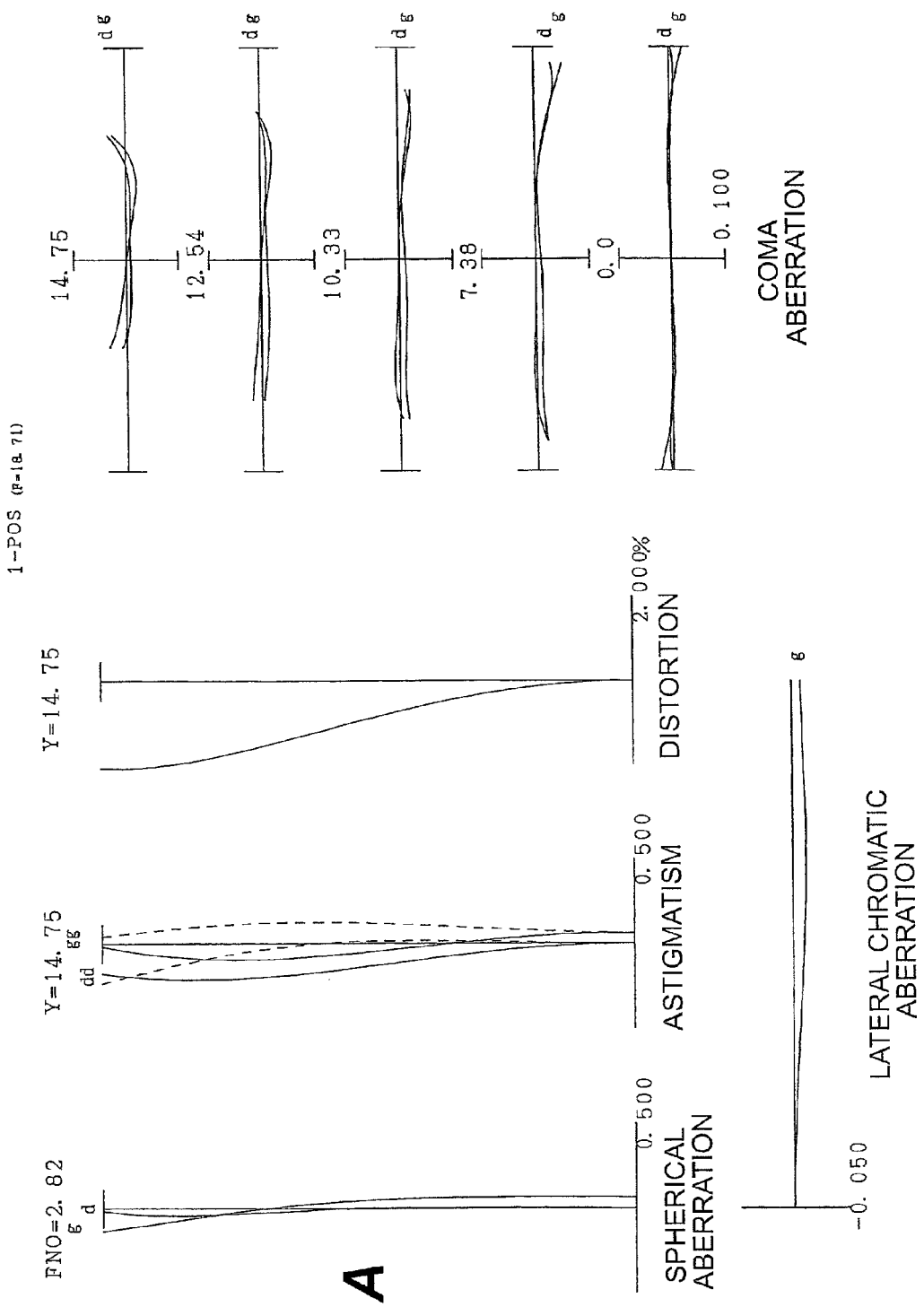
FIG. 14A are graphs showing various aberrations of the wide-angle lens according to Example 7 upon focusing on infinity, FIG. 14B are graphs showing various aberrations when a photographic magnification of the wide-angle lens of Example 7 is ×–1/30, and FIG. 14C are graphs showing various aberrations when a photographic magnification of the wide-angle lens of Example 7 is ×–1/10.
Figure 14B:
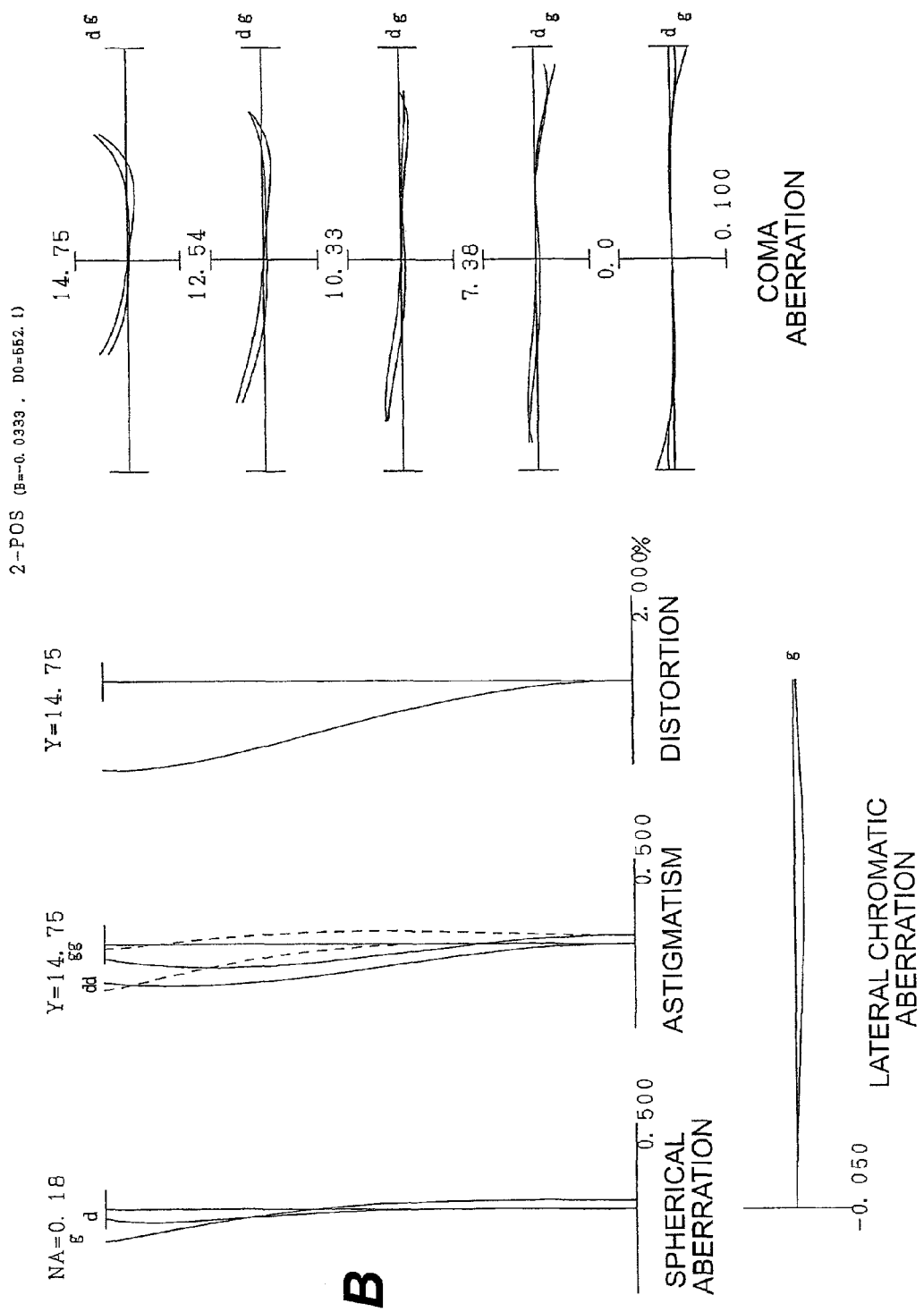
Figure 14C:
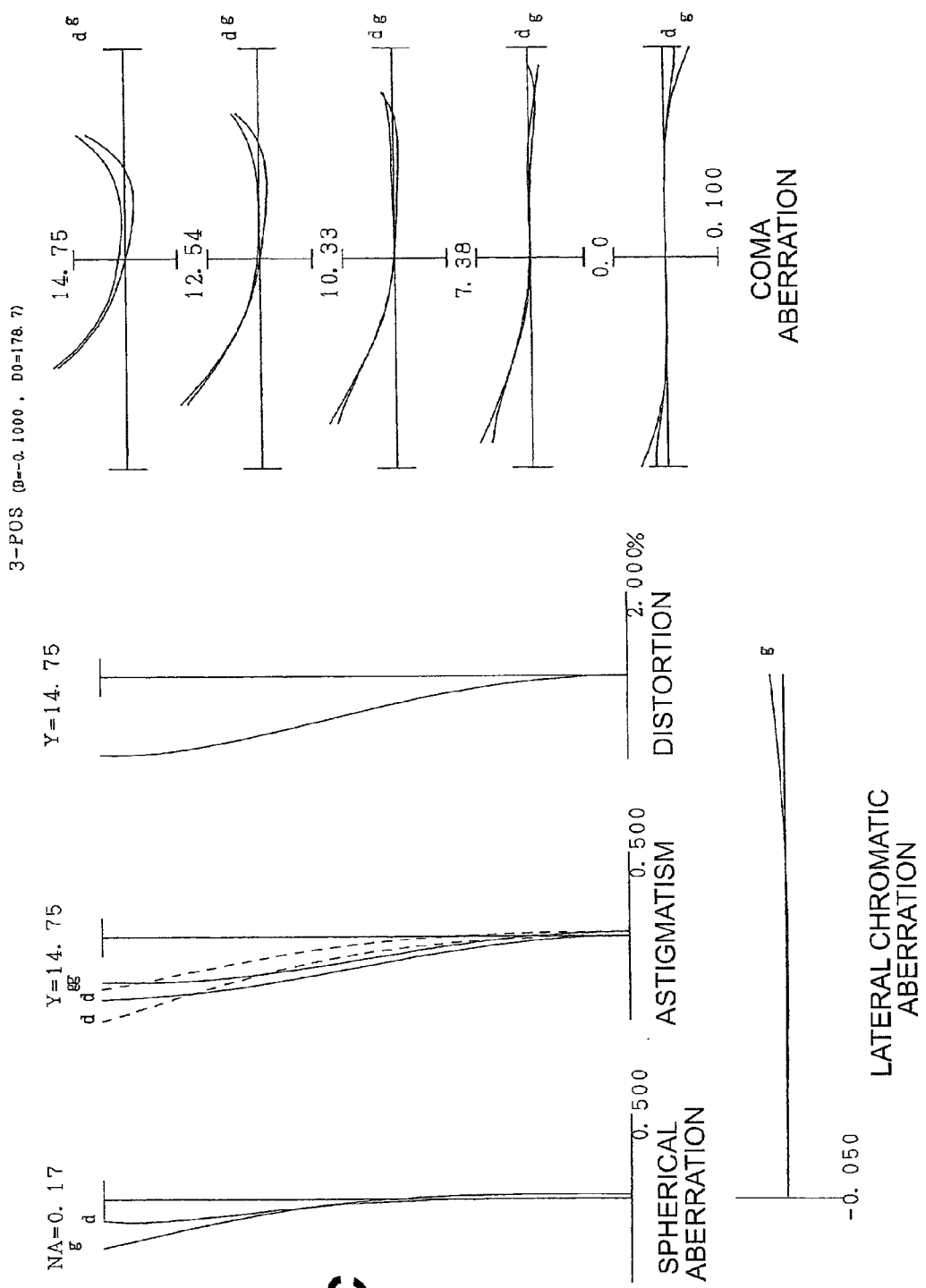

FIG. 14A to 14C are graphs showing various aberrations of the wide-angle lens WL according to Example 7. In other words, FIG. 14A are graphs showing various aberrations of the wide-angle lens WL upon focusing on infinity, FIG. 14B are graphs showing various aberrations of the wide-angle lens WL when the photographing magnification is ×−1/30, and FIG. 14C are graphs showing various Aberrations of the wide-angle lens WL when the photographing magnification is ×−1/10. As seen in each graph showing aberrations, various aberrations are corrected well throughout the entire object distance range, indicating good optical performance possessed by the wide-angle lens according to Example 7. As a result, excellent optical performance can be assured for a digital still camera CAM which has the wide-angle lens WL of Example 7 as well.

EXAMPLE 8

Figure 15:
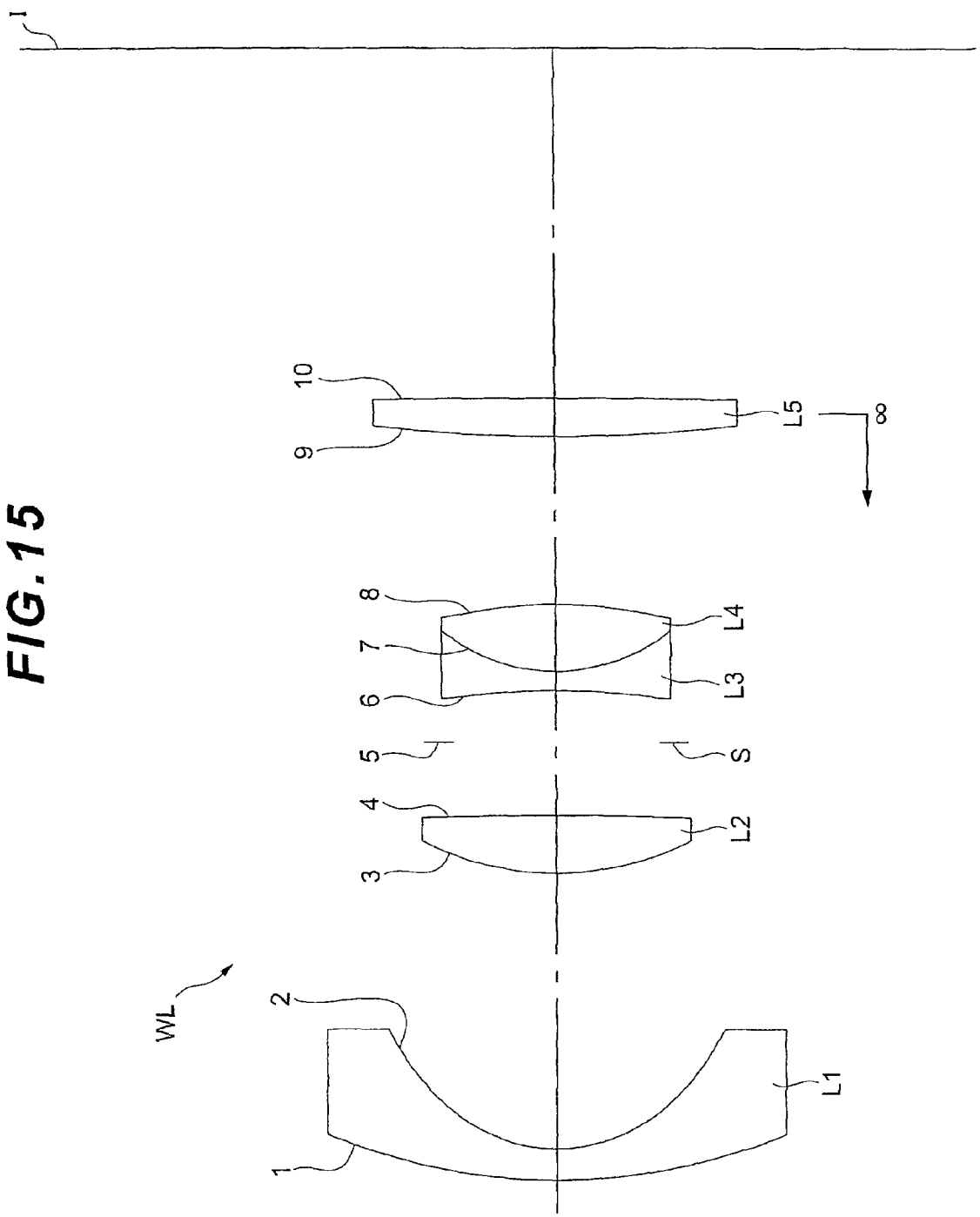
FIG. 15 is a diagram depicting a configuration of a wide-angle lens according to Example 8 upon focusing on infinity.

Example 8 of the present invention will now be described with reference to FIG. 15, FIG. 16 and Table 8. FIG. 15 is a diagram depicting a configuration of the wide-angle lens according to Example 8 upon focusing on infinity. The wide-angle lens of Example 8 has a same configuration as the wide-angle lens of Example 6, and therefore each composing element is denoted with the same reference symbol as Example 6, and detailed description thereof is omitted.

Table 8 shows each data of Example 8. The surface numbers 1 to 10 in Table 8 correspond to the surfaces 1 to 10 in FIG. 15. In Example 8, the second lens surface and the eighth lens surface are formed to be aspherical.

TABLE 8

[General Data]

f = 18.69969
FNO = 2.84
2ω = 77.7
Y = 14.75
BF = 18.07648
TL = 58.59526
f1 = −18.21819
f2 = 18.04311
f5 = 100.27511

[Lens Data]

| Surface Number | r | d | nd | νd |
|---|---|---|---|---|
| 1 | 31.6949 | 1.6000 | 1.62263 | 58.16 |
| 2* | 8.1918 | 14.1871 | | |
| 3 | 15.6487 | 3.0000 | 1.80400 | 46.58 |
| 4 | −181.7888 | 3.7938 | | |
| 5 | ∞ | 2.7000 | (Aperture stop S) | |
| 6 | −37.5505 | 1.0000 | 1.68893 | 31.07 |
| 7 | 9.5614 | 3.5000 | 1.58913 | 61.25 |
| 8* | −20.1725 | d8 | | |
| 9 | 81.0967 | 2.0000 | 1.71300 | 53.88 |
| 10 | −597.7365 | BF | | |

[Aspherical Data]

Second surface

κ = 0.5584
A4 = 1.98880E−05
A6 = 3.89550E−07

TABLE 8-continued

A8 = −3.98380E−09
A10 = 3.74510E−11

Eighth surface

κ = 1.0000
A4 = 1.03600E−04
A6 = 1.12920E−06
A8 = −6.34210E−09
A10 = 1.66280E−10

[Variable Distance Data]

| f or β | 18.69969 | ×−1/30 | ×−1/10 |
|---|---|---|---|
| d8 | 8.73792 | 7.00135 | 3.87044 |

[Conditional Expression Correspondence Value]

Conditional expression (12) d2/(−f1) = 0.77873
Conditional expression (13) ΣD/f = 0.74834
Conditional expression (14) f5/f = 5.36239
Conditional expression (15) f2/f = 0.96489
Conditional expression (16) (−f1)/f2 = 1.00970
Conditional expression (17) d8/f = 0.46728
Conditional expression (18) n3 − n4 = 0.09980
Conditional expression (19) 0.07 (ν1 − ν2) − n1 = −0.81203

In this way, all the conditional expressions (12) to (19) are satisfied in this example.

Figure 16A:
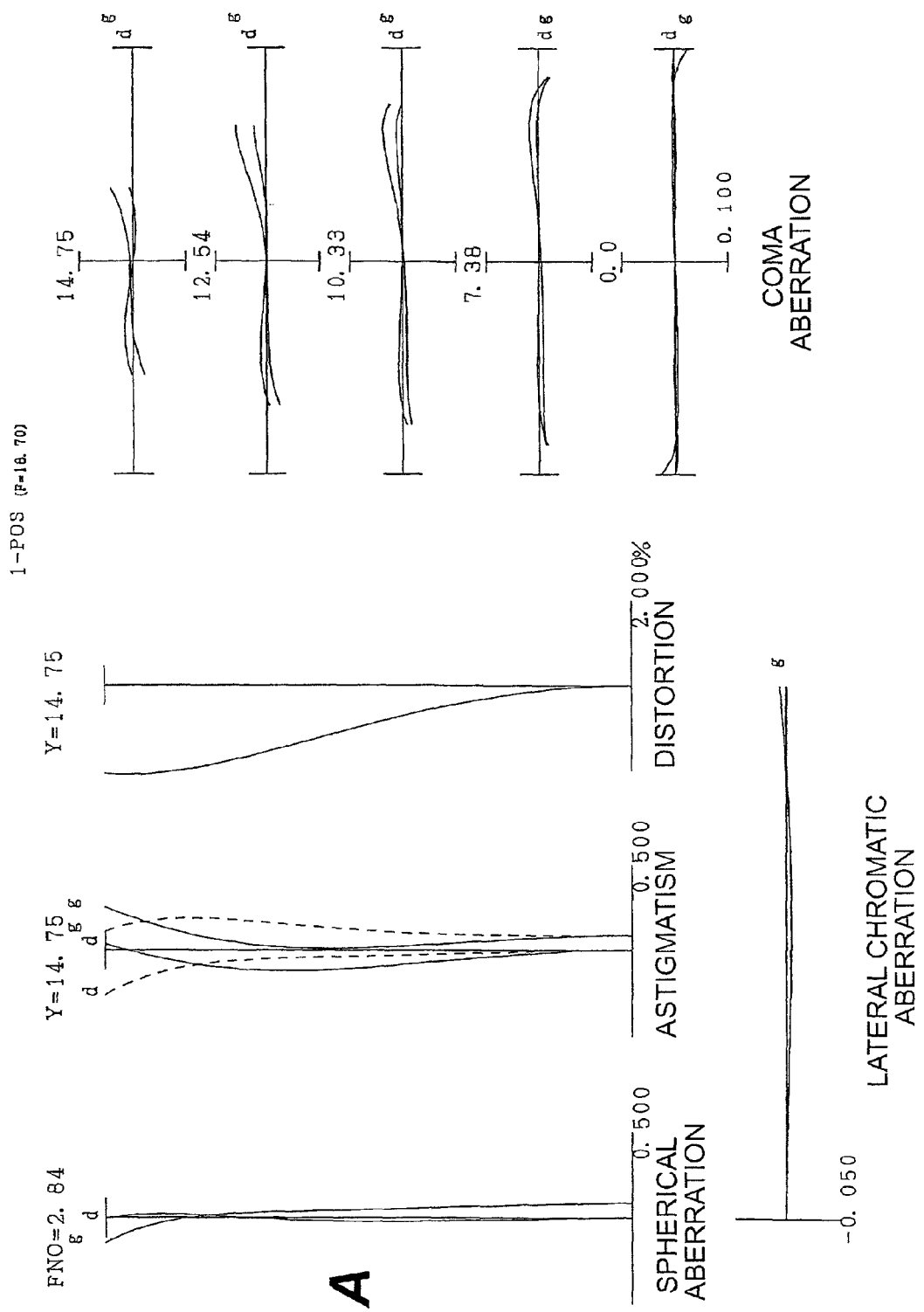
FIG. 16A are graphs showing various aberrations of the wide-angle lens according to Example 8 upon focusing on infinity, FIG. 16B are graphs showing various aberrations when a photographic magnification of the wide-angle lens of Example 8 is ×–1/30, and FIG. 16C are graphs showing various aberrations when a photographic magnification of the wide-angle lens of Example 8 is ×–1/10.
Figure 16B:
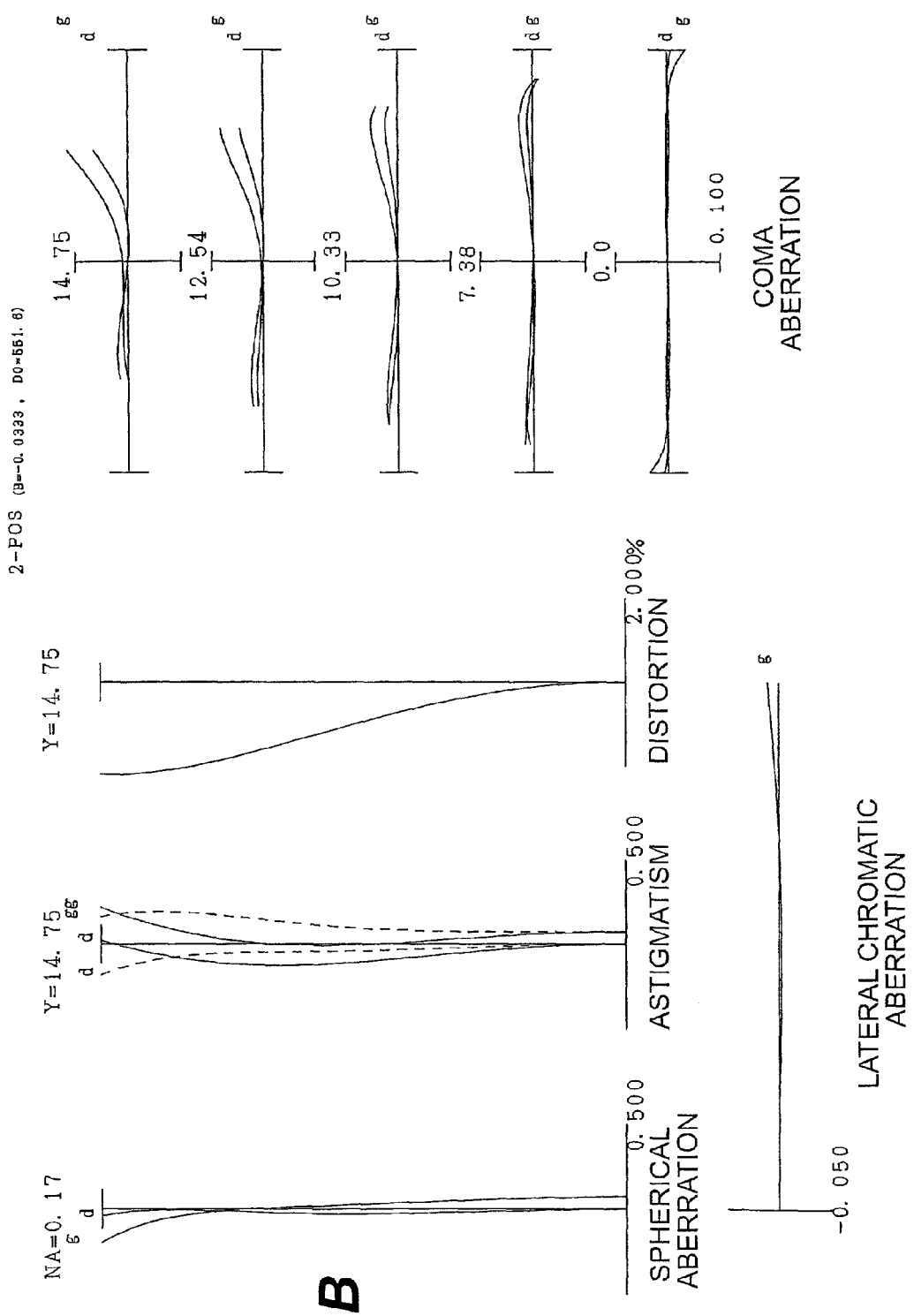
Figure 16C:
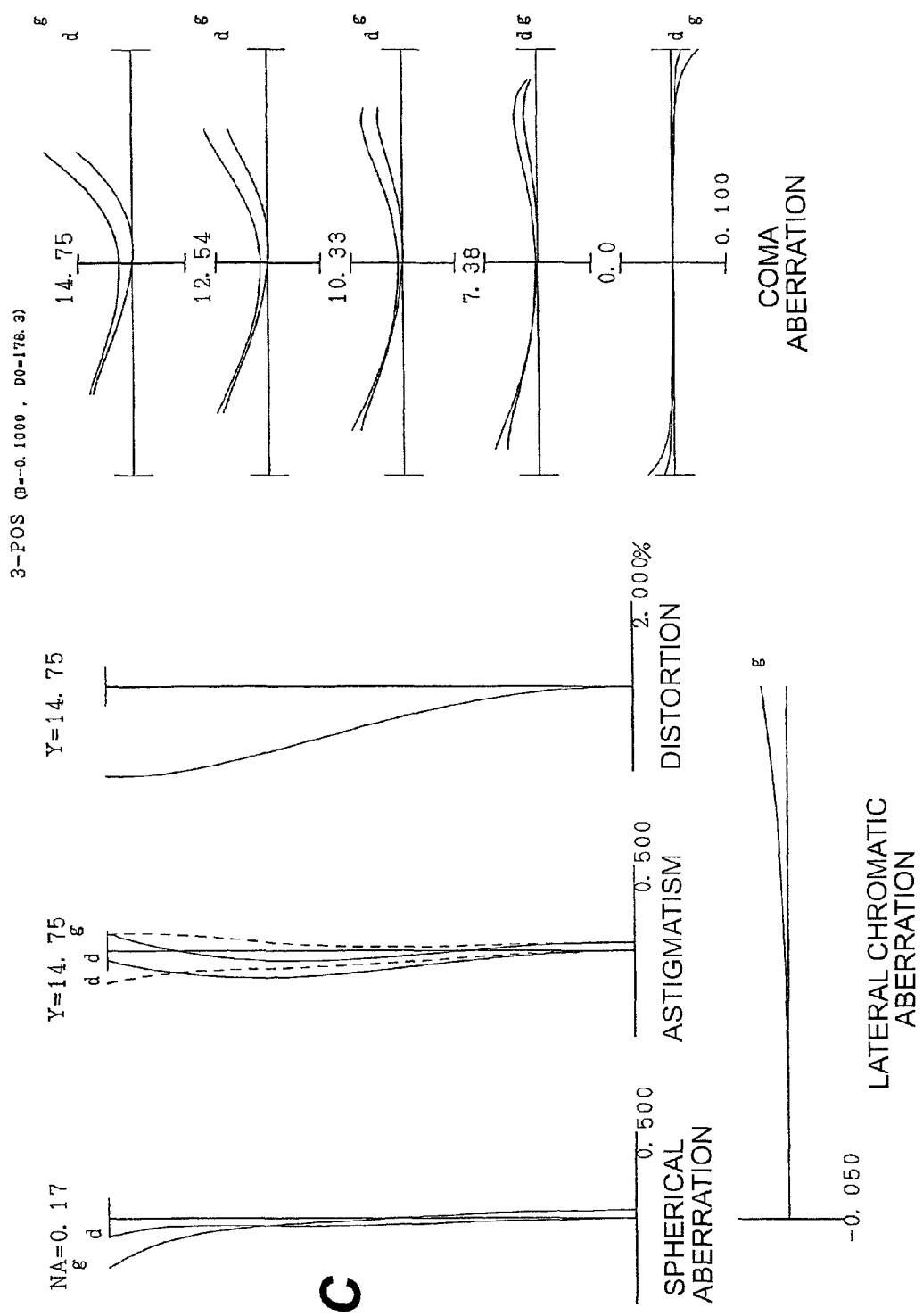

FIG. 16A to 16C are graphs showing various aberrations of the wide-angle lens WL according to Example 8. In other words, FIG. 16A are graphs showing various aberrations of the wide-angle lens WL upon focusing on infinity, FIG. 16B are graphs showing various aberrations of the wide-angle lens WL when the photographing magnification is ×−1/30, and FIG. 16C are graphs showing various aberrations of the wide-angle lens WL when the photographing magnification is ×−1/10. As seen in each graph showing aberrations, various aberrations are corrected well throughout the entire object distance range, indicating good optical performance possessed by the wide-angle lens according to Example 8. As a result, excellent optical performance can be assured for a digital still camera CAM which has wide-angle lens WL of Example 8 as well.

EXAMPLE 9

Example 9 of the present invention will now be described with reference to FIG. 17, FIG. 18 and Table 9. FIG. 17 is a diagram depicting a configuration of the wide-angle lens according to Example 9 upon focusing on infinity. The wide-angle lens of Example 9 has a same configuration as the wide-angle lens of Example 6, and therefore each composing element is denoted with the same reference symbol as Example 6, and detailed description thereof is omitted.

Table 9 shows each data of Example 9. The surface numbers 1 to 10 in Table 9 correspond to the surfaces 1 to 10 in FIG. 17. In Example 9, the second lens surface and the eighth lens surface are formed to be aspherical.

TABLE 9

[General Data]

f = 18.71011
FNO = 2.82
2ω = 77.7
Y = 14.75
BF = 17.36258
TL = 57.30382
f1 = −21.39176
f2 = 19.39279
f5 = 96.48504

TABLE 9-continued

[Lens Data]

| Surface Number | r | d | nd | νd |
|---|---|---|---|---|
| 1 | 34.2621 | 1.6200 | 1.58313 | 59.46 |
| 2* | 8.9855 | 13.9800 | | |
| 3 | 16.8513 | 3.1500 | 1.80400 | 46.58 |
| 4 | −191.2235 | 4.0499 | | |
| 5 | ∞ | 2.8000 | (Aperture stop S) | |
| 6 | −42.0481 | 1.1000 | 1.67270 | 32.11 |
| 7 | 9.9370 | 4.2000 | 1.59201 | 67.02 |
| 8* | −20.6093 | d8 | | |
| 9 | 90.0000 | 1.8800 | 1.74100 | 52.67 |
| 10 | −344.6378 | BF | | |

[Aspherical Data]

Second surface

κ = −0.3465
A4 = 1.88350E−04
AE = 2.72290E−07
A8 = 1.85530E−09
A10 = 3.28230E−11

Eighth surface

κ = 1.0000
A4 = 8.43110E−05
A6 = 1.25410E−06
A8 = −4.57960E−08
A10 = 9.09060E−10

[Variable Distance Data]

| f or β | 18.71011 | ×−1/30 | ×−1/10 |
|---|---|---|---|
| d8 | 7.16137 | 5.41319 | 2.27728 |

[Conditional Expression Correspondence Value]

Conditional expression (12) d2/(−f1) = 0.65352
Conditional expression (13) ΣD/f = 0.81773
Conditional expression (14) f5/f = 5.15684
Conditional expression (15) f2/f = 1.03649
Conditional expression (16) (−f1)/f2 = 1.103078
Conditional expression (17) d8/f = 0.38275
Conditional expression (18) n3 − n4 = 0.08069
Conditional expression (19) 0.07 (ν1 − ν2) − n1 = −0.68153

In this way, all the conditional expressions (12) to (19) are satisfied in this example.

Figure 18A:
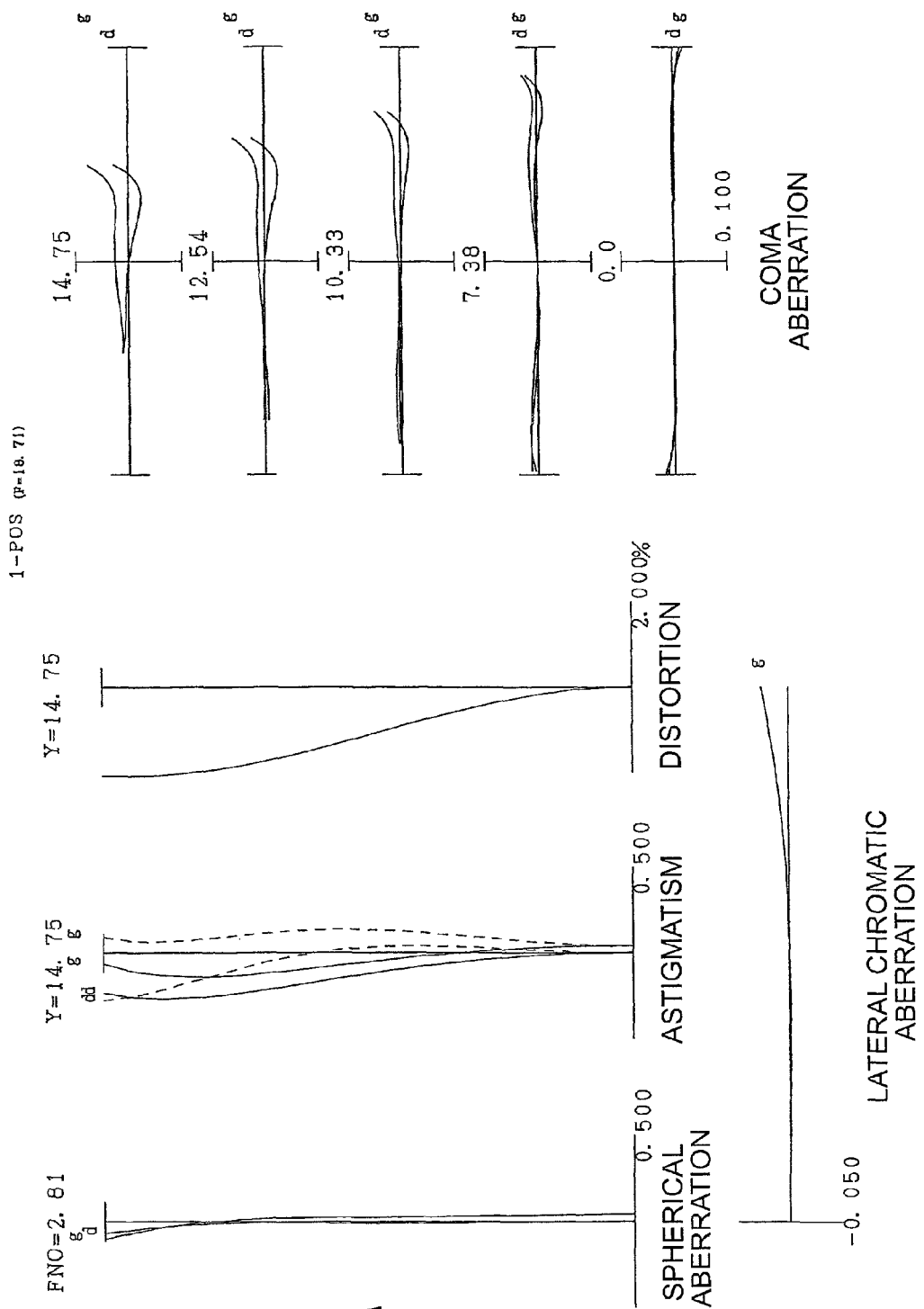
FIG. 18A are graphs showing various aberrations of the wide-angle lens according to Example 9 upon focusing on infinity, FIG. 18B are graphs showing various aberrations when a photographic magnification of the wide-angle lens of Example 9 is ×–1/30, and FIG. 18C are graphs showing various aberrations when a photographic magnification of the wide-angle lens of Example 9 is ×–1/10.
Figure 18B:
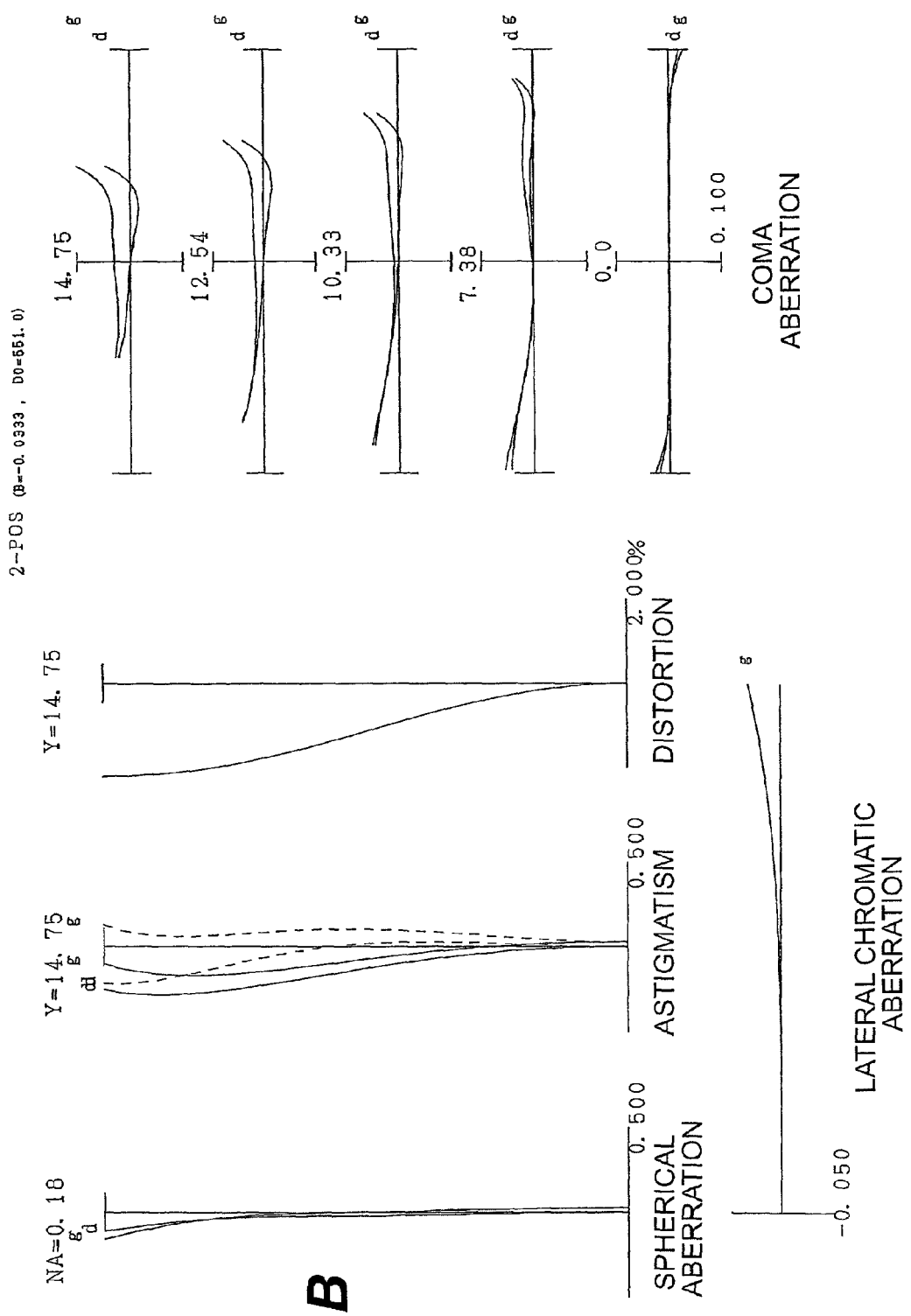
Figure 18C:
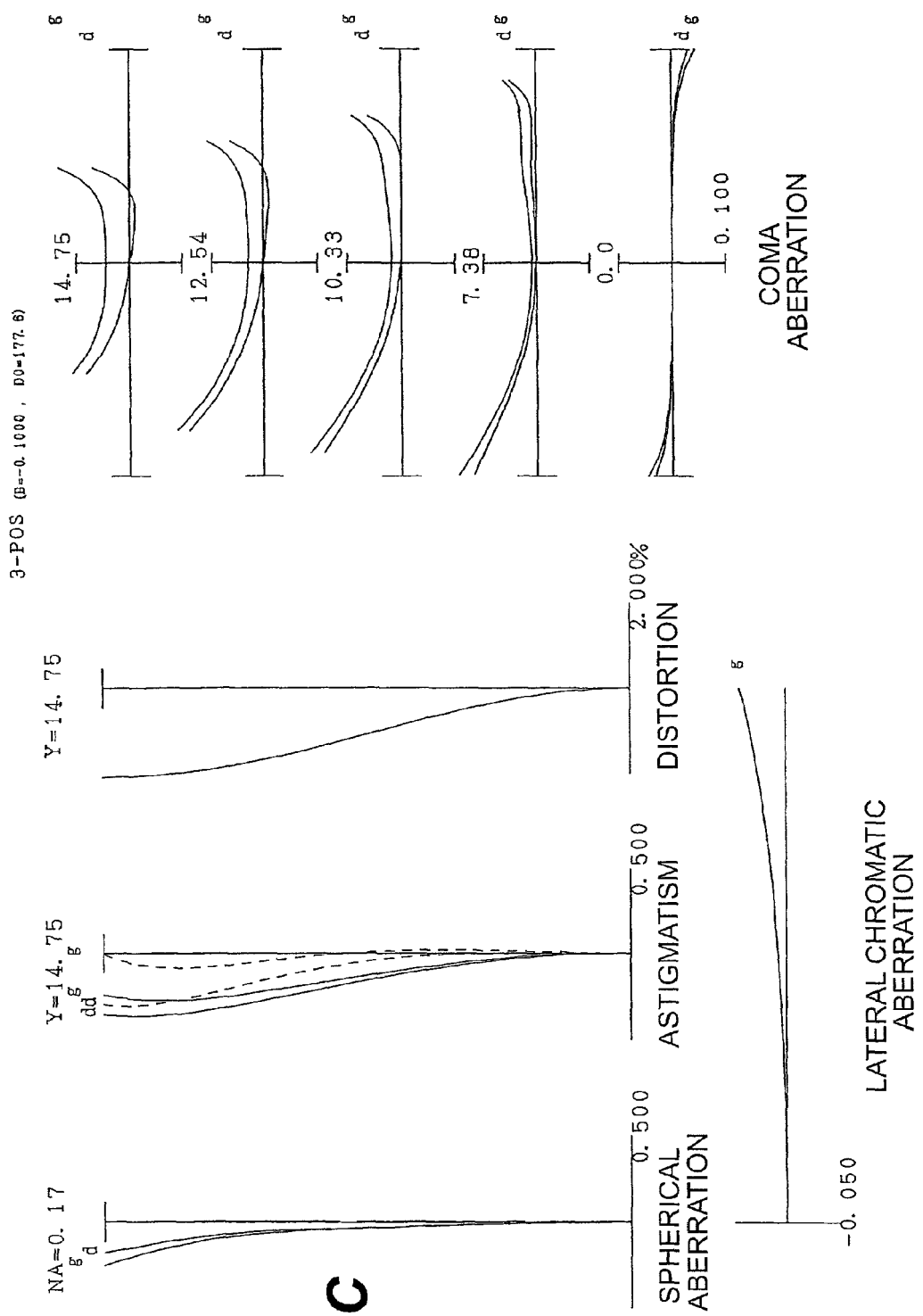

FIG. 18A to 18C are graphs showing various aberrations of the wide-angle lens WL according to Example 9. In other words, FIG. 18A are graphs showing various aberrations of the wide-angle lens WL upon focusing on infinity, FIG. 18B are graphs showing various aberrations of the wide-angle lens WL when the photographing magnification is ×−1/30, and FIG. 18C are graphs showing various aberrations of the wide-angle lens WL when the photographing magnification is ×−1/10. As seen in each graph showing aberrations, various aberrations are corrected well throughout the entire object distance range, indicating good optical performance possessed by the wide-angle lens according to Example 9. As a result, excellent optical performance can be assured for a digital still camera CAM which has wide-angle lens WL of Example 9 as well.

EXAMPLE 10

Example 10 of the present invention will now be described with reference to FIG. 19, FIG. 20 and Table 10. FIG. 19 is a diagram depicting a configuration of the wide-angle lens according to Example 10 upon focusing on infinity. The wide-angle lens of Example 10 has a same configuration as the wide-angle lens of Example 6, and therefore each composing element is denoted with the same reference symbol as Example 6, and detailed description thereof is omitted.

Table 10 shows each data of Example 10. The surface numbers 1 to 10 in Table 10 correspond to the surfaces 1 to 10 in FIG. 19. In Example 10, the second lens surface and the eighth lens surface are formed to be aspherical.

TABLE 10

[General Data]

f = 18.71069
FNO = 2.81
2ω = 77.7
Y = 14.75
BF = 18.37007
TL = 57.37075
f1 = −19.79184
f2 = 19.12211
f5 = 128.00523

[Lens Data]

| Surface Number | r | d | nd | νd |
|---|---|---|---|---|
| 1 | 32.0813 | 1.5000 | 1.59201 | 67.02 |
| 2* | 8.4332 | 14.4000 | | |
| 3 | 15.9332 | 3.5000 | 1.77250 | 49.61 |
| 4 | −183.2536 | 4.0000 | | |
| 5 | ∞ | 2.7000 | (Aperture stop S) | |
| 6 | −47.7904 | 1.0000 | 1.69895 | 30.13 |
| 7 | 11.5000 | 3.0000 | 1.58913 | 61.25 |
| 8* | −20.4074 | d8 | | |
| 9 | 81.0967 | 1.8500 | 1.69680 | 55.53 |
| 10 | 884.9269 | BF | | |

[Aspherical Data]

Second surface

κ = −0.0722
A4 = 1.54350E−04
A6 = 1.03760E−06
A8 = −5.43870E−09
A10 = 9.93280E−11

Eighth surface

κ = 1.0000
A4 = 1.10380E−04
A6 = 8.39510E−07
A8 = −1.46270E−08
A10 = 5.47810E−10

[Variable Distance Data]

| f or β | 18.71069 | ×−1/30 | ×−1/10 |
|---|---|---|---|
| d8 | 7.05068 | 4.94606 | 1.22115 |

[Conditional Expression Correspondence Value]

Conditional expression (12) d2/(−f1) = 0.72757
Conditional expression (13) ΣD/f = 0.75892
Conditional expression (14) f5/f = 6.84129
Conditional expression (15) f2/f = 1.02199
Conditional expression (16) |f1|/f2 = 1.03502
Conditional expression (17) d8/f = 0.37683
Conditional expression (18) n3 − n4 = 0.10982
Conditional expression (19) 0.07 (ν1 − ν2) − n1 = −0.37331

In this way, all the conditional expressions (12) to (19) are satisfied in this example.

Figure 20A:
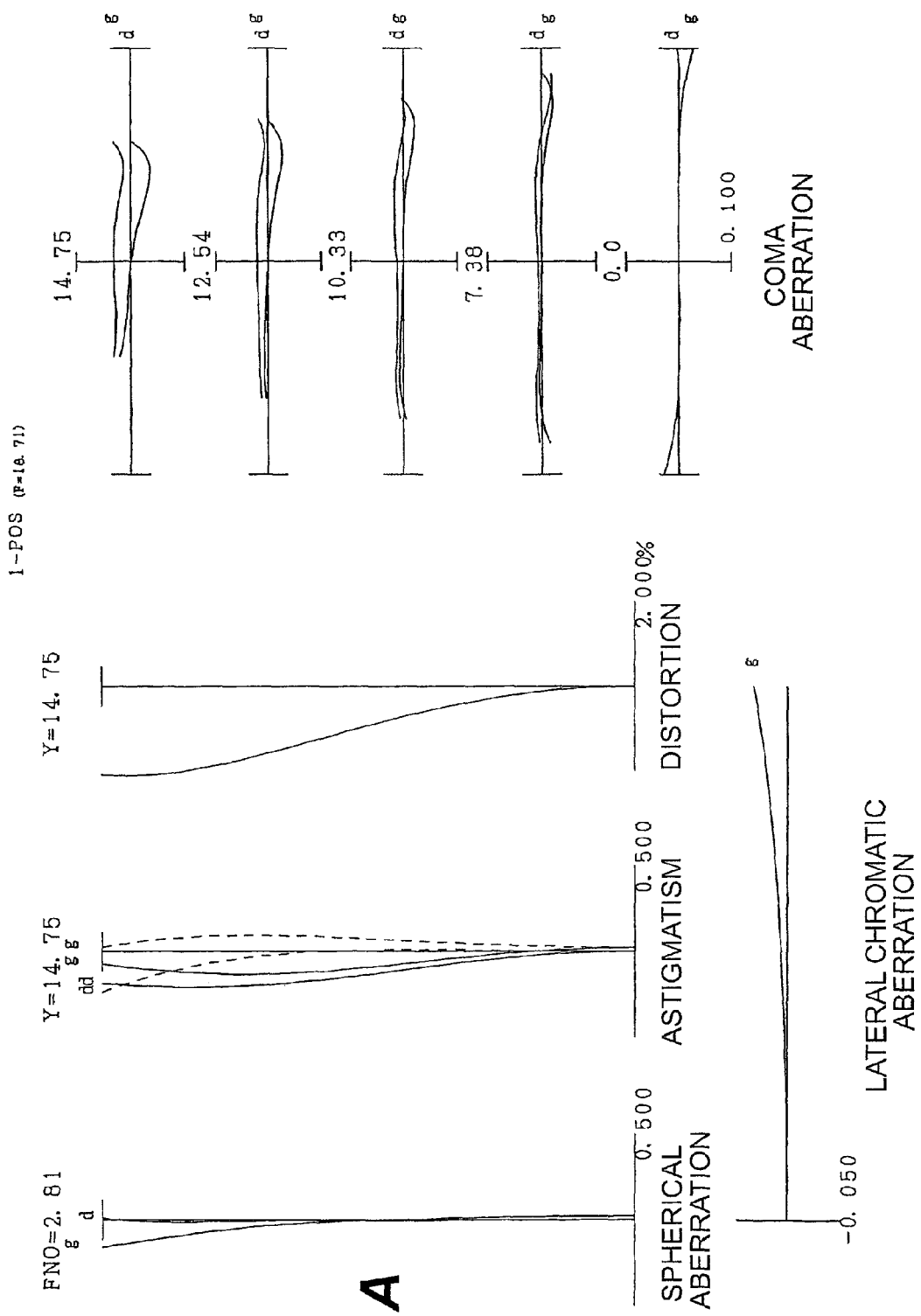
FIG. 20A are graphs showing various aberrations of the wide-angle lens according to Example 10 upon focusing on infinity, FIG. 20B are graphs showing various aberrations when a photographic magnification of the wide-angle lens of Example 10 is ×–1/30, and FIG. 20C are graphs showing various aberrations when a photographic magnification of the wide-angle lens of Example 10 is ×–1/10.
Figure 20B:
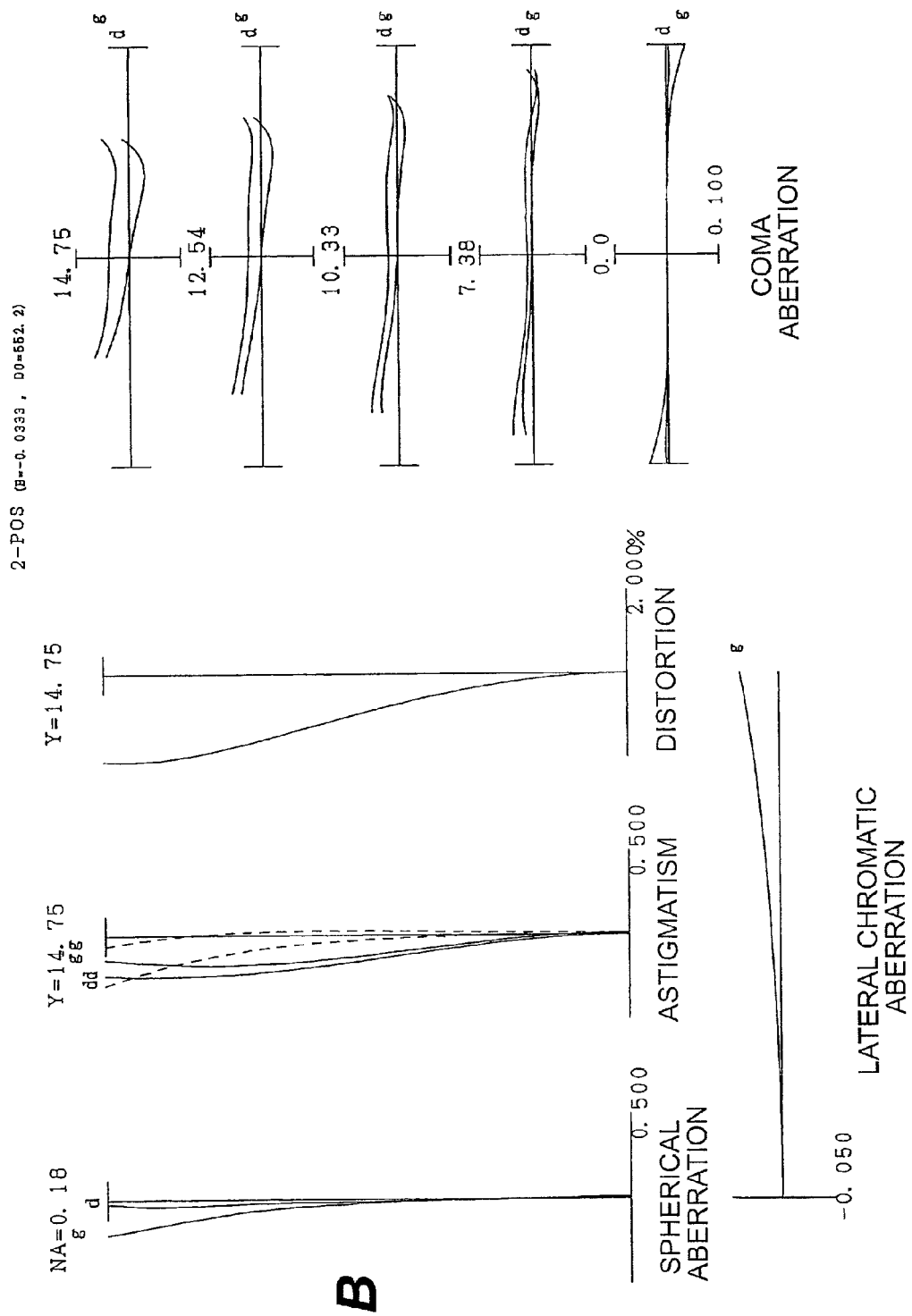
Figure 20C:
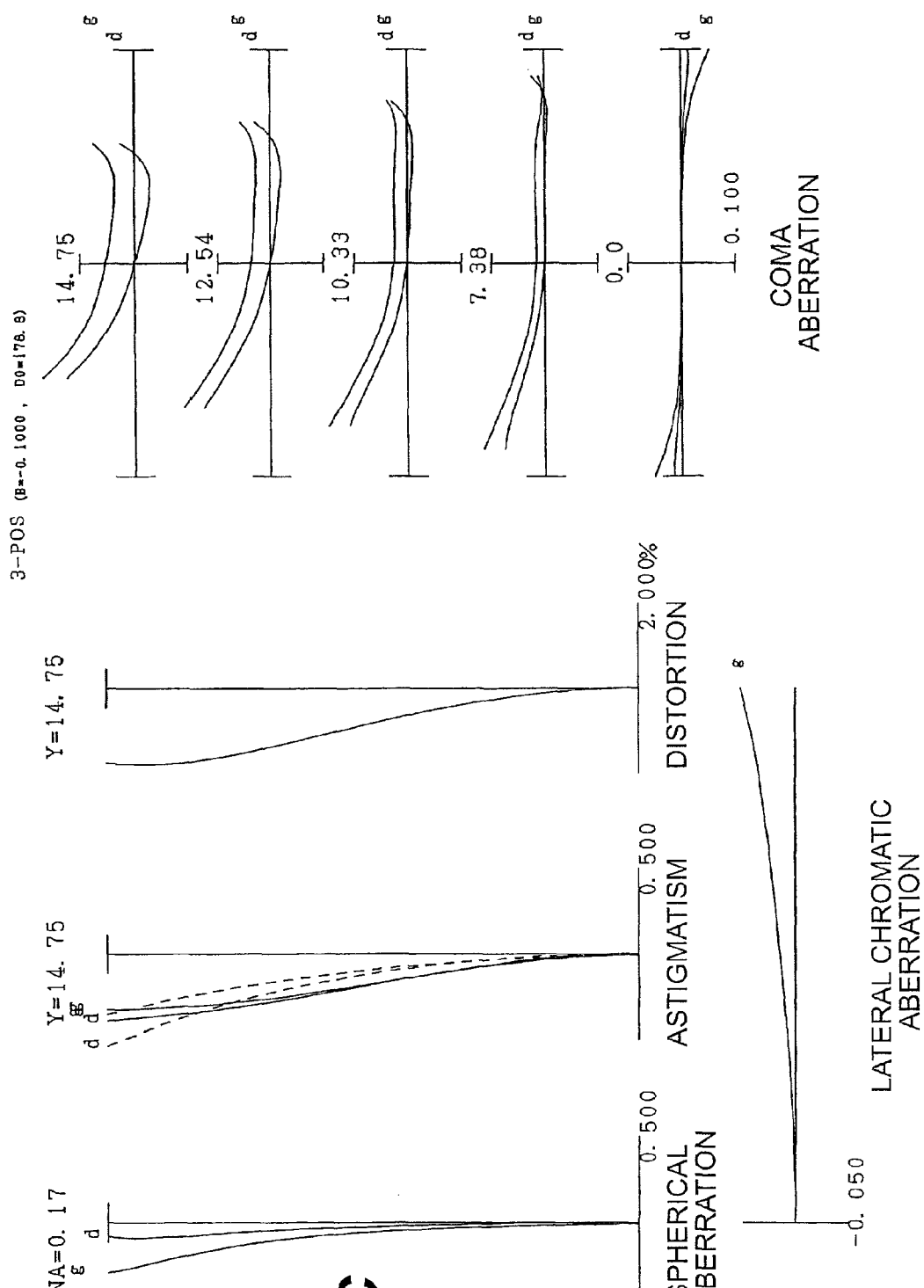

FIGS. 20A to 20C are graphs showing various aberrations of the wide-angle lens WL according to Example 10. In other words, FIG. 20A are graphs showing various aberrations of the wide-angle lens WL upon focusing on infinity, FIG. 20B are graphs showing various aberrations of the wide-angle lens WL when the photographing magnification is ×−1/30, and FIG. 20C are graphs showing various aberrations of the wide-angle lens WL when the photographing magnification is ×−1/10. As seen in each graph showing aberrations, various aberrations are corrected well throughout the entire object distance range, indicating good optical performance possessed by the wide-angle lens according to Example 10. As a result, excellent optical performance can be assured for a digital still camera CAM which has wide-angle lens WL of Example 10 as well.

According to each example, a wide-angle lens and optical apparatus (digital still camera) of which the angle of view is 77° or more, F number is about 2.8, front cell lens diameter is small, entire lens system is compact, the focusing is fast, telecentric characteristic is high and imaging performance is good, can be implemented.

Variant Form

In the wide-angle lens according to the above mentioned first and second embodiments, a filter, such as a low pass filter and infrared cut-off filter, may be inserted near the picture element.

In the first and second embodiments, the following content can be adopted within a range where the optical performance is not diminished.

In each of the above mentioned examples (Example 1 to Example 10), a wide-angle lens comprised of five lenses was shown, but the present invention can be applied to a configuration using a different number of lenses, such as six lenses. In the configuration, a lens or a lens group may be added to the side closest to the object, or a lens or lens group may be added to the side closest to the image. A lens group refers to a portion having at least one lens isolated by an air distance which changes upon zooming.

A single or a plurality of lens group(s) or a partial lens group may be designed to be the focusing lens group which performs focusing from an object at infinity to an object at close distance by moving in the optical axis direction. This focusing lens group can be applied to auto focusing, and is also suitable for driving a motor for auto focusing (e.g. driving using an ultrasonic motor). It is particularly preferable that the fifth lens alone, or the third to fifth lenses are designed to be the focusing lens group, or focusing may be performed by the entire lens system.

A lens group or a partial lens group may be designed to be a vibration-isolating lens group, which corrects image blurs generated by hand motion by moving the lens group or the partial lens group so as to have components vertical to the optical axis, or rotating (oscillating) the lens group or the partial lens group in an in-plane direction, including the optical axis. It is particularly preferable that the third lens and the fourth lens are designed to be the vibration-isolating lens group.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any aspherical surface out of an aspherical surface generated by grinding, a glass molded aspherical surface generated by forming glass in an aspherical shape using a die, and a composite aspherical surface generated by forming a resin on the surface of the glass to be an aspherical shape. The lens surface may be a diffraction surface, and the lens may be a refractive index distributed lens (GRIN lens) or plastic lens.

It is preferable that the aperture stop is disposed near the second lens, but the role of the aperture stop may be substituted by the frame of the lens, without disposing an element as the aperture stop.

Each lens surface may be coated by an anti-reflection film which has high transmittance in a wide wavelength region, in order to decrease flares and ghosts, and implement a high optical performance with high contrast.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lens system comprising, in order from an object:
a first lens which is a negative meniscus lens having a convex surface facing the object; a second lens which is a positive lens; a third lens which is a negative lens; a fourth lens which is a positive lens; and a fifth lens which is a positive lens, the following conditional expression being satisfied:

$$0.2 < d8/f < 0.64$$

where d8 denotes an air distance between the fourth lens and the fifth lens on an optical axis upon focusing on an object point at infinity, and f denotes a focal length of the lens system upon focusing on an object point at infinity.

2. The lens system according to claim 1, wherein the following conditional expression is satisfied:

$$3.77 < f5/f < 8.0$$

where f5 denotes a focal length of the fifth lens.

3. The lens system according to claim 1, wherein the following conditional expression is satisfied:

$$0.88 < (-f1)/f < 1.2$$

where f1 denotes a focal length of the first lens.

4. The lens system according to claim 1, wherein focusing from an object at infinity to an object at a finite distance is performed by moving the fifth lens along the optical axis.

5. The lens system according to claim 1, wherein the following conditional expression is satisfied:

$$0.59 < d2/(-f1) < 0.88$$

where f1 denotes a focal length of the first lens, and d2 denotes an air distance between the first lens and the second lens on the optical axis.

6. The lens system according to claim 1, wherein the following conditional expression is satisfied:

$$0.88 < f2/f < 1.2$$

where f2 denotes a focal length of the second lens.

7. The lens system according to claim 1, wherein the following conditional expression is satisfied:

$$0.6 < \Sigma D/f < 0.87$$

where ΣD denotes a distance, on the optical axis, from a lens surface closest to the object in the second lens to a lens surface closest to an image in the fourth lens.

8. The lens system according to claim 1, wherein the third lens and the fourth lens are cemented lenses.

9. The lens system according to claim 1, wherein the following conditional expression is satisfied:

$$0.87 < BF/f < 1.25$$

where BF denotes a back focus upon focusing on an object point at infinity.

10. The lens system according to claim 1, wherein the following conditional expression is satisfied:

$$-0.1 < (Rb+Ra)/(Rb-Ra) < 1.9$$

where Ra denotes a radius of curvature of an object side lens surface of the fifth lens, and Rb denotes a radius of curvature of an image side lens surface of the fifth lens.

11. The lens system according to claim 1, wherein the following conditional expression is satisfied:

$$0.01 < (n3-n4)$$

where n3 denotes a refractive index of the third lens at d-line, and n4 denotes a refractive index of the fourth lens at d-line.

12. The lens system according to claim 1, wherein the following conditional expression is satisfied:

$$-2.00 < (0.07(v1-v2)-n1)$$

where v1 denotes an Abbe number of the first lens at d-line, v2 denotes an Abbe number of the second lens at d-line, and n1 denotes a refractive index of the first lens at d-line.

13. The lens system according to claim 1, wherein the first lens has an aspherical surface.

14. The lens system according to claim 1, wherein a lens surface closest to an image in the fourth lens is an aspherical surface.

15. The lens system according to claim 1, wherein the following conditional expression is satisfied:

$$0.87 < (-f1)/f2 < 1.19$$

where f2 denotes a focal length of the second lens.

16. An optical apparatus comprising a lens system which forms an image of an object on a predetermined surface, the lens system being the lens system according to claim 1.

17. A lens system comprising, in order from an object:
a first lens which is a negative meniscus lens having a convex surface facing the object; a second lens which is a positive lens; a third lens which is a negative lens; a fourth lens which is a positive lens; and a fifth lens which is a positive lens, the following expressions being satisfied:

$$0.59 < d2/(-f1) < 0.88$$

$$0.6 < \Sigma D/f < 0.87$$

where f1 denotes a focal length of the first lens, d2 denotes an air distance between the first lens and the second lens on an optical axis, ΣD denotes a distance, on the optical axis, from a lens surface closest to the object in the second lens to a lens surface closest to an image in the fourth lens, and f denotes a focal length of the lens system upon focusing on an object point at infinity.

18. The lens system according to claim 17, wherein the following conditional expression is satisfied:

$$3.77 < f5/f < 8.0$$

where f5 denotes a focal length of the fifth lens.

19. The lens system according to claim 17, wherein the following conditional expression is satisfied:

$$0.88 < f2/f < 1.2$$

where f2 is a focal length of the second lens.

20. The lens system according to claim 17, wherein the following conditional expression is satisfied:

$$0.87 < (-f1)/f2 < 1.19$$

where f2 is a focal length of the second lens.

21. The lens system according to claim 17, wherein focusing from an object at infinity to an object at a finite distance is performed by moving the fifth lens along the optical axis.

22. The lens system according to claim 17, wherein the third lens and the fourth lens are cemented lenses.

23. The lens system according to claim 17, wherein the following conditional expression is satisfied:

$$0.01 < (n3-n4)$$

where n3 denotes a refractive index of the third lens at d-line, and n4 denotes a refractive index of the fourth lens at d-line.

24. The lens system according to claim 17, wherein the following conditional expression is satisfied:

$$-2.00 < (0.07 \times (v1-v2)-n1)$$

where v1 denotes an Abbe number of the first lens at d-line, v2 denotes an Abbe number of the second lens at d-line, and n1 denotes a refractive index of the first lens at d-line.

25. An optical apparatus comprising a lens system which forms an image of an object on a predetermined surface, the lens system being the lens system according to claim 17.

26. A method for manufacturing a lens system, in which, in order from an object, a first lens which is a negative meniscus lens having a convex surface facing the object, a second lens which is a positive lens, a third lens which is a negative lens, a fourth lens which is a positive lens and a fifth lens which is a positive lens are disposed, and each of the lenses is disposed so as to satisfy the following conditional expression:

$$0.2 < d8/f < 0.64$$

where d8 denotes an air distance between the fourth lens and the fifth lens on an optical axis upon focusing on an object point at infinity, and f denotes a focal length of the lens system upon focusing on an object point at infinity.

27. The method for manufacturing a lens system according to claim 26, wherein the following conditional expression is satisfied:

$$3.77 < f5/f < 8.0$$

where f5 denotes a focal length of the fifth lens.

28. The method for manufacturing a lens system according to claim 26, wherein the following conditional expression is satisfied:

$$0.88 < (-f1)/f < 1.2$$

where f1 denotes a focal length of the first lens.

29. The method for manufacturing a lens system according to claim 26, wherein the following conditional expression is satisfied:

$$0.59 < d2/(-f1) < 0.88$$

where f1 denotes a focal length of the first lens, and d2 denotes an air distance between the first lens and the second lens on the optical axis.

30. The method for manufacturing a lens system according to claim 26, wherein the following conditional expression is satisfied:

$$0.88 < f2/f < 1.2$$

where f2 denotes a focal length of the second lens.

31. The method for manufacturing a lens system according to claim 26, wherein the following conditional expression is satisfied:

$$0.6 < \Sigma D/f < 0.87$$

where ΣD denotes a distance, on the optical axis, from a lens surface closest to the object in the second lens to a lens surface closest to an image in the fourth lens.

32. A method for manufacturing a lens system, in which, in order from an object, a first lens which is a negative meniscus lens having a convex surface facing the object, a second lens which is a positive lens, a third lens which is a negative lens, a fourth lens which is a positive lens, and a fifth lens which is a positive lens are disposed, and each of the lenses is disposed so as to satisfy the following conditional expressions:

$$0.59 < d2/(-f1) < 0.88$$

where f1 denotes a focal length of the first lens, and d2 denotes an air distance between the first lens and the second lens on an optical axis; and $$0.6 < \Sigma D/f < 0.87$$

where $\Sigma D$ denotes a distance, on the optical axis, from a lens surface closest to the object in the second lens to a lens surface closest to an image in the fourth lens, and f denotes a focal length of the lens system upon focusing on an object point at infinity.

33. The method for manufacturing a lens system according to claim 32, wherein the following conditional expression is satisfied:

$$0.87 < (-f1)/f2 < 1.19$$

where f2 is a focal length of the second lens.

* * * * *